(12) United States Patent
Wilson

(10) Patent No.: US 12,198,125 B2
(45) Date of Patent: Jan. 14, 2025

(54) SECURITY HIERARCHY ON A DIGITAL TRANSACTION PROCESSING UNIT (DTPU)

(71) Applicant: XARD Group Pty Ltd, Brighton (AU)

(72) Inventor: Robert Wilson, Brighton (AU)

(*) Notice: Subject to any disclaimer, the term of this patent is extended or adjusted under 35 U.S.C. 154(b) by 120 days.

(21) Appl. No.: 17/449,040

(22) Filed: Sep. 27, 2021

(65) Prior Publication Data

US 2022/0012720 A1 Jan. 13, 2022

Related U.S. Application Data

(63) Continuation of application No. PCT/AU2020/050308, filed on Mar. 27, 2020.

(30) Foreign Application Priority Data

Mar. 27, 2019 (AU) ............................... 2019901029

(51) Int. Cl.
*G06Q 20/34* (2012.01)
*G06F 21/44* (2013.01)
(Continued)

(52) U.S. Cl.
CPC ........... *G06Q 20/353* (2013.01); *G06F 21/44* (2013.01); *G06F 21/77* (2013.01); *G06Q 20/227* (2013.01); *G06Q 20/3223* (2013.01); *G06Q 20/341* (2013.01); *G06Q 20/352* (2013.01); *G06Q 20/354* (2013.01); *G06Q 20/3552* (2013.01); *G06Q 20/3563* (2013.01); *G06Q 20/3574* (2013.01); *G06Q 20/401* (2013.01); *G06Q 20/4014* (2013.01); *G06Q 20/407* (2013.01); *H04L 9/0877* (2013.01); *H04L 9/0897* (2013.01); *H04L 9/3234* (2013.01); *H04L 63/20* (2013.01); *H04W 12/041* (2021.01); *H04W 12/06* (2013.01); *H04W 12/086* (2021.01); *H04W 12/35* (2021.01); *H04W 12/47* (2021.01); *G06Q 20/326* (2020.05); *G06Q 20/3263* (2020.05); *G06Q 20/3829* (2013.01);
(Continued)

(58) Field of Classification Search
CPC . G06Q 20/341; G06Q 20/352; G06Q 20/3574
USPC .......................................................... 705/41
See application file for complete search history.

(56) References Cited

U.S. PATENT DOCUMENTS 5,544,246 A 8/1996 Mandelbaum et al.
6,005,942 A 12/1999 Chen
(Continued)

FOREIGN PATENT DOCUMENTS

WO WO-2019028522 A1 * 2/2019 ............. G06K 19/07

OTHER PUBLICATIONS

"The Mobile Payments and NFC Landscape: A U.S. Perspective." Smart Card Alliance. Sep. 2011. pp. 1-53. (Year: 2011).*
(Continued)

*Primary Examiner* — Sara C Hamilton
(74) *Attorney, Agent, or Firm* — Richard A. Fagin

(57) ABSTRACT

A Digital Transaction Processing Unit (DTPU) operable to host one or more transaction applications for digitally transacting with a Digital Transaction Device (DTD), the DTPU including a security hierarchy for hosting the one or more transaction applications, wherein the security hierarchy is configured to host at least one transaction application for transacting in contact digital transactions.

13 Claims, 18 Drawing Sheets

(51) Int. Cl.

| | | |
|---|---|---|
| *G06F 21/77* | (2013.01) | |
| *G06Q 20/22* | (2012.01) | |
| *G06Q 20/32* | (2012.01) | |
| *G06Q 20/40* | (2012.01) | |
| *H04L 9/08* | (2006.01) | |
| *H04L 9/32* | (2006.01) | |
| *H04L 9/40* | (2022.01) | |
| *H04W 12/041* | (2021.01) | |
| *H04W 12/06* | (2021.01) | |
| *H04W 12/086* | (2021.01) | |
| *H04W 12/30* | (2021.01) | |
| *H04W 12/47* | (2021.01) | |
| *G06Q 20/38* | (2012.01) | |
| *G06Q 40/02* | (2023.01) | |

(52) U.S. Cl.
CPC ........... *G06Q 20/405* (2013.01); *G06Q 40/02* (2013.01); *H04L 2209/127* (2013.01); *H04L 2209/56* (2013.01)

(56) References Cited

U.S. PATENT DOCUMENTS

| | | | |
|---|---|---|---|
| 8,196,131 | B1 | 6/2012 | von Behren et al. |
| 8,297,520 | B1 | 10/2012 | Wakerly et al. |
| 8,429,409 | B1 | 4/2013 | Wall et al. |
| 8,756,702 | B2 | 6/2014 | Kanemoto et al. |
| 2004/0164142 | A1 | 8/2004 | Flugge et al. |
| 2012/0130838 | A1* | 5/2012 | Koh ................. G06Q 20/352 705/26.1 |
| 2013/0121493 | A1 | 5/2013 | von Behren et al. |
| 2013/0178159 | A1 | 7/2013 | Xie et al. |
| 2013/0262317 | A1 | 10/2013 | Collinge et al. |
| 2014/0066015 | A1 | 3/2014 | Aissi |
| 2014/0101734 | A1 | 4/2014 | Ronda et al. |
| 2014/0263626 | A1 | 9/2014 | Pochic |
| 2014/0279562 | A1 | 9/2014 | Ignatchenko et al. |
| 2015/0073983 | A1 | 3/2015 | Bartenstein et al. |
| 2015/0127529 | A1 | 5/2015 | Makhotin et al. |
| 2015/0186864 | A1 | 7/2015 | Jones et al. |
| 2015/0212753 | A1 | 7/2015 | Malzahn et al. |
| 2016/0132861 | A1 | 5/2016 | Fontaine et al. |
| 2016/0267466 | A1 | 9/2016 | Kumnick et al. |
| 2016/0275504 | A1 | 9/2016 | Koh et al. |
| 2016/0307190 | A1 | 10/2016 | Zarakas et al. |
| 2017/0076291 | A1 | 3/2017 | Cairns et al. |
| 2017/0357962 | A1 | 12/2017 | Ghanta et al. |
| 2018/0005227 | A1 | 1/2018 | Sandeløv et al. |
| 2019/0043045 | A1 | 2/2019 | Wilson |
| 2019/0239427 | A1 | 8/2019 | Aposhian et al. |
| 2019/0392424 | A1 | 12/2019 | Wilson et al. |

OTHER PUBLICATIONS

International Search Report, International Application No. PCT/AU2020/050301 dated Jun. 18, 2020.
Written Opinion of the International Search Authority, International Application No. PCT/AU2020/050301 dated Jun. 18, 2020.
International Search Report, International Application No. PCT/AU2020/050302 dated Jun. 2, 2020.
Written Opinion of the International Search Authority, International Application No. PCT/AU2020/050302 dated Jun. 2, 2020.
International Search Report, International Application No. PCT/AU2020/050303 dated May 27, 2020.
Written Opinion of the International Search Authority, International Application No. PCT/AU2020/050303 dated May 27, 2020.
International Search Report, International Application No. PCT/AU2020/050304 dated Jun. 30, 2020.
Written Opinion of the International Search Authority, International Application No. PCT/AU2020/050304 dated Jun. 30, 2020.
International Search Report, International Application No. PCT/AU2020/050305 dated Jun. 25, 2020.
Written Opinion of the International Search Authority, International Application No. PCT/AU2020/050305 dated Jun. 25, 2020.
Global Platform Technology, "Card Specification Version 2.3.1", Document Reference: GPC_SPE_034 Mar. 2018.
International Search Report, International Application No. PCT/AU2020/050306 dated Jul. 8, 2020.
Written Opinion of the International Search Authority, International Application No. PCT/AU2020/050306 dated Jul. 8, 2020.
International Search Report, International Application No. PCT/AU2020/050307 dated Jun. 4, 2020.
Written Opinion of the International Search Authority, International Application No. PCT/AU2020/050307 dated Jun. 4, 2020.
International Search Report, International Application No. PCT/AU2020/050308 dated Jul. 7, 2020.
Written Opinion of the International Search Authority, International Application No. PCT/AU2020/050308 dated Jul. 7, 2020.
International Search Report, International Application No. PCT/AU2020/050309 dated May 28, 2020.
Written Opinion of the International Search Authority, International Application No. PCT/AU2020/050309 dated May 28. 2020.
International Search Report, International Application No. PCT/AU2020/050310 dated Jul. 9, 2020.
Written Opinion of the International Search Authority, International Application No. PCT/AU2020/050310 dated Jul. 9, 2020.

* cited by examiner

| Scheme name | Full PAN | |
| Issuer name | 4 digit PAN | |
| Cardholder name | Exp date | Nickname |
| AID list | CVV | |

888 / 890 / 892

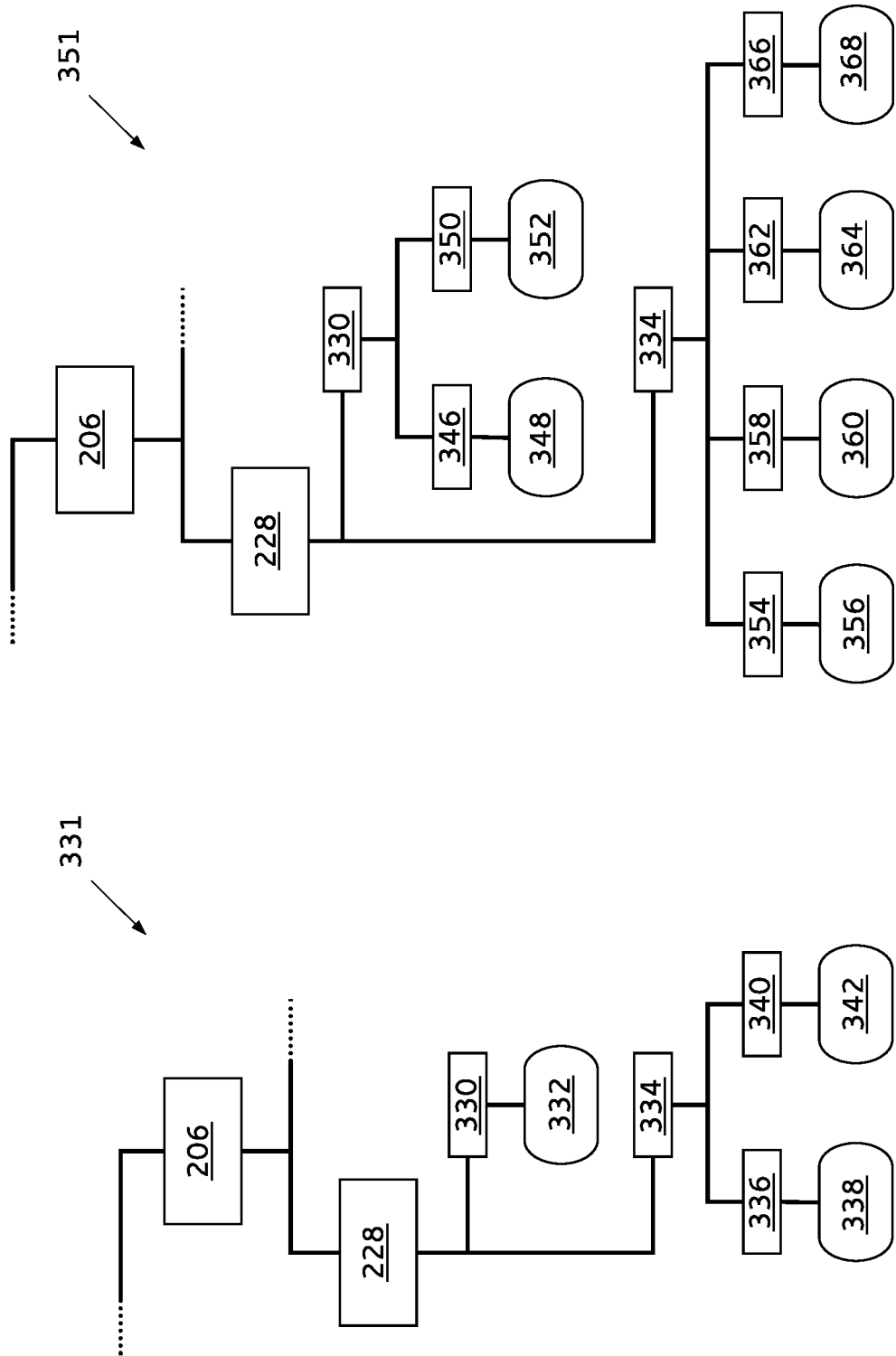

SECURITY HIERARCHY ON A DIGITAL TRANSACTION PROCESSING UNIT (DTPU)

CROSS REFERENCE TO RELATED APPLICATIONS

Continuation of International Application No. PCT/AU2020/050308 filed on Mar. 27, 2020. Priority is claimed from Australian Application No. 2019901029 filed on Mar. 27, 2019. Both the foregoing applications are incorporated herein by reference in their entirety.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

FIELD OF THE INVENTION

The present invention relates generally to digital payment devices (DPDs). In at least some embodiments, the invention relates to methods of configuring or operating DPDs.

In at least some embodiments, the invention may have application to DPDs capable of hosting credit cards, debit cards, mobile payment cards or non-payment cards and/or documents (including licences, ID cards, passports, and the like). In at least some embodiments, the invention may also have applications to DPDs which operate in conjunction with a Digital Assistance Device (DAD), such as a smartphone.

BACKGROUND OF THE INVENTION

Credit cards, debit cards and other types of physical cards or physical documents often include a magnetic stripe which stores information about:
  the card or document,
  the holder of the physical card/document,
  an institution which has issued the physical card/document, and
  other information including card/document ID (for example, a Personal Account Number (PAN)), expiry date, and the card/document holder's name.

Physical credit/debit cards typically also have the name of the cardholder, the card expiry date and the PAN embossed or printed on the card and may also include other security devices such as holograms. Such physical credit/debit cards are enabled for transactions with Digital Transaction Devices (DTDs), such as Automatic Teller Machines (ATMs), Point-Of-Sale (POS) terminals, and Electronic Funds Transfer at Point-Of-Sale (EFTPOS) terminals, where the digital transaction devices are able to read the magnetic stripe when a user swipes the stripe through or inserts the physical card into a device.

Some DTDs are operable with non-payment physical cards or documents to effect non-payment digital transactions, including passport readers, age verification card readers and the like.

More recently, physical cards, physical documents and other devices, such as watches and other wearable devices, have had integrated circuit chips, which can store some of the same (or similar) information as a magnetic strip, along with other information and with enhanced security and with improved identifiers encoded in the chip. The chip in these cards may be referred to as a Secure Element (SE). The card information stored in the SE may be seen as a digital representation of the card or document, and is sometimes referred to as a digital card. A physical card with a SE may be referred to as a chipped card. A SE is sometimes referred to as a finance chip which is issued by a financial institution, where it has sufficient hardware security.

A SE typically includes one or more of a Central Processing Unit (CPU), Read Only Memory (ROM), Random Access Memory (RAM), Electrically Erasable Programmable Read Only Memory (EEPROM), a crypto-coprocessor and an Input/Output (I/O) system. In some SE chips a part of memory, sometimes referred to as user memory or tamper-resistant user memory, is set aside for storing applications and data particular to the operations required for the cardholder and for the digital card.

A chipped card (and the SE thereon) may be enabled for contact transactions and includes contact plates on a surface of the chipped card which are connected for communication with the SE on the chipped card. A contact transaction involves inserting (otherwise referred to as "dipping") the chipped card into a DTD having complementary contacts to communicate with the chipped card contact plates. Contact transactions are governed by EMVCo standards. A chipped card may also be enabled for contactless transactions where the SE is connected to an antenna and the DTD has a corresponding antenna so that the SE and DTD can communicate via ISO/IEC_14443 which is part of and compatible with a Near Field Communication (NFC) protocol when the chipped card is brought sufficiently proximal to the DTD. Some payment devices are in the form of a wearable payment device, such as a watch, such a payment device will not have a contact plate and can only be used for contactless payment transactions. Many chipped cards, such as credit or debit cards, are operable for both contact and contactless digital transactions. Some chipped cards have a magnetic stripe with payment information encoded thereon, along with a SE.

In many circumstances the SE hosts a single payment application complying with EMVCo standards. Such SEs may be known as an EMV (Europay/Mastercard/Visa) chip. In this description of the prior art, for chipped cards and other chipped devices configured for payment transactions, the term SE should be understood to include SEs operable to host an EMVCo standards compliant payment application. Payment applications may also be referred to as applets, cardlets, applications, or payment instances. Payment applications are typically hosted in user memory of the SE, for example, in the EEPROM of the chip.

Some SEs implement only a firmware layer in which all required card and customer details are encoded. Many more recent SEs (or SE/EMVs) are configured to host an operating system, which controls various operations of the SE. In some such SEs, the operating system is compliant with a set of standards called GlobalPlatform (GP) Card Specification standards (which will be referred to as GP or GP standards), and such SEs are operable to also host payment applications compliant with EMVCo standards. MULTOS is another operating system standard for SEs on chipped credit and debit cards. SEs having a MULTOS compliant operating system are also used to host EMVCo compliant payment applications.

Some public transport travel cards include a SE which operates for contactless digital transactions. Some documents, such as passports, may include a SE which can be read by a device through a contactless transaction. Such non-payment transaction SEs are usually not operable for hosting EMVCo compliant applications. However, such SEs may host an operating system which is compliant with GP standards or MULTOS standards.

During creation of a chipped card, data particular to the cardholder, such as the cardholder's name, PAN and other details, are written into the SE in a process known as personalization by an agent known as a Personalization (or Perso) Bureau. The data is sometimes referred to as perso data. Typically, the personalization of the SE involves writing the perso data into a payment application (which has been previously instantiated in the SE). In other circumstances, the perso data is written into a memory location of the SE which is accessible by a payment application.

Personalization usually includes one or several types of personalization, each of which may be done in different stages. The main types of personalization are:
 electrical personalization: which takes place during provisioning, and which loads application codes, user data (such as the cardholder's name, PAN and other details) and a cryptographic key (for creating transaction cryptograms) into the SE, which is locked on completion so that no further changes can be made, with details of the personalization forwarded to the issuer. Data is written to the magnetic stripe (if the card has one); and
 graphical personalization: the printing or embossing of text or pictures on the chipped card and associated carrier product(s).

Typically, a payment application which has been personalized comprises a digital card in the SE of a chipped card.

In many SEs, GP commands/processes are used when installing a payment application from a payment scheme (for example Mastercard, Visa, or American Express), along with other aspects of a digital card, such as data assigned to the customer from an issuer onto the SE of a chipped card, including the PAN with issuer details.

Until recently, SEs in chipped cards have been operable with only a single digital card type in a single payment scheme (and often with a single payment application), for example, the DTC may operate as one of a Mastercard credit card, a Mastercard debit card, a Visa credit card, a Visa debit card, or an American Express credit card, but cannot operate with two or more digital card types and/or payment schemes.

In an SE which comprises finance compliant hardware (having sufficient physical security to satisfy standards) and hosting a GP standards compliant operating system, each application on the SE (including payment applications) has an associated unique Application IDentifier (AID). Each AID is composed of a Registered application provider IDentifier (RID), which is issued by the ISO/IEC 7816-5 registration authority, and a Proprietary application Identifier eXtension (PIX), which enables the application provider to differentiate among the different applications offered. The AID may also be referred to as the Application Definition File (ADF) name.

Communication with a SE chip is effected over interfaces through which Application Protocol Data Units (APDUs) are sent. The APDUs include command APDUs and response APDUs. APDUs are used for communications to a GP standards compliant operations system of a SE, which are sometimes referred to as GP standard commands and GP standard responses, sometimes as GP commands and GP responses, or sometimes simply as commands and responses. APDUs are also used for communication between the SE and a DTD (governed by ISO 7816, EMVCo and other standards), but are not the same as APDUs for GP commands/responses.

For some payment digital transactions, the physical card (whether a chipped card or magnetic stripe only card) need not be present, and only selected details from the card are provided to enable a transaction. Such transactions include internet transactions and Mail Order/Telephone Order (MOTO) transactions. For example, in a payment transaction a cardholder provides details over the telephone (either via an automated system or to a person), or via a secure internet portal, the details typically including the chipped card's PAN, the cardholder's name, the card's expiry date, CVV, and other security information.

Security of payment transactions is a major concern as there have been many instances of fraudulent transaction with stolen physical cards/documents or stolen physical or digital card/document details. Credit/debit cards may also have a CVV (or CVC on the magnetic stripe) to make it more difficult to replicate a card for fraudulent purposes.

For magnetic stripe cards (or chipped cards with a magnetic stripe), the CVC is usually a cryptogram, created based on the card data, for example, including the card PAN and expiry date, and a bank's master key. The bank's authorization host recreates the CVC value with the bank's key to determine if it matches the CVC sent during a transaction. The CVC is printed on the card after personalization data is entered on the card and is stored in the magnetic stripe.

The same principle was subsequently adopted for another CVC sometimes called Card Verification Value 2 (CVV2), which is commonly printed in the signature panel on the back of the card. The CVV2 is used primarily to help secure e-Commerce and Internet or MOTO transactions. This is a second unique cryptogram created from card data and the bank's master key (although this is a different cryptogram as compared with the magnetic stripe CVC). The CVV2 is not present on the magnetic stripe.

Often card issuers issuing chipped cards with a SE install a cryptographic key thereon for generating a symmetric cryptographic key in the SE, which is used during card communications with a DTD to generate cryptograms (for example, Transaction Certificates (TCs)) for a digital transaction. The cryptograms (or TCs) sign the information that the transaction originated from an interaction with the SE on which the key is installed.

Many chipped cards operate with a Cardholder Verification Method (CVM), such as a Personal Identification Number (PIN) code (as specified in many regions) known only to the cardholder(s), which must be kept confidential, and must be entered on secure and certified terminals to verify that the person is the authorized cardholder. Depending on the issuer's configuration, the PIN may be stored in the SE for offline verification. The PIN may be stored locally in a secure, tamper resistant memory (that is, the SE). Other chipped cards having a CVM may have biometric security means, such as a fingerprint reader.

A SE is typically provided from a manufacturer with a plurality of containers for different payment schemes. Containers are sometimes referred to as libraries, Elementary Load Files (ELFs) or packages. For example, a SE may be supplied with three containers including Visa, Mastercard and American Express. Often these containers are in the ROM of the SE. Usually, as a requirement during personalization, containers representing payment schemes, other than the container which is being used for the payment application hosted on the SE of the chipped card, are disabled or made inactive during the personalization process after a single digital card (the personalised payment application) is installed and made active. Containers provide a range of functions for a payment application, called on when effecting a transaction with a DTD. In some implementations, the container is a library of functions or classes (for example, in a JavaCard).

Some finance compliant SEs with a GP standards compliant operating system employ a security hierarchy in accordance with GP standards for management of contents of the SEs. The security hierarchy comprises a tree of security domains, including an Issuer Security Domain (ISD), having the highest authority and control over the contents and operations in the whole SE. The security hierarchy may also include one or more Supplementary Security Domains (SSDs), each having subsidiary authority and control over a subset of the contents and operations of the ISD. The hierarchy may also include one or more SSDs which are subsidiary to a higher SSD. Each security domain is implemented using an application which has its own AID. It is possible for a SE to have several hierarchies, but only one ISD.

Each security domain may have an associated key (typically a symmetric key) with a copy of the key stored in the corresponding security domain application and another copy of the key kept by (or is in the control of) an entity (or agent) with authority over that security domain.

The ISD key for each SE may be a unique derivative of a master key owned by an issuing authority, where the issuing authority's master key may be used for securing many SEs. The ISD key is generated by an issuing authority for a SE and installed thereon so that the issuing authority has control over the ISD of the SE. The ISD may be passed from the issuing authority to another entity so that entity has control over the ISD in the SE. In devices such a mobile phones with a SE, the owner of the ISD key passes the ISD key to a Key Management Server (KMS). SSD keys generated by the KMS are installed on the SE. An agent with a key for a particular SSD has control over that SSD.

All ISD keys, SSD keys, and particularly the master key, are kept securely as secrets. Outside of the SE, an ISD key and/or a SSD key is in the possession of or in the control of an entity (or agent) with control over the associated SSD. Otherwise, the ISD key and SSD keys are kept securely only in the SE (more particularly, in the security domain applications). A key allows the possessor to effect one or more operations on a finance compliant SE with a GP standards compliant operating system in the security domain associated to the key and in accordance with privileges that are assigned to the security domain when it is installed. When the possessor of a key is permitted to effect an operation in a security domain, the possessor is said to be able to authenticate to the security domain.

For a finance compliant SE with a GP standards compliant operating system, operations on the SE are effected by scripts. Each script comprises one or more APDUs. Typically, a script will be composed to effect one or more operations (one or more commands) on the SE, and may include one or more APDUs for effecting the one or more operations (or commands). Some scripts do not require encryption as they do not need to authenticate to a security domain. Other scripts require securing by a key for a security domain so that the script is able to authenticate to that domain. Sometimes the script is also encrypted as well as being secured by a key for authentication to a security domain. When a script has its command(s) (that is, all its APDUs) effected on a SE (whether or not in a security domain), this is sometimes referred to as playing or executing the script. The execution of a script includes: creating a secure session (using a session key derived from the security domain key) with a SE to enable secure communication or transfer of the script to the SE, authentication to the target security domain in the SE, and, once transferred, authorization of a next step.

Each key set also has a counter which is incremented (to be the next expected counter value) after each script is authenticated to that domain. The purpose of the counter is to prevent replay (or re-execution) of a same script in the domain. The derivation of the session key includes the counter value, so that when signing a script, the signing includes the counter value. If the counter value is incorrect, the derived session key will be incorrect, and the setup of the secure session will fail. Further, if the script is encrypted, an incorrect session key will not allow decryption.

Sometimes, scripts, such as those used for personalization of a payment application, are not provided externally of a Perso Bureau. Instead, all script operations for instantiating a payment application on the SE of a chipped card, and for personalization of that payment application (becoming thereby a digital card on the SE of the chipped card) are conducted at the Perso Bureau (which may be during the lamination stage of chipped card manufacture or post lamination in a scheme approved secure area).

SEs and the chipped cards on which they are placed have lifecycles, including lifecycle states, including:
  OP_READY: indicating a runtime environment is available and the ISD, acting as the selected application, shall be ready to receive, execute and respond to APDU commands (scripts);
  INITIALIZED: an administrative card production state. The state transition from OP_READY to INITIALIZED is irreversible;
  SECURED: the intended operating card (both the physical/chipped card and the digital card in the SE of the physical chipped card) lifecycle state post-Issuance. This state may be used by security domains and applications to enforce their respective security policies. The state transition from INITIALIZED to SECURED is irreversible;
  CARD_LOCKED: present to provide the capability to disable the selection of security domains and applications. The transition from SECURED to CARD_LOCKED is reversible. Setting the card to the CARD_LOCKED state means that the card shall only allow selection of the application with the Final Application privilege. Card content changes, including any type of data management (specifically security domain keys and data), are not allowed in this state; and,
  TERMINATED: signalling an end of the card lifecycle and the card. The state transition from any other state to TERMINATED is irreversible. The state TERMINATED is used to permanently disable all card functionality with respect to any card content management and any life cycle changes. This card state is intended as a mechanism for an application to logically (or digitally) 'destroy' the card.

Some chipped cards have attempted to allow more than one magstripe personality to be installed on a chip (typically, a non-SE, and even if using a SE, it is one which is not configured to host a EMVCo standards compliant payment application and also which is not finance compliant hardware, nor is the SE configured to host a GP standards compliant operating system). In such proposals, a user is to select the magnetic stripe card (not the same as a digital card as would be hosted by a finance compliant SE) with which the chipped card is to operate. The magnetic stripe cards are installed "in the field" on the chipped card, duplicated from another physical card's magnetic stripe track 1 or track 2 data. Multiple magnetic stripe cards may include more than one card type from the same payment scheme (for example, a credit card and a debit card from Mastercard), or may include card types in different payments schemes (for example, a Visa debit card and an American Express credit card). Example products include offerings from Plastc, Coin, Final, and Wocket. However, the Plastc solution had operational limitations, and the Wocket solution requires a specific Wocket device. None of these solutions has gained wide market acceptance, and some have now closed or ceased operating. One serious problem causing failure of such prior solutions is not attaining certification from organizations, such as EMVCo, and thus are unsuited to operate with the corresponding payment schemes requiring EMVCo certification and the DTDs in a payment network, which also require compliance with EMVCo standards. Another problem facing such proposals is that the Service Code includes a requirement that a particular kind of chip is present, and the DTD must request that this type of chip is used, however, as these cards have only a copy of the magnetic stripe (the magnetic stripe card), the required type chip is not present, which will cause transactions to fail. Further, such proposals do not work because issuer (who owns the cardholders' data) cannot be convinced that:

the ISD keys and SSDs of the chip are tightly controlled by the issuer only or an agreed agent of the issuer;
the issuer can use their SSD key (key rotation);
the card meets all the finance standards;
the card Is capable of holding the issuers data and is able to securely generate issuer cryptograms;
the proposed cards are capable of having the data installed in a secure personalisation bureau facility to the issuer's specifications; and,
the lifecycle of the SE altered by the personalisation bureau is locked to any other changes.

Another means of conducting payment transactions is known as a digital wallet. A digital wallet refers to electronic devices and programs used for making payments for purchases digitally, without presenting a physical credit card, debit card, or cash. One type of digital wallet is a device-based digital wallet implemented, for example, on a smartphone. Digital wallets may also be implemented on a wearable payment device. Examples of device based digital wallets include Apple Pay and Samsung Pay. Google Wallet (G Pay) and PayPal provide apps which can operate on smartphones. Device-based digital wallets implemented on NFC enabled devices such as smartphones can be used for contactless Card-Present transactions with suitably configured DTDs (contactless terminals). Another type of digital wallet is an internet-based digital wallet which enables a user to add credit card/debit card information (that is, information readily obtainable from a physical card) allowing the customer to make online purchases. Google Wallet (for peer-to-peer payments) and PayPal (for online payments) are examples of internet-based digital wallets. Digital wallets are provided to a smartphone user (or to the user of another device, or internet) by a Wallet Service Provider (WSP). Typically, the user will request establishment of an account and is then provided the digital wallet application for download onto the user's smartphone.

Digital wallets capable of conducting contactless payments and/or peer-to-peer payments may contain a number of different payment applications for virtual payment cards (for example, Visa, Mastercard, American Express) or card types (credit card, debit card), which may be referred to as Mobile Payment Cards (MPCs) and can be securely stored in a SE (typically an eSE or UICC chip) of the smartphone. Some digital wallets can also be used to hold other non-payment cards, such as store loyalty cards or gift cards. Collectively, the MPCs and non-payment cards may be referred to a Virtual Cards (VCs), though non-payment cards will not typically be stored in a digital wallet or in the more secure areas (sometimes referred to as payment areas) of memory on a SE.

There are differences between a MPC configured for a SE in a smartphone or other similar mobile payment device and digital cards as hosted by a SE on a physical (chipped) card. A SE (an eSE/UICC chip) for payment devices, such as on smartphones, operates with a scheme container wherein the container may be configured for operating only with MPCs, which are limited to contactless payment transactions (a digital card in a SE for a physical/chipped card must typically be able to perform contact and contactless payments). Containers are configured to instantiate applications and/or create instances to suit the physical form factor of the device (such as a chipped card or a smartphone) where they will be stored. A container on a chipped card can support applications/instances for contact and contactless cards for the scheme of that container, and a container for an eSE/UICC chip as used, for example, on a smartphone, may support only applications/instances for contactless virtual cards (or MPCs). A container for such an eSE/UICC is capable of operating with more than one MPC, and the eSE/UICC of such devices is capable of operating with more than one container. In contrast, a scheme container for a SE of a chipped card is limited to the matching of the issued scheme of the single digital card to the scheme's container, wherein all other containers installed on the SE and not containing the matched digital card are disabled or locked after the personalization process.

MPCs (and sometimes VCs or other applications and features) are typically created, managed and distributed to a smartphone by an agent, including Trusted Service Managers (TSMs) and/or Token Service Providers (TSPs). The TSM/TSP is usually entrusted with authority to send MPC data, including instructions for instantiating the payment application and cardholder personalization data (the instantiation and personalization are typically performed by different entities, but which may both be TSMs), Over-The-Air (OTA) via a Mobile Network Operator (MNO) using a secure channel to the user's smartphone. In addition to OTA communication, the TSM/TSP can send data Over The Internet (OTI), or Over The Wire (OTW) via, for example, a DTD. The secure channel is established according to GP standards protocols, for example Secure Channel Protocol 02 (SCP02), being a secure, private, and typically synchronous communication link between the TSM/TSP and the eSE/UICC chip on the smartphone.

Recently, another method to assist in providing MPCs has emerged called a Secure Element Management Service (SEMS), an example being the NXP Loader Service, which uses digital certificates to ensure secure transfer of data from a provider agent to the eSE/UICC chip on the smartphone.

A TSM may also receive tokens from a Token Service Provider (TSP) and other required card data from various parties, and uses these to create a MPC, which is made available to a cardholder through a secure link to download onto the cardholder's smartphone.

There are different TSMs for performing different roles. A Secure Element Issuer (SEI) TSM (also referred to as a Root TSM) manages operations on the SE of the user's smartphone or other type of mobile payment device, including instantiation of payment applications and creation of SSDs; and a Service Provider (SP) TSM manages creation delivery of perso scripts to the user's smartphone or other type of mobile payment device. The SP TSM may be a TSP, in which case the perso script provided contains a tokenized PAN. In some circumstances, both SEI and SP TSM roles may be performed by a single entity.

TSM/TSP operations are done by using one or more scripts issued by the TSM/TSP, which are encrypted by the TSM/TSP with a key for authentication to a particular security domain on the eSE/UICC.

Many other operations available to Perso Bureaus and TSMs are not available to others. For example, when a user wishes to change the primary MPC on their smartphone, the user must connect, for example, with a TSM to allow the TSM to perform required operations with a script to change the primary MPC in the digital wallet, which is then securely communicated back to the user's smartphone. This can be difficult if the user is not in a location where a communication link to the TSM can be established.

As mentioned previously, a SE is in a CARD_LOCKED state before leaving a Perso Bureau and cannot be changed in the field. After the SE chip is locked only a Perso Bureau with the appropriate SSD key is able to change the status.

Some smartphone SEs may require a Controlling Authority Security Domain (CASD) in the security hierarchy. The CASD exists to broker trust between the issuer of the SE and the issuer of the MPC to be hosted on the SE. The CASD facilitates a key exchange between these two parties. Notably, SEs (or finance chips) on chipped cards do not have a CASD installed.

TSMs also assist with managing end-to-end communication and data transfer security, for example, between the TSM itself, a bank (operating a cardholder's card accounts and other accounts), a credit/debit card provider (issuing the cardholder's card), a telecoms company (providing a mobile network for the cardholder) and, in situations where the user's smartphone contains an eSE/UICC, the cardholder's smartphone.

A key ceremony is a task that is performed to support some of the functions of a TSM. The key ceremony is a standard procedure between parties who wish to securely share a secret. Secrets (such as ISD keys and the like) are generally held in a Hardware Security Module (HSM). In a key ceremony, key custodians from different entities enter their part of a key into the HSM, which reconstructs the key in the HSM. Keys are created and encrypted inside the HSM (the keys are never unencrypted outside the HSM). Now, both entities share a secret, which they may use for encrypting a secure channel for communication to the SE.

The SP TSM is provided the account data (perso data) and converts it into a APDUs formatted for a eSE/UICC in a smartphone, the TSM then prepares the perso data (converted to APDUs) for download to the cardholder's smartphone and sends this to its own HSM to encrypt the APDUs with the session keys (for example SCP02 session keys) for the respective SSD on the SE. The perso data is written into a payment application to become a MPC.

The TSM uses master keys (residing in the HSM) in a Key Management System (KMS) to produce unique keys for a specific SSD in the SE of the smartphone, or CDMA cell phones, and the NFC data package (comprising APDUs) is encrypted with the unique keys. The encrypted data is transferred Over-The-Air (OTA) to, for example, a Mobile Network Operator (MNO), which has performed a key ceremony as well. Alternatively, the data can be transferred via TLS. Also, the data may also be transferred OTI or OTW, where there is no MNO involved.

In an example operation, the MNO transfers the perso script (including metadata to display a card image on the phone's display with the last 4 digits of the PAN) to the cardholder's smartphone or other mobile payment device.

Checks may be performed including a check of the user's location, and checks of device fingerprints (for example, the fingerprints of a SE within a smartphone). This process ensures that the bank and MNO can know the data is authentic and delivered to the correct account holder. The data is decrypted and installed on the smartphone, after which the cardholder can use their smartphone for card payments. The processes and products of TSMs/TSPs, and their co-operating banks and telecommunications providers have to-date been restricted to operating within those organizations. For example, the MPCs instantiated and personalized on SEs through the secure end-to-end process are only available via those organizations and processes. If a card holder wishes to obtain a new MPC or change the operating card on their mobile device, it is commonly required to do this through the TSM/TSP and co-operating organizations.

As an alternative to the use of TSMs/TSPs is using a SEMS, an example being the loader service which was developed by NXP Semiconductors N.V. Another example of a SEMS is implemented as a service in a recent release of GP standards. SEMS installs containers on the SE, but the perso data for instantiated payment instances must still be done by a SP TSM to create a MPC.

The NXP loader service was developed for the provisioning of wearable payment devices and other smart devices using the Internet of Things (IoT). The NXP loader service requires a chip with NXP applications installed. Alternatively, if using a SEMS from the GP standards, NXP specific applications will not be needed.

SEMS is available in a line of NXP chips and is preconfigured on the SE itself, as an applet and client. The loader services root entity delegates content-management rights, using certificates. Applets can be loaded onto the SE without using a Secure Element Issuer (SEI) TSM. For Android devices, the necessary scripts are already embedded into an Android application package (APK) and can trigger card content-management services. For example, the scripts can create security domains and inject keys, load and update applets (including payment applications), instantiate and customize the applet, and delete security domains.

Despite the apparent convenience of digital wallets, each MPC in a digital wallet can only be used for contactless payments (and in some instances, in online payments). Some POS/EFTPOS terminals do not support the type of contactless payment required and ATMs generally do not support contactless transactions. Further, not all smartphones support NFC or digital wallets, and cannot be used for such transactions with any such DTDs. As a result, the establishment and use of digital wallets has experienced limited commercial success.

There is therefore an ongoing market need for chipped cards, such as credit cards and debit cards (that is, having the shape of a traditional credit or debit card and having the contact plates and NFC infrastructure of such chipped cards for contact and contactless transactions). However, a major disadvantage of chipped cards with a SE is that they cannot support multiple digital cards in the SE. Each chipped card is supplied pre-installed with a single digital card which is fixed for the life of the chipped card. Users must carry a separate chipped card for each digital card they wish to use.

Further, there is no known method or infrastructure for having a chipped card (or other type of DPD) in the field with everything needed to provision a new digital card (including instantiation of a new payment application and personalization of that new payment application) to the chipped card, and/or for selecting and activating a personality from multiple personalities hosted on the chipped card. Current methods of provisioning a new digital card to a chipped card (or other type of DPD) are only performed by the issuer in a highly secure environment.

Further, there is no method or infrastructure to form communication links with chipped cards while in the field. There has been no motivation to do so because such chipped cards have not operated with MPCs or to be supplied by TSMs, TSPs or SEMSs. Even though some chipped cards have been proposed to include communication functionality, such chipped cards are also not able to form a direct or indirect communication link with a provisioning network (including TSMs, TSPs, or SEMSs). Current methods of loading a chipped card with a digital card requires a Perso Bureau with sufficient security to handle the issuers' banking SSD keys, bank cryptograms, private data and account data. Further, there has been no method or infrastructure to form communication links with chipped cards while in the field, and there has been no motivation to do so as chipped cards have not operated with MPCs. Even though some chipped cards have been proposed to include communication functionality, such chipped cards are also not able to form a direct or indirect communication link with a provisioning network, including TSMs, WSPs and TSPs, and other entities, agents and/or providers in a card issuing, payment, and/or provisioning network.

There is also no known method or infrastructure for provisioning a chipped card in the field with everything needed to change to a different digital card while in the field (that is, remote from and not connected to a provisioning network). As mentioned above, a SE for a chipped card is deliberately placed in a CARD_LOCKED state before leaving a Perso Bureau so that it cannot be changed in the field. Even if a SE were not locked before leaving a Perso Bureau, there is no way to form communication links with chipped cards while in the field (remote from a provisioning network).

Yet another problem with some existing and/or some proposed chipped cards is that the means and/or methods they employ to host multiple digital cards or magnetic stripe cards on a SE are not compliant with any of the existing (including past and/or proposed/future) required standards, such as GP standards and EMVCo standards. As such, these existing and/or proposed chipped cards will be unable to enter into digital transactions with DTDs, which are required to interoperate only with compliant chipped cards.

Yet another shortcoming, in some smartphones and other types of mobile payment device using MPCs in digital wallets is that, when a user wishes to change between MPCs (for example, change from a MPC associated with a Mastercard credit card to a MPC associated with a Visa debit card), the process of change commonly requires communication between the smartphone and an agent such as a TSM. This can be inefficient for a cardholder wishing to make a quick change to the MPC of their multi-MPC smartphone. In some circumstances, a smartphone user will be in a location where it is not possible to make contact with the agent (TSM or other agent), and so it will not be possible to change the MPC of the smartphone. Further, as a TSM does not manage contact MPCs (or digital cards which have contact and contactless interfaces) a cardholder cannot use the TSM to change contact MPCs/digital cards.

Presently, there are no chipped cards which have a suitable security hierarchy for hosting and operating the card with multiple digital cards installed thereon. Further, there are no chipped cards with a security hierarchy suitable for provisioning by a TSM and/or a TSP.

SUMMARY OF THE INVENTION

In a first aspect, the present invention provides a Digital Transaction Processing Unit (DTPU) operable to host one or more transaction applications for digitally transacting with a Digital Transaction Device (DTD), the DTPU including a security hierarchy for hosting the one or more transaction applications, wherein the security hierarchy is configured to host at least one transaction application for transacting in contact digital transactions.

In embodiments, the security hierarchy is further configured to host at least one transaction application for transacting in contactless digital transactions.

In embodiments, the security hierarchy is further configured to host at least one transaction application for transacting in both contactless and contact digital transactions.

In embodiments, the security hierarchy includes one or more security domains. In some such embodiments, at least one of the one or more security domains is operable as a transaction application security domain for hosting at least one of the one or more transaction applications. In some such embodiments, the at least one transaction application security domain is configured for provisioning by at least one of a digital payment device manager, a Trusted Service Manager (TSM), a Token Service Provider (TSP), and a Secure Element Manager Service (SEMS).

In embodiments, the DTPU is further operable to host one or more containers, each transaction application being derived from one of the one or more containers, the security hierarchy operable to host the one or more containers. In some such embodiments, at least one of the one or more security domains operable as a container security domain for hosting at least one of the one or more containers.

In embodiments, the DTPU is further operable to host an application selection module operable to provide transaction application identifier information for communication to a DTD in a digital transaction, the transaction application identifier information being indicative of a transaction application operable for a digital transaction with the DTD. In some such embodiments, each transaction application identifier is an Application Identifier (AID) of the associated transaction application.

In embodiments, the DTPU is operable to reversibly unlock at least one of the one or more transaction applications such that each at least one unlocked transaction application is operable for a digital transaction with the DTD. In some such embodiments, the DTPU is operable reversibly unlock at least one of the one or more transaction applications while the DTPU is in the field remote from a provisioning agent.

In embodiments, the DTPU is operable to reversibly lock at least one of the one or more transaction applications such that each at least one unlocked transaction application is inoperable for a digital transaction with the DTD. In some such embodiments, the DTPU is operable reversibly lock at least one of the one or more transaction applications while the DTPU is in the field remote from a provisioning agent.

In embodiments, the security hierarchy has a tree structure which includes a first branch hosting the one or more containers, the tree structure further including a second branch hosting the one or more transaction applications. In some such embodiments, the first branch is a sibling to the second branch in the tree structure.

In embodiments, the DTPU is operable to lock each of the one or more transaction applications by locking a parent security domain of the second branch.

In embodiments, the one or more transaction applications include at least one first transaction application and at least one second transaction application, the at least one first transaction application being hosted by a first security domain, the at least one second transaction application being hosted by a second security domain. In some such embodiments, the first security domain is operable to be controlled exclusively by a first party, and the second security domain is operable to be controlled exclusively by a second party.

In embodiments, the first security domain is a sibling to the second security domain in the tree structure.

In embodiments, the security hierarchy has a tree structure and the one or more transaction applications include a plurality of transaction applications which are each associated with a primary identifier, wherein transaction applications associated with the same primary identifier are children of the same security domain, and transaction applications associated with a different primary identifier are children of different security domains. In some such embodiments, the primary identifier is a Personal Account Number (PAN).

In embodiments, the application selection module is hosted by the security hierarchy outside the second branch. In some such embodiments, the security hierarchy includes a third branch which hosts the application selection module. In embodiments, the third branch is a sibling to the second branch. In embodiments, the third branch is a sibling to the first branch.

In embodiments, the application selection module is hosted by the DTPU outside the security hierarchy.

In embodiments, the DTPU is included on a Digital Payment Device (DPD) operable for a digital transaction with a DTD.

In embodiments, the one or more transaction applications are associated with one or more Personalized Digital Transaction Packages (PDTPs), such that each PDTP is associated with at least one corresponding transaction application, each PDTP being associated with a corresponding personality, the personality at least in part hosted by the DPD. In some such embodiments, each PDTP is a child of a security domain different from any one or more others of the PDTPs.

In embodiments, the DTPU is operable to de-activate a selected PDTP by locking a parent security domain of the PDTP, wherein each de-activated PDTP is inoperable for a digital transaction with a DTD.

In embodiments, the DPD includes an OSE for generating one or more scripts.

In embodiments, the DPD includes an OSE for storing one or more scripts.

In embodiments, the OSE is operable to store one or more template scripts and the MCU is operable to provide operational data to the OSE, the OSE further operable to customize the one or more template scripts with the operational data so as to prepare the one or more scripts. In some such embodiments, the operational data includes an AID of a selected transaction application to be unlocked.

In embodiments, the DTPU, upon execution of the one or more scripts, is operable to reversibly unlock a selected transaction application.

In embodiments, the DTPU, upon execution of the one or more scripts, is operable to reversibly lock a selected transaction application.

In embodiments, the DPD includes an MCU for operating the DTPU to execute the one or more scripts.

In embodiments, the one or more transaction applications includes a first transaction application for conducting financial transactions, and a second transaction application for purposes other than conducting financial transactions.

In embodiments, the first transaction application is associated with a payment scheme.

In embodiments, the second transaction application provides an identity document.

In a further aspect, the present invention provides a Digital Payment Device (DPD) including a Digital Transaction Processing Unit (DTPU) operable to host one more transaction applications for digitally transacting with a Digital Transaction Device (DTD), the DTPU being in accordance with the first aspect of the invention.

In yet a further aspect, the present invention provides a method of hosting, on a Digital Transaction Processing Unit (DTPU), one or more transaction applications for digitally transacting with a Digital Transaction Device (DTD), the DTPU including a security hierarchy for hosting the one or more transaction applications, wherein the method includes:
  configuring the security hierarchy to host at least one transaction application for transacting in contact digital transactions.

In embodiments, the method includes:
  configuring the security hierarchy to host at least one transaction application for transacting in contactless digital transactions.

In embodiments, the method includes:
  configuring the security hierarchy to host at least one transaction application for transacting in both contactless and contact digital transactions.

In embodiments, the method includes:
  Including one or more security domains in the security hierarchy.

In embodiments, the method includes:
  operating at least one of the one or more security domains as a transaction application security domain for hosting at least one of the one or more transaction applications.

In embodiments, the method includes:
  the security hierarchy hosting one or more containers, each transaction application being derived from one of the one or more containers.

In embodiments, the method includes:
  operating at least one of the one or more security domains as a container security domain for hosting at least one of the one or more transaction applications.

In embodiments, the method includes:
  the security hierarchy hosting an application selection module operable to provide transaction application identifier information for communication to a DTD in a digital transaction, the transaction application identifier information being indicative of a transaction application operable for a digital transaction with the DTD.

TECHNICAL PLATFORM AND/OR RELATED TECHNOLOGIES

The invention of the present specification operates in conjunction with a technical platform and/or related technologies, including technologies and embodiments thereof which have or may have separate and independent inventiveness and patentability. The following is a description of the technical platform and/or related technologies, including a description of terminology and description of some embodiments of the technical platform and/or related technologies.

Some parts of the description of the technical platform and/or related technologies may comprise and/or contribute to embodiments of the present invention.

Some parts of the description of the technical platform and/or related technologies may comprise and/or contribute to separately patentable inventions or embodiments of those separately patentable inventions.

The description of the technical platform and/or related technologies should not be taken as admission of prior art.

Digital Transaction Processing Unit (DTPU)

The term Digital Transaction Processing Unit (DTPU) is used in the present specification to indicate a broad range of Secure Elements (SEs) suitable for different embodiments of the present invention and in embodiments of its related technologies.

In embodiments of the present invention and/or in embodiments of its related technologies, the DTPU is configured to host, operate with and/or engage in digital transactions using at least one of a payment Personalized Digital Transaction Package (PDTP) and a non-payment PDTP. However, the description of the present invention focuses mostly on embodiments for payment PDTPs and related operations and configurations. Payment PDTPs include, for example, credit card PDTPs, debit card PDTPs, gift card PDTPs, and travel card PDTPs. Non-payment PDTPs include, for example, passport PDTPs, age verification document PDTPs, and ID PDTPs.

In embodiments of the present invention and/or in embodiments of its related technologies, the DTPU is a finance card SE (sometimes referred to as an EMV chip). In other embodiments of the present invention and/or in other embodiments of its related technologies, the DTPU is a UICC or an embedded UICC (eUICC). In yet other embodiments of the present invention and/or in yet other embodiments of its related technologies, the DTPU is an eSE. In yet other embodiments of the present invention and/or in yet other embodiments of its related technologies, the DTPU is an Integrated Secure Element (ISE). In further embodiments of the present invention and/or in further embodiments of its related technologies, the DTPU is implemented on a SIM. In yet further embodiments of the present invention and/or in yet further embodiments of its related technologies, the DTPU is implemented on a smart microSD.

It will be understood that, the form of the DPD will render some forms of the DTPU as being more appropriate than others for that DPD. In embodiments of the present invention and/or in embodiments of its related technologies, the DTPU is modified to suit the form of the DPD. In embodiments of the present invention and/or in embodiments of its related technologies, the DTPU is a modified or repurposed traditional finance card SE or EMV chip, configured to host more than one DTP/PDTP, wherein each DTP/PDTP has associated one or more transaction applications.

In embodiments of the present invention and/or in embodiments of its related technologies, the DTPU is operable to host at least one DTP/PDTP (and its associated one or more transaction applications) which are EMVCo standards compliant. Typically, transaction applications which are EMVCo standards compliant are payment applications (accordingly, the DTP/PDTP is a payment DTP/PDTP).

In embodiments of the present invention and/or in embodiments of its related technologies, the DTPU is configured to host an operating system. In some such embodiments of the present invention and/or in some such embodiments of its related technologies, the operating system is GlobalPlaform (GP) standards compliant. In some such embodiments of the present invention and/or in some such embodiments of its related technologies, the operating system is JavaCard, which is GP standards compliant. In other such embodiments of the present invention and/or in other such embodiments of its related technologies, the operating system is MULTOS compliant. In some embodiments of the present invention and/or in some embodiments of its related technologies, the DTPU (along with other components of the DPD) is compliant with GP Card Specification.

In embodiments of the present invention and/or in embodiments of its related technologies, the DTPU is compliant with Payment Card Industry (PCI) standards. In other embodiments of the present invention and/or in other embodiments of its related technologies, the DTPU is compliant with a Common Criteria (CC) protection profile.

In embodiments of the present invention and/or in embodiments of its related technologies, the DTPU is operable to host at least one DTP/PDTP (and its associated one or more transaction applications) which are EMVCo standards compliant, and the DTPU is configured to host an operating system which is GP standards compliant and/or JavaCard compliant. In other embodiments of the present invention and/or in other embodiments of its related technologies, the DTPU is operable to host at least one DTP/PDTP (and its associated one or more transaction applications) which are EMVCo standards compliant, and the DTPU is configured to host an operating system which is MULTOS standards compliant.

In embodiments of the present invention and/or in embodiments of its related technologies, a DTPU is operable for at least one of contact digital transactions and contactless digital transactions.

In yet other embodiments of the present invention and/or in yet other embodiments of its related technologies, the DTPU is a Universal Integrated Circuit Card (UICC) type chip or an eSE type chip (as typically used in mobile phones), wherein the DPD (particularly where the DPD is a DTC) and UICC/eSE are adapted so that the DTC (or, more generally, the DPD where appropriate) with UICC/eSE is capable of performing contactless and/or contact transactions. In some such embodiments of the present invention and/or in some such embodiments of its related technologies, the DTC (or, more generally, the DPD where appropriate) is provided with components allowing the UICC/eSE to conduct contact transactions, such as external contact pads for contacting respective pads in a DTD for communication between the DTPU and the DTD, and the DTC (or, more generally, the DPD where appropriate) is provided with a chip and one or more antennae, or a chip with one or more antennae, allowing the UICC/eSE to conduct contactless transactions. In some such embodiments of the present invention and/or in some such embodiments of its related technologies, the chip is an external NFC chip that is operable for card emulation mode, and may be a CLF (contactless front end), wherein the CLF and eSE/UICC communicate via an SWP connection. In other embodiments of the present invention and/or in other embodiments of its related technologies, a UICC/eSE requires an MCU to operate with an NFC chip to cause the DTC (or, more generally, the DPD where appropriate) to operate in (card) emulation mode. In some such embodiments of the present invention and/or in some such embodiments of its related technologies, the NFC chip includes an antenna. In yet other such embodiments of the present invention and/or in yet other such embodiments of its related technologies, the DPD includes a Secure Processing Module (SPM) which is a fully integrated one module solution for effecting communications between the DTPU and externally of the DTPU, for example, via NFC and/or via the contact pads. In yet further such embodiments of the present invention and/or in yet further such embodiments of its related technologies, the SPM is a MCU within a SE. In yet other such embodiments of the present invention and/or in yet other such embodiments of its related technologies, the SPM is a single chip including a SE, a Low-Power MCU, and a Power Management IC.

In embodiments of the present invention and/or in embodiments of its related technologies, for contact transactions, the DPD is provided with components such as contact pads for contacting respective electrodes in a DTD for communication between the DTPU and the DTD. In some such embodiments of the present invention and/or in some such embodiments of its related technologies, the contact pads and/or their arrangement on the DPD is ISO7816-2 compliant. In some such embodiments of the present invention and/or in some such embodiments of its related technologies, a DPD with contact pads for contact transactions is a DTC. In some such embodiments of the present invention and/or in some such embodiments of its related technologies, the DTC has a form substantially equivalent to a traditional credit/debit card form. In some such embodiments of the present invention and/or in some such embodiments of its related technologies, the DTC includes 6 contact pads. In some other such embodiments of the present invention and/or in some other such embodiments of its related technologies, the DTC includes 8 contact pads.

In embodiments of the present invention and/or in embodiments of its related technologies, for contactless transactions, the DPD is provided with components such as a chip and an antenna (or a chip with an antenna) for communication with respective antennae in DTDs. In some such embodiments of the present invention and/or in some such embodiments of its related technologies, the UICC/eSE is adjusted for the form factor of a physical card, including modifying the height of the UICC/eSE.

In embodiments of the present invention and/or in embodiments of its related technologies, a DTPU can be provided to a cardholder in a selected lifecycle state. In some such embodiments of the present invention and/or in some such embodiments of its related technologies, the life cycle states include: INITIALIZED, SECURED, CARD_LOCKED, and TERMINATED. In some such embodiments of the present invention and/or in some such embodiments of its related technologies, the DTPU is operable for the application lifecycle state of LOCKED. In embodiments of the present invention and/or in embodiments of its related technologies, the DTPU is operable to execute commands, including any one or more of: SELECT, INITIALIZE UPDATE, EXTERNAL AUTHENTICATE, STORE DATA, OP READY. In embodiments of the present invention and/or in embodiments of its related technologies, the DTPU (in a DPD) is provided in OP_READY state. In some such embodiments of the present invention and/or in some such embodiments of its related technologies, the DTPU is provided in OP_READY state to the card user. In other embodiments of the present invention and/or in other embodiments of its related technologies, the DTPU (in a DPD) is provided in INITIALIZED state. In yet other embodiments of the present invention and/or in yet other embodiments of its related technologies, the DTPU (in a DPD) is provided in SECURED state. In further embodiments of the present invention and/or in further embodiments of its related technologies, the DTPU (in a DPD) is provided in CARD_LOCKED state, wherein it can be selectively reverted to SECURED state and returned to CARD_LOCKED state, as operations require.

In embodiments of the present invention and/or in embodiments of its related technologies, the DTPU includes sufficient memory (for example, user memory) to allow installation of an application selection module, at least one payment scheme container, and one or more DTPs/PDTPs per payment scheme container. In some such embodiments of the present invention and/or in some such embodiments of its related technologies, the application selection module includes a PSE (or contact transaction) selection application and/or a PPSE (or contactless transaction) selection application. In some such embodiments of the present invention and/or in some such embodiments of its related technologies, the application selection module is operable for functions additional to and/or different from functions of traditional PSE and/or PPSE applications. In some such embodiments of the present invention and/or in some such embodiments of its related technologies, the application selection module is installed on the DTPU, wherein the DTPU has existing PSE and/or PPSE applications, such that the application selection module overwrites the existing PSE and/or PPSE applications. In some other such embodiments of the present invention and/or in some other such embodiments of its related technologies, the application selection module replaces the existing PSE and/or PPSE applications. In yet some other such embodiments of the present invention and/or in yet some other such embodiments of its related technologies, the application selection module is adapted to co-exist on the DTPU with existing PSE and/or PPSE applications, wherein the application selection module has a higher priority than the existing PSE and/or PPSE applications. In some such embodiments of the present invention and/or in some such embodiments of its related technologies, the application selection module is installed on the DTPU, where the application selection module is adapted to co-exist on the DTPU with existing PSE and/or PPSE applications, the application selection module has different application identifiers (AIDs) for its applications from the application identifiers of existing (including existing standard) PSE and/or PPSE applications.

In embodiments of the present invention and/or in embodiments of its related technologies, the DTPU is operable to accept provisioning (remotely or locally) from a Trusted Service Manager (TSM). In some such embodiments of the present invention and/or in some such embodiments of its related technologies, the TSM is in a provisioning network. In some such embodiments of the present invention and/or in some such embodiments of its related technologies, the TSM provisioning may be operated synchronously, asynchronously or selectively both synchronously and asynchronously for communications between the TSM and the DTPU.

In embodiments of the present invention and/or in embodiments of its related technologies, the DTPU is operable to accept provisioning (remotely or locally) from a Token Service Provider (TSP). In some such embodiments of the present invention and/or in some such embodiments of its related technologies, the TSP is in a provisioning network. In some such embodiments of the present invention and/or in some such embodiments of its related technologies, the TSP provisioning may be operated synchronously, asynchronously or selectively both synchronously and asynchronously for communications between the TSP and the DTPU.

In embodiments of the present invention and/or in embodiments of its related technologies, the DTPU is operable to accept provisioning (remotely or locally) from a SEMS service. In some such embodiments of the present invention and/or in some such embodiments of its related technologies, the SEMS is in a provisioning network. In embodiments of the present invention and/or in embodiments of its related technologies, the DTPU is operable with either one or both of an NXP SEMS service (loader service) and a GP SEMS service.

In yet other embodiments of the present invention and/or in yet other embodiments of its related technologies, the DTPU is operable to accept provisioning from:
  a hybrid TSM/SEMS service in a provisioning network, wherein the provisioning of data to the DTPU from the provisioning network is from either or both the TSM and SEMS service;
  and/or a hybrid TSP/SEMS service in a provisioning network, wherein the provisioning of data to the DTPU from the provisioning network is from either or both the TSP and SEMS service;
  and/or a hybrid TSM/TSP service in a provisioning network, wherein the provisioning of data to the DTPU from the provisioning network is from either or both the TSM and TSP service;
  and/or a hybrid TSM/TSP/SEMS service in a provisioning network, wherein the provisioning of data to the DTPU from the provisioning network is from any one or more of the TSM, the TSP and the SEMS service.

In embodiments of the present invention and/or in embodiments of its related technologies, where provisioning to the DTPU is from a TSP, the TSP provides only one tokenized PAN for personalizing a DTP to be a PDTP. It will be understood that, traditionally, TSPs were configured to provide a number of tokenized PANs to substitute for a primary PAN. However, in some such embodiments of the present invention and/or in some such embodiments of its related technologies, the tokenized PAN does not substitute for a primary PAN in the personalization of the DTP, but may be seen as being the primary PAN for the personalization of the DTP to become the PDTP.

In other embodiments of the present invention and/or in other embodiments of its related technologies, the DTPU is configured to host one or more PDTPs each associated with two or more transaction applications, and in which each transaction application is personalized with a different tokenized primary identifier (for payment transaction applications, the tokenized primary identifier is a tokenized Personal Account Number or tokenized PAN). In such embodiments of the present invention and/or in such embodiments of its related technologies, a PDTP with tokenized transaction applications may be referred to as a tokenized PDTP. In such embodiments of the present invention and/or in such embodiments of its related technologies for transaction applications, each tokenized primary identifier (or tokenized PAN) is provided by a TSP during personalization of the transaction application. In some such embodiments, the two or more tokenized PANs are provided by the TSP during personalization of the DTP. In some such embodiments of the present invention and/or in some such embodiments of its related technologies, the DTPU is configured to automatically select one of the associated tokenized PDTP transaction applications for the PDTP when the PDTP is selected to be the active PDTP of the DPD. In some such embodiments, the automatic selection is random or pseudo-random from the range of two or more tokenized PDTP transaction applications. In other such embodiments, the selection is based on a pre-set order of the tokenized transaction applications in the range of two or more tokenized transaction applications. In some such embodiments of the present invention and/or in some such embodiments of its related technologies, at least one of the two or more transaction applications is personalized with a primary identifier, and the remainder of the two or more transaction applications are personalized with tokenized primary identifier.

It should be appreciated that, in embodiments of the present invention and/or in embodiments of its related technologies, where tokenized transaction applications are used, such may provide for enhanced privacy and/or security as, for example with payment transaction applications, the actual PAN of the transaction application (or the PAN of the associated PDTP and associated personality) is not revealed for a digital transaction. In some such embodiments of the present invention and/or in some such embodiments of its related technologies, the graphical display of the DPD (where optionally having a graphical display) may display only the PAN for the selected token personalized transaction application from the selected tokenized PDTP, but not display the primary PAN of that tokenized PDTP.

In embodiments of the present invention and/or in embodiments of its related technologies, some forms of DPD will not be appropriate for contact transactions (such as wearable devices), and so the DTPU may be restricted to contactless or over-the-Internet digital transactions (for example, payment digital transactions).

In embodiments of the present invention and/or in embodiments of its related technologies, the DTPU is operable to host a plurality of PDTPs. In some such embodiments of the present invention and/or in some such embodiments of its related technologies, the DTPU is provided on the DPD without hosting any PDTPs. In some such embodiments, the DPD with DTPU hosting no PDTPs is provided to a third-party, such as a bank or a card issuer, and the bank or card issuer provides one or more PDTPs for the DTPU to host before being provided to a cardholder for use. In other such embodiments, the DPD with DTPU hosting no PDTPs is provided to a cardholder, and the cardholder may optionally have provisioned one or more DTPs/PDTPs from a remote provisioning network or agent for installation on the DTPU. In further such embodiments, the cardholder may receive a DPD for which the DTPU already hosts one or more PDTPs, and the cardholder may optionally have provisioned one or more further DTPs/PDTPs from a remote provisioning network or agent for installation on the DTPU.

In embodiments of the present invention and/or in embodiments of its related technologies, the DTPU is operable to accept for loading (or installation) one or more containers, each associated with a payment scheme. In some such embodiments of the present invention and/or in some such embodiments of its related technologies, the installation of the one or more containers is able to be effected when the DTPU (and the DPD) is remote from the provisioning agent providing the one or more containers.

In embodiments of the present invention and/or in embodiments of its related technologies, installing a DTP/PDTP on the DTPU includes instantiating one or more transaction applications associated with the DTP/PDTP on the DTPU, where the one or more transaction applications are associated with a container on the DTPU. In some such embodiments of the present invention and/or in some such embodiments of its related technologies, the container provides functions required by the one or more transaction applications for effecting digital transactions.

Digital Payment Device (DPD)

In embodiments of the present invention and/or in embodiments of its related technologies, a Digital Payment Device (DPD) is any device operable with a DTPU (and typically incorporating the DTPU) for digital transactions. Although the term DPD includes the term "Payment", in embodiments of the present invention and/or in embodiments of its related technologies, a DPD may be used for both payment digital transactions and non-payment digital transactions.

In embodiments of the present invention and/or in embodiments of its related technologies, the DPD includes infrastructure for allowing provisioning to the DTPU from a provisioning network. In some such embodiments of the present invention and/or in some such embodiments of its related technologies, the DPD includes infrastructure for allowing provisioning to the DTPU from a provisioning network when the DPD (and the DTPU) is remote from the provisioning network.

In embodiments of the present invention and/or in embodiments of its related technologies, the DPD is a Digital Transaction Card (DTC) having the form of or a form like a traditional credit or debit card. DTCs (in card form) are typically operable for both contact and contactless transactions with a DTD, as well as over-the-Internet type transactions.

In embodiments of the present invention and/or in embodiments of its related technologies, the DPD has the form of a wearable device, such as a ring, a watch, a bracelet, or a necklace. Typically, such devices are not operable for contact payment transactions, and are operable only for contactless transactions with a DTD or over-the-Internet (card-not-present) type transactions.

In other embodiments of the present invention and/or in other embodiments of its related technologies, the DPD is a non-portable device, such as a fridge, a dishwasher, a washing machine, and other non-portable equipment. In some such embodiments of the present invention and/or in some such embodiments of its related technologies, the DPD is incorporated in the device. In other such embodiments of the present invention and/or in other such embodiments of its related technologies, the DPD is external to or remote from the device, but linked to the device. In some such embodiments of the present invention and/or in some such embodiments of its related technologies, the DPD may be a payment device with a card-form (or partial card-form) part which is linked to the non-portable device with a communication cable, wherein the card-form is operable to be inserted (dipped) into a DTD for a contact payment. However, typically, such devices are not operable for contact payment transactions, and are operable only for contactless transactions with a DTD or over-the-Internet type transactions.

In yet other embodiments of the present invention and/or in yet other embodiments of its related technologies, a DPD is incorporated into a vehicle or is a tag for placement in a vehicle. Typically, such devices are not operable for contact payment transactions, and are operable only for contactless transactions with a DTD or over-the-Internet (card-not-present) type transactions.

In some embodiments of the present invention and/or in some embodiments of its related technologies, the DPD includes both a DTPU and a magnetic stripe for holding information (this would typically be for such embodiments where the DPD is a DTC). In some embodiments of the present invention and/or in some embodiments of its related technologies, the magnetic stripe is a dynamic magnetic stripe.

In other embodiments of the present invention and/or in other embodiments of its related technologies, the DPD includes a user interface operable to control operations of the DPD (including one or more components of the DPD, such as operations of the DTPU). In some such embodiments of the present invention and/or in some such embodiments of its related technologies, the user interface includes one or more buttons which a user can press to activate operations assigned to the one or more buttons.

In yet other embodiments of the present invention and/or in yet other embodiments of its related technologies, the user interface includes a Graphical User Interface (GUI). The GUI may be a screen with low power consumption, such as an electronic paper display. In other such embodiments of the present invention and/or in other such embodiments of its related technologies, the GUI may be provided by an LCD display (including a segment display and/or an active matrix display). In yet other such embodiments of the present invention and/or in yet other such embodiments of its related technologies, the GUI is adapted to display a logo or mark (including a trademark) of a payment scheme associated with a personality selected as the operating personality of the DPD. In this regard, the GUI may be adapted to display multiple different logos or marks, with the displayed logo or mark changed to match the payment scheme associated with the personality selected to be the operating personality of the DPD. In yet other embodiments of the present invention and/or in yet other embodiments of its related technologies, the user interface includes a slide sensor (or touch sensor) for sensing the slide of a user's finger across the slide sensor to effect a selected operation on the DPD. In yet other embodiments of the present invention and/or in yet other embodiments of its related technologies, the user interface includes a touchscreen display in addition to or instead of a keypad.

In embodiments of the present invention and/or in embodiments of its related technologies, the user interface is operable for a user to select one personality from the DPD (or select one PDTP on the DTPU) from amongst a plurality of personalities from the DPD (or plurality of PDTPs on the DTPU).

In this specification, many embodiments and variations of the invention and/or embodiments of its related technologies are described with a DTC as the DPD. However, it will be understood that, in many such embodiments, the description applies to any form of DPD.

In embodiments of the present invention and/or in embodiments of its related technologies, the DPD includes a receiver for receiving wireless communications. In embodiments of the present invention and/or in embodiments of its related technologies, the DPD includes a transmitter for transmitting wireless communications. In some embodiments of the present invention and/or in some embodiments of its related technologies, the DPD includes a transmitter coupled with the receiver. This may be referred to as the transceiver. In some such embodiments of the present invention and/or in some such embodiments of its related technologies, the transceiver is (or the transmitter and/or the receiver are) adapted to implement Bluetooth communication protocols. In other such embodiments of the present invention and/or in other such embodiments of its related technologies, the transceiver is (or the transmitter and/or the receiver are) adapted to implement WiFi communication protocols. In yet other such embodiments of the present invention and/or in yet other such embodiments of its related technologies, the transceiver is (or the transmitter and/or the receiver are) adapted to implement Zigbee communication protocols. In yet other such embodiments of the present invention and/or in yet other such embodiments of its related technologies, the transceiver is (or the transmitter and/or the receiver are) adapted to implement NFC communication protocols. In further such embodiments of the present invention and/or in further such embodiments of its related technologies, the transceiver is (or the transmitter and/or the receiver are) adapted to implement two or more different communication protocols.

In embodiments of the present invention and/or in embodiments of its related technologies, the DPD is operable to link with a DAD for intercommunication. In some such embodiments of the present invention and/or in some such embodiments of its related technologies, the link between the DPD and the DAD is via Bluetooth or BLE. In other such embodiments of the present invention and/or in other such embodiments of its related technologies, the link between the DPD and the DAD is via WiFi. In some such embodiments of the present invention and/or in some such embodiments of its related technologies, the link between the DPD and the DAD allows communication between the DPD and at least one provisioning agent from one or more provisioning agents in a provisioning network, when the DAD is linked to the at least one provisioning agent for intercommunication. In some such embodiments of the present invention and/or in some such embodiments of its related technologies, the provisioning agent is a DPD manager.

In embodiments of the present invention and/or in embodiments of its related technologies, the DPD is operable to link to at least one provisioning agent from one or more provisioning agents in a provisioning network for intercommunication. In some such embodiments of the present invention and/or in some such embodiments of its related technologies, the link between the DPD and the at least one provisioning agent is via the internet using a WiFi transceiver on the DPD. In some such embodiments of the present invention and/or in some such embodiments of its related technologies, the provisioning agent is a DPD manager. In some other such embodiments of the present invention and/or in some other such embodiments of its related technologies, the DPD is operable to communicate with the DPD manager via a DPD manager gateway, the DPD manager gateway providing an interface for communication between components of the DPD manager and the DPD. In some further such embodiments of the present invention and/or in some further such embodiments of its related technologies, the communication between the DPD manager and the DPD is a secure communication link. In yet other such embodiments of the present invention and/or in yet other such embodiments of its related technologies, the secure communication link employs Transport Layer Security (TLS). In some such embodiments of the present invention and/or in some such embodiments of its related technologies, the secure communication link employs any one or more of Secure Channel Protocols, including: SCP02 and SCP03. In some such embodiments of the present invention and/or in some such embodiments of its related technologies, the secure communication link employs SEMS security certificates for securing the link. In yet other such embodiments of the present invention and/or in yet other such embodiments of its related technologies, the secure communication link employs two or more security layers. In some such embodiments of the present invention and/or in some such embodiments of its related technologies, wherein one layer employs data encryption, including any one or more of SCP02 (in embodiments, using SCP02 i=55 setting), SCP03 (in embodiments, using AES encryption), and wherein another layer employs Transport Layer Encryption (TLS), (for internet TCP/IP), which, in some embodiments, uses AES.

In embodiments of the present invention and/or in embodiments of its related technologies, the DPD includes an energy storage device. In some such embodiments of the present invention and/or in some such embodiments of its related technologies, the energy storage device includes one or more batteries. In some such embodiments of the present invention and/or in some such embodiments of its related technologies, in DPDs which have the form of a DTC, such batteries are flat form batteries. In some such embodiments of the present invention and/or in some such embodiments of its related technologies, the battery is a flexible, printable and thin-type battery. In other such embodiments of the present invention and/or in other such embodiments of its related technologies, the energy storage device includes one or more capacitors, and may include one or more super capacitors. In yet other such embodiments of the present invention and/or in yet other such embodiments of its related technologies, the energy storage device includes a combination of one or more batteries and one or more capacitors. In some such embodiments of the present invention and/or in some such embodiments of its related technologies, at least one of the one or more batteries is a primary battery. In some such embodiments of the present invention and/or in some such embodiments of its related technologies, at least one of the one or more batteries is a rechargeable battery. In some such embodiments of the present invention and/or in some such embodiments of its related technologies, the DPD is operable to recharge the at least one rechargeable battery using energy harvesting, including energy harvesting from a DTD during a digital transaction with the DTD.

In embodiments of the present invention and/or in embodiments of its related technologies, where the DPD includes contact pads, the contact pads comply with standards for contact pads on traditional credit and/or debit cards. As such, SEs on physical cards (such as credit and debit cards) typically use contact pads on the surface of the card for data transfer between the SE and a DTD in a payment/transaction network. Each contact plate has a number of pads for electrical signal (data) connection with corresponding electrodes in a DTD or other device. The configuration and operation of many such contact pads is governed by a standard ISO/IEC 7816, which uses pads including: VCC, RESET, CLOCK, GROUND, and DATA pads to exchange APDU commands between a DTD and the DTPU of the DPD. As such, there are some pads not used for such interactions, including pads #4 and #8. Pads #4 and #8 (or the data connection channels between those pads and the DTPU) are available to be used in the present invention and related technologies of the present invention for data transfer between components on the DPD and externally of the DPD. For example, pads #4 and #8 (or the data connection channels between those pads and the DTPU) can be used for data communication between the MCU and externally of the DPD. For example, in some such embodiments, the MCU can be supplied with digital objects (including scripts, metadata and other on-DPD files) from a DTD into which the DPD has been dipped or inserted.

Digital Transaction Card (DTC)

In embodiments of the present invention and/or in embodiments of its related technologies, the DPD is a Digital Transaction Card (DTC). In some such embodiments of the present invention and/or in some such embodiments of its related technologies, the DPD (or DTC) has a card form, and is adapted for insertion (dipping) into DTDs. In some such embodiments of the present invention and/or in some such embodiments of its related technologies, the DPD (or DTC) has a card form, and is adapted for wireless (contactless) digital transactions with a DTD. In some such embodiments of the present invention and/or in some such embodiments of its related technologies, the DTC has a traditional card form, such as a traditional credit card or debit card.

Micro Controller Unit (MCU)

In embodiments of the present invention and/or in embodiments of its related technologies, the DPD of the present invention has a Micro Controller Unit (MCU) which controls various components of the DPD, such as a user interface, buttons of the user interface, a graphical display of the user interface, a secure memory (for example, an OSE), a communications module (including, for example, Bluetooth and/or WiFi communications) and other components. In some such embodiments of the present invention and/or in some such embodiments of its related technologies, the MCU may also control select operations of the DTPU.

In embodiments of the present invention and/or in embodiments of its related technologies, the MCU is operable to receive signals from the user interface of the DPD (including signals from buttons or other user input devices) to effect operations on the DPD. For example, when a user of the DPD wishes to change the operating personality of the DPD, the user presses the required button(s) on the DPD to effect such change, and the button(s) send signals to the MCU, which is operable to initiate actions on the DPD to change the operating personality, including (not necessarily in this order) updating one or more registries on the DPD (including a MCU registry), locking all transaction applications (via an MCU-managed operation of the OSE and the DTPU), unlocking at least one of the one or more transaction applications in the PDTP associated with the selected personality (via an MCU-managed operation of the OSE and the DTPU), updating the one or more selection applications in the application selection module (via an MCU-managed operation of the OSE and the DTPU), and displaying appropriate indicators of the now operating personality of the DPD via the user interface (the graphical user interface).

In embodiments of the present invention and/or in embodiments of its related technologies, the MCU is compliant with any one or more of the following certifications, protocols and/or standards: CC PP-0084 EAL4+ and AVA_VAN.5 (it will be appreciated that such a MCU may be considered an SE). In some such embodiments of the present invention and/or in some such embodiments of its related technologies, the compliance is required for storage and/or operation with data objects having a required level of security, such as cryptographic keys and scripts.

In embodiments of the present invention and/or in embodiments of its related technologies, the MCU operates with low power consumption to assist in providing longer battery life for the DPD (if having an optional battery). In embodiments of the present invention and/or in embodiments of its related technologies, the MCU is operable to accept provisioning from one or more of a DPD manager, a TSM, and a TSP (synchronously, asynchronously or selectively both synchronously and asynchronously). In some embodiments of the present invention and/or in some embodiments of its related technologies, the MCU is operable with a SEMS service to accept provisioning. In some such embodiments of the present invention and/or in some such embodiments of its related technologies, the MCU is operable with either one or both of an NXP SEMS service (loader service) and a GP SEMS service to accept provisioning.

In some such embodiments of the present invention and/or in some such embodiments of its related technologies, the MCU is linked for communication with the DTPU. In some such embodiments of the present invention and/or in some such embodiments of its related technologies, the MCU includes one or more communication pathways which are linked to respective communication pathways between the DTPU and the contact pads of the DPD (or DTC). In some such embodiments of the present invention and/or in some such embodiments of its related technologies, the communication pathways between the DTPU and the contact pads of the DPD (or DTC) include any one or more of: 1. VCC, 2. RESET, 3. CLOCK, 5. GROUND, and 7. DATA (as per ISO/IE 7816 standards).

In embodiments of the present invention and/or in embodiments of its related technologies, the MCU is linked for communication externally of the DPD (or DTC) via contact pads of the DPD (or DTC). In some such embodiments of the present invention and/or in some such embodiments of its related technologies, the MCU is linked for external communication via contact pads not used by the DTPU. In some such embodiments of the present invention and/or in some such embodiments of its related technologies, the MCU is linked for external communication via any one or more of: contact pad 4 and contact pad 8 (as per ISO/IE 7816 standards).

In embodiments of the present invention and/or in embodiments of its related technologies, where the MCU is enabled for communication externally of the DPD (or DTC) using contact pads of the DPD (or DTC), the MCU is enabled to accept provisioning when the DPD (or DTC) is proximal to (and in physical contact with) a provisioning source. In some such embodiments of the present invention and/or in some such embodiments of its related technologies, the provisioning source is a DTD, and the DPD (or DTC) is inserted (or dipped) into the DTD, wherein the DTD is enabled to provide digital objects to the MCU. In some such embodiments of the present invention and/or in some such embodiments of its related technologies, the provisioning source is located at a lamination facility or some other such card manufacture facility, wherein the DPD (or DTC) is brought into contact with the provisioning source (that is, the respective contact pads, such as contact pad 4 and contact pad 8 (as per ISO/IE 7816 standards) are brought into contact with corresponding electrodes), such that the provisioning source is enabled to provide digital objects to the MCU. In some such embodiments of the present invention and/or in some such embodiments of its related technologies, the digital objects include any one or more of: one or more scripts (including encrypted and unencrypted scripts), metadata related to one or more DTPs/PDTPs for the DTPU, MCU firmware, firmware for other DPD components, and other DPD files.

In embodiments of the present invention and/or in embodiments of its related technologies, the MCU is operable to securely store one or more scripts for execution on the DTPU, including one or more scripts capable of being authenticated by an SSD on the DTPU. In other embodiments of the present invention and/or in other embodiments of its related technologies, the MCU is operable to securely store one or more script templates, the one or more script templates, each when written with further data, operable for execution on the DTPU. In some such embodiments of the present invention and/or in some such embodiments of its related technologies, the MCU is operable to securely store one or more cryptographic keys, each cryptographic key for encrypting (signing) a script or a script template (when written with further data) such that the script or script template (when written with further data) is authenticatable by an SSD for execution on the DTPU.

In embodiments of the present invention and/or in embodiments of its related technologies, the MCU is operable to receive from the DTPU one or more sequence counter values (sometimes referred to as counters) from one or more respective security domains (for example, SSDs). In some such embodiments of the present invention and/or in some such embodiments of its related technologies, the MCU is operable to request the one or more sequence counter values from the DTPU. In some such embodiments of the present invention and/or in some such embodiments of its related technologies, the MCU is operable to store one or more scripts to request the one or more sequence counter values from the DTPU. In some such embodiments of the present invention and/or in some such embodiments of its related technologies, the MCU is operable to store one or more sequence counter value scripts and/or commands, wherein each script and/or command is sent to the OSE, such that the OSE provides a sequence counter value request script and/or command to the MCU, which the MCU sends to the DTPU to retrieve a sequence counter value for supply back to the MCU. In some such embodiments of the present invention and/or in some such embodiments of its related technologies, each of the one or more sequence counter value commands is an unauthenticated command. In other embodiments of the present invention and/or in other embodiments of its related technologies, the MCU stores the one or more sequence counter value scripts and/or commands, in which circumstance the MCU does not need to retrieve these scripts and/or commands from the OSE.

In embodiments of the present invention and/or in embodiments of its related technologies, the MCU is secured for storage and operation with scripts, script templates, and cryptographic keys. In some such embodiments of the present invention and/or in some such embodiments of its related technologies, the MCU is in (or operates in) compliance with one or more GP standards and/or Common Criteria.

In other embodiments of the present invention and/or in other embodiments of its related technologies, the MCU is operable to receive from an OSE one or more scripts, which the MCU sends to the DTPU for execution. In yet other embodiments of the present invention and/or in yet other embodiments of its related technologies, the MCU is operable to receive from an OSE one or more encrypted scripts, which the MCU sends to an application under an SSD of the DTPU, wherein the one or more encrypted scripts are authenticatable to the SSD. In some such embodiments of the present invention and/or in some such embodiments of its related technologies, the MCU is further operable to request one or more scripts from the OSE, the scripts for execution on the DTPU for an application under an SSD. In some such embodiments of the present invention and/or in some such embodiments of its related technologies, the MCU is operable to pass parameters to the OSE such that the OSE can write data to one or more template scripts. In some other embodiments of the present invention and/or in some other embodiments of its related technologies, the OSE is within the MCU. In further embodiments of the present invention and/or in further embodiments of its related technologies, the MCU and the DTPU are within a single Integrated Circuit Chip (ICC). In yet other embodiments of the present invention and/or in yet other embodiments of its related technologies, the MCU, the OSE and the DTPU are within a single Integrated Circuit Chip (ICC). In some such embodiments of the present invention and/or in some such embodiments of its related technologies, the ICC includes a firewall for preventing unauthorized communications between the MCU and the DTPU. In other such embodiments of the present invention and/or in other such embodiments of its related technologies, the ICC includes a firewall for preventing unauthorized communications between the MCU, the OSE and the DTPU.

In embodiments of the present invention and/or in embodiments of its related technologies, the MCU is operable as a proxy for secure communication between one or more provisioning agents in a provisioning network and the DTPU. In some such embodiments of the present invention and/or in some such embodiments of its related technologies, the secure communication includes communication using secure protocols, including any one or more of SCP02, SCP03, and other similar and/or related secure communication protocols. In some such embodiments of the present invention and/or in some such embodiments of its related technologies, the secure communication protocol includes using SCP02 i=55.

In some such embodiments of the present invention and/or in some such embodiments of its related technologies, where the MCU is operable as a proxy, the MCU is operable to receive digital objects, including encrypted scripts, from one or more provisioning agents in a provisioning network on a secure communication channel between the MCU and the one or more provisioning agents where the digital objects have been encrypted using SCP02 i=55. In some such embodiments of the present invention and/or in some such embodiments of its related technologies, the MCU, having received digital object encrypted using SCP02 i=55, is operable to retain the received digital objects after the secure communication channel is disconnected, the MCU is further operable to send the digital objects to the DTPU for execution.

In embodiments of the present invention and/or in embodiments of its related technologies, the MCU includes a MCU registry for storage of metadata, wherein the metadata is data related to one or more personalities hosted on the DPD (each personality associated with a DTP/PDTP hosted on the DTPU). In some such embodiments of the present invention and/or in some such embodiments of its related technologies, the MCU registry includes one or more tables of metadata. In some such embodiments of the present invention and/or in some such embodiments of its related technologies, a first MCU registry metadata table includes columns for one or more of:

- an address (being a reference for a pointer to a memory location in the MCU) for each entry in the table;
- a personality index (an index for facilitating reference to each personality on the DPD, each personality being associated with a DTP/PDTP hosted in the DTPU);
- a personality identifier (for payment card personalities, this will be a PAN, including its Issuer Identification Number (IIN));
- a payment scheme name for each personality (where the personality is for a payment card or the like);
- an issuer name for each personality;

an expiry date for each personality;
a nickname for each personality;
a CVV for each transaction application in a PDTP associated with a personality (where the personality is for a payment card or the like);
a logo index for each personality (a reference to a logo to be displayed on the DPD for each personality when it is the active personality of the DPD);
a holder name for the personality (for payment cards or the like, this is typically referred to as a cardholder name);
a personality activation state, which shows the present state of each personality (this may use the following codes: 0: deactivated on all interfaces (contact and contactless), 1: activated on contact interface, 2: activated on contactless interface 3: activated on both contact and contactless interfaces);
a default personality activation state, showing what the default state of activation for each personality should be in prescribed circumstances, such as if the personality activation state is somehow lost (this may use the following codes: 0: not default for both contact and contactless interfaces, 1: default for contact interface, 2: default for contactless interface, 3: default for both contact and contactless interfaces);
a flag to indicate if the activation state/default activation state of each personality has been changed; and
a head of AID list (being the address of the first AID for one or more AIDs associated with transactions applications associated to the DTP).

In some such embodiments of the present invention and/or in some such embodiments of its related technologies, a second MCU registry metadata table includes columns for one or more of:
an address (being a reference for a pointer to a memory location in the MCU) for each entry in the table;
an address for the next AID;
an address for the associated (owning) personality;
an interface code (including 0: none (neither contact nor contactless interfaces), 1: contact interface, 2: contactless interface, 3: both contact and contactless interfaces);
an activation state (this may use the following codes: 0: deactivated on all interfaces (contact and contactless), 1: activated on contact interface, 2: activated on contactless interface 3: activated on both contact and contactless interfaces).

In other such embodiments of the present invention and/or in other such embodiments of its related technologies, where each personality includes two or more transaction types, the MCU first registry metadata table includes columns for one or more of:
a head of transaction type list (being the address of the first AID for two or more AIDs each associated with a transactions application for a transaction type associated to the personality, wherein each transaction application associated to a DTP/PDTP hosted on the DTPU).

In some such embodiments of the present invention and/or in some such embodiments of its related technologies, where each personality includes two or more transaction types, a further MCU registry metadata table includes columns for one or more of:
an address (being a reference for a pointer to a memory location in the MCU) for each entry in the table;
an address for the next AID;
an address for the associated (owning) personality;
a name for the transaction type;
a nickname for the transaction type (this may be the name displayed on the DPD to indicate which transaction type is active for an active personality, and may also be displayed on the DPD for the purposes of the user selecting between different optional transaction types);
an association for the transaction type (that is, what is the transaction type associated to including: a bank account for different purchase types from others of the transaction types for the personality, a currency account for different currency types from others of the transaction types for the personality, and other associations);
an indication method (during a digital transaction there must be a means for indicating to the bank or other institution processing the transaction which transaction type is being used. The indicators may include: a sequence number (which are typically used to indicate primary or supplementary card holders), or the AID of the transaction application associated with the transaction type).
an interface code (including 0: none (neither contact nor contactless interfaces), 1: contact interface, 2: contactless interface, 3: both contact and contactless interfaces);
an activation state (this may use the following codes: 0: deactivated on all interfaces (contact and contactless), 1: activated on contact interface, 2: activated on contactless interface 3: activated on both contact and contactless interfaces).

In other such embodiments of the present invention and/or in other such embodiments of its related technologies, where the DPD (and/or DTPU) is (are) configured to host one or more tokenized personalities (that is, wherein a personality has one or more associated tokenized transaction applications, and wherein each tokenized transaction application has a tokenized identifier (for payment card personalities, this will be a tokenized PAN)), the first MCU registry metadata table includes columns for one or more of:
a head of tokenized transaction application list (being the address of the first AID for two or more AIDs each associated with a tokenized transactions application associated to the personality, wherein each transaction application associated to a DTP/PDTP hosted on the DTPU).

In some such embodiments of the present invention and/or in some such embodiments of its related technologies, where each personality includes one or more tokenized transaction applications, a further MCU registry metadata table includes columns for one or more of:
an address (being a reference for a pointer to a memory location in the MCU) for each entry in the table;
an address for the next AID;
an address for the associated (owning) personality;
a selection method which indicates how a tokenized transaction application is to be selected from the one or more tokenized transaction applications associated with a personality (which is selected by the user for being the active personality), the methods including: random or pseudo random selection (automatically effected by the DPD without the user's input), sequential selection (wherein the DPD automatically selects the AID of the next tokenized transaction application on the list for the selected personality, and user selection (wherein the user selects the tokenized transaction application to be activated for the selected personality to be activated).

a name for the tokenized transaction application (this would typically only be relevant where user selection of the tokenized transaction application is permitted);

a nickname for the tokenized transaction application (this may be the name displayed on the DPD to indicate which tokenized transaction application is active for an active personality, and may also be displayed on the DPD for the purposes of the user selecting between different optional tokenized transaction applications. This would typically only be relevant where user selection of the tokenized transaction application is permitted);

an interface code (including 0: none (neither contact nor contactless interfaces), 1: contact interface, 2: contactless interface, 3: both contact and contactless interfaces);

an activation state (this may use the following codes: 0: deactivated on all interfaces (contact and contactless), 1: activated on contact interface, 2: activated on contactless interface 3: activated on both contact and contactless interfaces).

Operational Secure Element (OSE)

In embodiments of the present invention and/or in embodiments of its related technologies, the DPD includes an Operational Secure Element (OSE) outside of a DTPU.

In embodiments of the present invention and/or in embodiments of its related technologies, the OSE is operable to securely store and/or operate with one or more commands for execution on the DTPU, including one or more commands encrypted for authentication to an SSD on the DTPU. In other embodiments of the present invention and/or in other embodiments of its related technologies, the OSE is operable to securely store and/or operate with one or more command templates, the one or more command templates, each when written with further data, operable for execution on the DTPU. In some such embodiments of the present invention and/or in some such embodiments of its related technologies, the OSE is operable to generate one or more commands from each of the one or more command templates. In some such embodiments of the present invention and/or in some such embodiments of its related technologies, the OSE is operable to securely store and/or operate with one or more cryptographic keys, each cryptographic key for encrypting a command or a command template (when written with further data) such that the command or command template (when written with further data) is authenticatable to an SSD for execution on the DTPU. In embodiments of the present invention and/or in embodiments of its related technologies, the OSE is operable to securely store and/or operate with one or more scripts for execution on the DTPU, including one or more scripts encrypted for authentication to an SSD on the DTPU. In other embodiments of the present invention and/or in other embodiments of its related technologies, the OSE is operable to securely store and/or operate with one or more script templates, the one or more script templates, each when written with further data, operable for execution on the DTPU. In some such embodiments of the present invention and/or in some such embodiments of its related technologies, the OSE is operable to generate one or more scripts from each of the one or more script templates. In some such embodiments of the present invention and/or in some such embodiments of its related technologies, the OSE is operable to securely store and/or operate with one or more cryptographic keys, each cryptographic key for encrypting a script or a script template (when written with further data) such that the script or script template (when written with further data) is authenticatable to an SSD for execution on the DTPU. It will be appreciated that such scripts are traditionally used by entities such as TSMs, Perso Bureaus and the like for operations such as personalization.

In other embodiments of the present invention and/or in other embodiments of its related technologies, the OSE is operable to store and/or operate with digital objects other than scripts and cryptographic keys, such as firmware and/or files for other components on the DPD (for example, MCU firmware and/or files).

In embodiments of the present invention and/or in embodiments of its related technologies, the OSE is located on the MCU, or on another chip in communication with the MCU on the DPD.

In embodiments of the present invention and/or in embodiments of its related technologies, the OSE is compliant with any one or more of the following certifications, protocols and/or standards: CC PP-0084 EAL4+ and AVA_VAN.5. In some such embodiments of the present invention and/or in some such embodiments of its related technologies, the compliance is required for storage and/or operation with data objects having a required level of security, such as cryptographic keys and scripts used for card management or SE management on the DTPU. In some such embodiments, the separate OSE includes security firmware/architecture to enable storage of one or more security keys such that the storage and usage of the keys, and other OSE operations, at least meet requirements of Common Criteria or PCI.

In embodiments of the present invention and/or in embodiments of its related technologies, the OSE is accessible only by the MCU to retrieve data, files and other digital objects, including scripts and encrypted scripts.

In embodiments of the present invention and/or in embodiments of its related technologies, the OSE is operable to receive from the MCU requests to provide one or more scripts, one or more encrypted scripts and one or more other digital objects, and to provide to the MCU the requested one or more scripts, one or more encrypted scripts and one or more other digital objects. In some such embodiments of the present invention and/or in some such embodiments of its related technologies, the OSE is operable to receive from the MCU an identifier with each request to identify which one or more scripts are required. In some such embodiments of the present invention and/or in some such embodiments of its related technologies, the identifier is an AID for an application (Including selection applications and transaction applications) in the DTPU. In some other such embodiments of the present invention and/or in some other such embodiments of its related technologies, where the MCU requests a script or command from the OSE, which is generated, respectively, from a template script or a template command by the OSE, the MCU is operable to send an identifier with the request to identify the template script or a template command to be used by the OSE.

In other such embodiments of the present invention and/or in other such embodiments of its related technologies, the OSE is operable to receive from the MCU one or more parameters from the MCU for parameterizing (or writing one or more parameters into) each of one or more template scripts or template commands in the OSE. In some such embodiments of the present invention and/or in some such embodiments of its related technologies, the one or more parameters includes an AID of an application (Including selection applications and transaction applications) in the DTPU.

In yet other embodiments of the present invention and/or in yet other embodiments of its related technologies, the OSE is operable to receive from the MCU one or more counters representing the next expected counter value for a key set in a security domain (for example, an SSD) of the DTPU.

In further embodiments of the present invention and/or in further embodiments of its related technologies, the OSE is operable to encrypt one or more scripts with one of the one or more cryptographic keys stored in the OSE such that the one or more encrypted scripts are authenticated to a security domain (for example, an SSD) of the DTPU.

In yet further embodiments of the present invention and/or in yet further embodiments of its related technologies, the OSE is operable to encrypt one or more scripts with one of the one or more cryptographic keys stored in the OSE and a counter such that the one or more encrypted scripts are authenticated to a security domain (for example, an SSD) of the DTPU, wherein the encryption includes the counter representing the next expected counter value for the security domain.

In other embodiments of the present invention and/or in other embodiments of its related technologies, the OSE is operable to parameterize (or write one or more parameters into) each of one or more template scripts. In some such embodiments of the present invention and/or in some such embodiments of its related technologies, the one or more parameters includes an AID of an application (Including selection applications and transaction applications) in the DTPU. In some such embodiments of the present invention and/or in some such embodiments of its related technologies, the OSE is operable to encrypt each parameterized template script with one of the one or more cryptographic keys stored in the OSE. In some such embodiments of the present invention and/or in some such embodiments of its related technologies, the OSE is operable to encrypt each parameterized template script with one of the one or more cryptographic keys stored in the OSE and a counter, wherein the derivation of a session key from the cryptographic key for the encryption includes the counter representing the next expected counter value for the security domain.

In embodiments of the present invention and/or in embodiments of its related technologies, the OSE includes an OSE registry for storage of metadata, wherein the metadata is data related to one or more personalities hosted on the DPD (each personality associated with a DTP/PDTP hosted on the DTPU). In some such embodiments of the present invention and/or in some such embodiments of its related technologies, the OSE registry includes one or more tables of metadata. In some such embodiments of the present invention and/or in some such embodiments of its related technologies, a first registry metadata table includes columns for one or more of:
- an address (being a reference for a pointer to a memory location in the OSE) for each entry in the table;
- a personality index (an index for facilitating reference to each personality on the DPD, each personality being associated with a DTP/PDTP hosted in the DTPU);
- a personality identifier (for payment card personalities, this will be a PAN, including its IIN);
- a payment scheme name for each personality (where the personality is for a payment card or the like);
- an issuer name for each personality;
- an expiry date for each personality;
- a nickname for each personality;
- a CVV for each transaction application in a PDTP associated with a personality (where the personality is for a payment card or the like);
- a logo index for each personality (a reference to a logo to be displayed on the DPD for each personality when it is the active personality of the DPD);
- a holder name for the personality (for payment cards or the like, this is typically referred to as a cardholder name);
- a personality activation state, which shows the present state of each personality (this may use the following codes: 0: deactivated on all interfaces (contact and contactless), 1: activated on contact interface, 2: activated on contactless interface 3: activated on both contact and contactless interfaces);
- a default personality activation state, showing what the default state of activation for each personality should be in prescribed circumstances, such as if the personality activation state is somehow lost (this may use the following codes: 0: not default for both contact and contactless interfaces, 1: default for contact interface, 2: default for contactless interface, 3: default for both contact and contactless interfaces);
- a flag to indicate if the activation state/default activation state of each personality has been changed; and
- a head of AID list (being the address of the first AID for one or more AIDs associated with transactions applications associated to the DTP).

In some such embodiments of the present invention and/or in some such embodiments of its related technologies, a second registry metadata table includes columns for one or more of:
- an address (being a reference for a pointer to a memory location in the OSE) for each entry in the table;
- an address for the next AID;
- an address for the associated (owning) personality;
- an interface code (including 0: none (neither contact nor contactless interfaces), 1: contact interface, 2: contactless interface, 3: both contact and contactless interfaces);
- an activation state (this may use the following codes: 0: deactivated on all interfaces (contact and contactless), 1: activated on contact interface, 2: activated on contactless interface 3: activated on both contact and contactless interfaces).

In other such embodiments of the present invention and/or in other such embodiments of its related technologies, where each personality includes two or more transaction types, the first OSE registry metadata table includes columns for one or more of:
- a head of transaction type list (being the address of the first AID for two or more AIDs each associated with a transactions application for a transaction type associated to the personality, wherein each transaction application associated to a DTP/PDTP hosted on the DTPU).

In some such embodiments of the present invention and/or in some such embodiments of its related technologies, where each personality includes two or more transaction types, a further OSE registry metadata table includes columns for one or more of:
- an address (being a reference for a pointer to a memory location in the OSE) for each entry in the table;
- an address for the next AID;
- an address for the associated (owning) personality;
- a name for the transaction type;
- a nickname for the transaction type (this may be the name displayed on the DPD to indicate which transaction type is active for an active personality, and may also be displayed on the DPD for the purposes of the user selecting between different optional transaction types);

an association for the transaction type (that is, what is the transaction type associated to including: a bank account for different purchase types from others of the transaction types for the personality, a currency account for different currency types from others of the transaction types for the personality, and other associations);

an indication method (during a digital transaction there must be a means for indicating to the bank or other institution processing the transaction which transaction type is being used. The indicators may include: a sequence number (which are typically used to indicate primary or supplementary card holders), or the AID of the transaction application associated with the transaction type).

an interface code (including 0: none (neither contact nor contactless interfaces), 1: contact interface, 2: contactless interface, 3: both contact and contactless interfaces);

an activation state (this may use the following codes: 0: deactivated on all interfaces (contact and contactless), 1: activated on contact interface, 2: activated on contactless interface 3: activated on both contact and contactless interfaces).

In other such embodiments of the present invention and/or in other such embodiments of its related technologies, where the DPD (and/or DTPU) is (are) configured to host one or more tokenized personalities (that is, wherein a personality has one or more associated tokenized transaction applications, and wherein each tokenized transaction application has a tokenized identifier (for payment card personalities, this will be a tokenized PAN)), the first registry metadata table includes columns for one or more of:

a head of tokenized transaction application list (being the address of the first AID for two or more AIDs each associated with a tokenized transactions application associated to the personality, wherein each transaction application associated to a DTP/PDTP hosted on the DTPU).

In some such embodiments of the present invention and/or in some such embodiments of its related technologies, where each personality includes one or more tokenized transaction applications, a further OSE registry metadata table includes columns for one or more of:

an address (being a reference for a pointer to a memory location in the OSE) for each entry in the table (in other embodiments, the DAD could store the metadata in a table, thus not requiring the addresses);

an address for the next AID;

an address for the associated (owning) personality;

a selection method which indicates how a tokenized transaction application is to be selected from the one or more tokenized transaction applications associated with a personality (which is selected by the user for being the active personality), the methods including: random or pseudo random selection (automatically effected by the DPD without the user's input), sequential selection (wherein the DPD automatically selects the AID of the next tokenized transaction application on the list for the selected personality, and user selection (wherein the user selects the tokenized transaction application to be activated for the selected personality to be activated).

a name for the tokenized transaction application (this would typically only be relevant where user selection of the tokenized transaction application is permitted);

a nickname for the tokenized transaction application (this may be the name displayed on the DPD to indicate which tokenized transaction application is active for an active personality, and may also be displayed on the DPD for the purposes of the user selecting between different optional tokenized transaction applications. This would typically only be relevant where user selection of the tokenized transaction application is permitted);

an interface code (including 0: none (neither contact nor contactless interfaces), 1: contact interface, 2: contactless interface, 3: both contact and contactless interfaces);

an activation state (this may use the following codes: 0: deactivated on all interfaces (contact and contactless), 1: activated on contact interface, 2: activated on contactless interface 3: activated on both contact and contactless interfaces).

DPD Hardware Security Architecture

In embodiments of the present invention and/or in embodiments of its related technologies, the DPD includes a DTPU, an MCU and an OSE, wherein the DTPU is connected to the MCU for data communications therebetween, and the MCU is connected to the OSE for data communications therebetween. In some such embodiments of the present invention and/or in some such embodiments of its related technologies, the OSE is sufficiently compliant with standards for secure storage and operations with cryptographic keys and scripts (including template scripts).

In some such embodiments of the present invention and/or in some such embodiments of its related technologies, the MCU is operable to manage some operations of the DTPU and the OSE, wherein the MCU instructs such operations on the DTPU by requesting one or more scripts stored on the OSE. The one or more scripts are passed through the MCU to be executed (or played) on the DTPU in a security domain (typically an SSD) in the DTPU, wherein the one or more scripts are authenticated against the SSD, and wherein the scripts are executed on an application in the security domain. In embodiments of the present invention and/or in embodiments of its related technologies, a script can be executed directly against a security domain. In embodiments of the present invention and/or in embodiments of its related technologies, the MCU can request multiple scripts for multiple different domains (typically multiple different SSDs) from the OSE for execution (or playing) on the DTPU.

It will be understood that the scripts (being encrypted scripts) stored on the OSE, if not alterable, must have their counters set to match the counter expected by the target security domain of the DTPU (or the DTPU operating system) for anti-replay security. In practice, this could result in the OSE being required to store a large number of scripts if repeated operations on the DTPU are required. In some embodiments of the present invention and/or in some embodiments of its related technologies, instead of storing a large number of scripts, the counter expected by the DTPU can be reset, say to "0", and the scripts stored on the OSE can have their counters set from "0" upwards, so the same scripts can be replayed repeatedly.

In yet other embodiments of the present invention and/or in yet other embodiments of its related technologies, the OSE can store one or more cryptographic keys for signing (encrypting) one or more template scripts. In some such embodiments of the present invention and/or in some such embodiments of its related technologies, each cryptographic key is used to derive a session key, the derivation including the counter, and the derived session key is used to encrypt a template script. In some such embodiments of the present invention and/or in some such embodiments of its related technologies, the one or more template scripts are complete other than encrypting with a session key for authentication to an SSD on the DTPU. When the MCU requests one or more scripts, the OSE is operable encrypt the one or more template scripts, each with a respective encryption key and counter used to derive a session key for the encryption.

In some such embodiments of the present invention and/or in some such embodiments of its related technologies, the MCU can request multiple scripts for execution (or play) in multiple respective security domains of the DTPU, so that, multiple respective cryptographic keys and respective counters for the multiple respective domains are used to encrypt the multiple scripts. The encrypted scripts are then sent to the MCU to be passed to the DTPU for execution in the respective security domains of the DTPU. In yet other embodiments of the present invention and/or in yet other embodiments of its related technologies, counters are associated to keysets which are associated to SSDs. SSDs can have multiple keysets and therefore multiple counters.

In yet other embodiments of the present invention and/or in yet other embodiments of its related technologies, the one or more template scripts are complete other than having some required information, and being encrypted (with a session key derived from the encryption key and counter). In some such embodiments of the present invention and/or in some such embodiments of its related technologies, each template script requires an AID associated with a target application (including selection applications or transaction applications) to be passed as a parameter to the template script and requires having the counter set and being encrypted. In some such embodiments of the present invention and/or in some such embodiments of its related technologies, when the MCU requests one or more scripts, it passes one or more parameters of one or more AIDs for respective applications so that each of the scripts can receive an AID, and then be encrypted by the respective cryptographic key and counter for the security domain of the respective application.

In some embodiments of the present invention and/or in some embodiments of its related technologies, the counter is passed as a parameter from the MCU when requesting a script from the OSE. In some such embodiments of the present invention and/or in some such embodiments of its related technologies, the counter may be obtained by the MCU by sending a request (which is a script) to the DTPU. In other such embodiments of the present invention and/or in other such embodiments of its related technologies, the request may be made by script, so that the MCU initially requests an expected counter request script from the OSE, sends the expected counter request script to the DTPU, the MCU receives from the DTPU the expected counter, and then the MCU sends the expected counter as a parameter to the OSE for setting the counter of template scripts (which is used in encrypting the scripts) in subsequent script requests.

One advantage of this architecture is that a script remains secure in passage through the MCU, which is required for compliance with some security standards (such as PCI standards).

Cryptographic Key Secure Memory (CKSM)

In embodiments of the present invention and/or in embodiments of its related technologies, the DPD includes a secure memory for storing at least one cryptographic key for establishing a secure communication channel or a secure communication session external of the DPD. This secure memory may be referred to as a Cryptographic Key Secure Memory (CKSM). In some such embodiments of the present invention and/or in some such embodiments of its related technologies, the CKSM is operable to generate or derive one or more session keys from each at least one cryptographic key. In some other such embodiments of the present invention and/or in some other such embodiments of its related technologies, the CKSM is operable to generate or derive one or more session keys from each at least one cryptographic key and a counter from the DTPU.

In some embodiments of the present invention and/or in some embodiments of its related technologies, the CKSM is operable to securely store a single symmetric cryptographic key for establishment of a secure communication session, wherein the secure communication session allows the DPD to be provided with further digital objects including any one or more of: one or more scripts, one or more cryptographic keys for establishing subsequent secure communications, and further firmware (including firmware upgrades to the MCU and other DPD components). In some such embodiments of the present invention and/or in some such embodiments of its related technologies, an initial symmetrical cryptographic key may be stored into (injected or written into) the CKSM during manufacture or lamination (for a DTC only) of the DPD.

In some other embodiments of the present invention and/or in some other embodiments of its related technologies, the CKSM is operable to securely store part of a single asymmetric cryptographic key pair for establishment of one secure communication session, wherein the secure communication session allows the DPD to be provided with further digital objects including any one or more of: one or more scripts, one or more cryptographic keys for establishing subsequent secure communications, one or more certificates, and further firmware (including firmware upgrades to the MCU and other DPD components).

In other embodiments of the present invention and/or in other embodiments of its related technologies, the CKSM is operable to store firmware for the DPD (for example, for implementing on the MCU when first activating the DPD when the DPD is in the field, that is, in the hands of a user remote from a provisioning network). In other embodiments of the present invention and/or in other embodiments of its related technologies, the initial basic firmware for the DPD is stored on the MCU. In some such embodiments of the present invention and/or in some such embodiments of its related technologies, the initial basic firmware allows basic operations of the DPD (operations managed by the MCU), such that, upon first provisioning the DPD, the MCU accesses the stored single symmetric cryptographic key and/or the stored part of a single asymmetric cryptographic key pair in the CKSM to establish a secure communication session, and such that the DPD is operable to obtain by remote provisioning from one or more provisioning agents in a provisioning network further firmware for implementation on the MCU. The further firmware (including firmware upgrades to the MCU and other DPD components) is provided securely to the MCU, and allows the MCU (and the DPD) to engage in more complex operations than would have been possible with the initial basic firmware, such as the DPD being provisioned with digital objects including one or more scripts, one or more template scripts, and one or more cryptographic keys. In embodiments of the present invention and/or in embodiments of its related technologies, the digital objects include scripts and/or template scripts (and, if required, cryptographic keys) for building (instantiating) applications on the DTPU, including any one or more of: one or more security domain applications (including SSDs), one or more containers (including packages or ELFs), one or more selection applications (including a PSE selection application and/or a PPSE selection application), and one or more transaction applications (each belonging to or associated with one of one or more DTPs/PDTPs).

In some embodiments of the present invention and/or in some embodiments of its related technologies, the CKSM has a CKSM registry for storage of metadata, wherein the metadata is data related to one or more personalities hosted on the DPD (each personality associated with a DTP/PDTP hosted on the DTPU). Such a registry is similar or same as the registries discussed above for the MCU and/or the OSE.

Data Assistance Device (DAD)

In embodiments of the present invention and/or in embodiments of its related technologies, the DPD is adapted to operate with a Data Assistance Device (DAD). In embodiments of the present invention and/or in embodiments of its related technologies of the system, the system includes a DAD. In some such embodiments of the present invention and/or in some such embodiments of its related technologies, the DPD and the DAD each have transceivers for linking the DPD and the DAD to allow communication therebetween.

In some embodiments of the present invention and/or in some embodiments of its related technologies, a user links the DAD to the DPD by operating a user interface on the DAD and operating a user interface on the DPD.

In other embodiments of the present invention and/or in other embodiments of its related technologies, the DAD includes one or more of a smartphone, a tablet computer, or any other suitable mobile computing device. In other embodiments of the present invention and/or in other embodiments of its related technologies, the DAD includes non-mobile devices, such as a personal computer. In yet other embodiments of the present invention and/or in yet other embodiments of its related technologies, the DAD includes a DTD adapted for communicating with the DPD via its receiver and/or transmitter.

In some such embodiments of the present invention and/or in some such embodiments of its related technologies, the DAD can link to the DPD, for example, by Bluetooth/Bluetooth Low Energy (BLE), by Near Field Communication (NFC), or by WiFi, and can establish a communication session to a remote agent, for example, via the internet.

In embodiments of the present invention and/or in embodiments of its related technologies, the DAD can be operated to effect communications between the DPD, via the DAD, and a remote agent, such as a provisioning agent. For example, the DAD may be used to effect communication between a DPD and a Trusted Service Manager (TSM) via the DAD.

In embodiments of the present invention and/or in embodiments of its related technologies, the DAD is operable to link with only one specified DPD, and the DPD may be uniquely identified by any one or more of: the ID of the DTPU, the ID of the MCU, and the ID of other DPD components. In other embodiments of the present invention and/or in other embodiments of its related technologies, the DAD is operable to link with multiple DPDs, each of which may be uniquely identified by any one or more of: the ID of the DTPU, the ID of the MCU, and the ID of other DPD components. In yet other embodiments of the present invention and/or in yet other embodiments of its related technologies, the DPD is operable to link with only one DAD, and the DAD may be uniquely identified by its device fingerprint, which may include its International Mobile Equipment Identity (IMEI) number. In yet further embodiments, the DPD is operable to link with more than one DAD, each of which may be uniquely identified by its device fingerprint.

In other embodiments of the present invention and/or in other embodiments of its related technologies, the DAD is operable to communicate with at least one of one or more provisioning agents in a provisioning network. In some such embodiments of the present invention and/or in some such embodiments of its related technologies, the DAD is operable to communicate with a DPD Manager in the provisioning network. In some such embodiments of the present invention and/or in some such embodiments of its related technologies, the DAD is operable to communicate with any one or more of a TSM, a TSP, and SEMS via the DPD manager. In some other such embodiments of the present invention and/or in some other such embodiments of its related technologies, the DAD is operable to communicate with the DPD manager via a DPD manager gateway, the DPD manager gateway providing an interface for communication between components of the DPD manager and the DAD. In some further such embodiments of the present invention and/or in some further such embodiments of its related technologies, the communication between the DPD manager and the DAD is a secure communication link. In yet other such embodiments of the present invention and/or in yet other such embodiments of its related technologies, the secure communication link employs Transport Layer Security (TLS). In some such embodiments of the present invention and/or in some such embodiments of its related technologies, the secure communication link employs any one or more of Secure Channel Protocols, including: SCP02 and SCP03. In some such embodiments of the present invention and/or in some such embodiments of its related technologies, the secure communication link employs SEMS security certificates for securing the link. In some such embodiments of the present invention and/or in some such embodiments of its related technologies, the secure communication link employs TLS and any one or more of the Secure Channel Protocols for some communications, AES encryption for other communications, and TLS with further encryption for yet other communications.

In embodiments of the present invention and/or in embodiments of its related technologies, the DAD may effect communication between a DPD and at least one of one or more provisioning agents in a provisioning network using any one or more of: a Mobile Network Operator (MNO)—as an actor, CAT-TP (Card Application Toolkit Transport Protocol), HTTP, SMS, Over The Air (OTA), and Over the Internet (OTI).

In embodiments of the present invention and/or in embodiments of its related technologies, a DAD can be a DTD. It will be appreciated that a DTD or its software will likely require modification for such purpose.

In embodiments of the present invention and/or in embodiments of its related technologies, the DAD is operable to setup parameters for the DPD in order to share or configure internet communications on the DPD, and in order to connect directly to at least one of one or more provisioning agents in a provisioning network. The internet connection could be:

sharing the internet access of a DAD via BLE;
having a WiFi chip on the DPD and connecting direct to
   the provisioning agent (for example a TSM via an MNO) by sharing the WiFi hotspot on the phone or connecting to a WiFi router (can be seen as having the DAD on the DPD, but is a way of not requiring a separate DAD for internet connection);

a Wifi2BLE bridge.

In other embodiments of the present invention and/or in other embodiments of its related technologies, the DAD is operable to host DAD gateway software, wherein the DAD gateway enables the DAD be a bridge between the provisioning infrastructure (including the provisioning network having one or more provision agents) and the DPD.

In yet other embodiments of the present invention and/or in yet other embodiments of its related technologies, the DAD is operable to host a DAD application (sometimes referred to as a mobile application) for interfacing with the user of the DAD (also being the user of the DPD), the DAD application enabling the user to perform operations on the DAD, some of which operations are effected to the DPD, either synchronously, when the DAD and DPD are linked for intercommunication, or asynchronously, wherein the DAD and DPD are later linked for intercommunication after an operation is entered into the DAD application. In some such embodiments of the present invention and/or in some such embodiments of its related technologies, the DAD is operable to obtain (download) the DAD application from a mobile application portal of the provisioning network. In some other such embodiments of the present invention and/or in some other such embodiments of its related technologies, the DAD is operable to obtain (download) the DAD application from providers such as Google Play and Apple App Store. In some such embodiments of the present invention and/or in some such embodiments of its related technologies, the mobile application portal is a component of the DPD manager. In some other such embodiments of the present invention and/or in some other such embodiments of its related technologies, the DAD is operable to retrieve configuration files for the DAD from the mobile application portal, including Bluetooth keys for the DAD to link with (pair to) a specific DPD. In some further such embodiments of the present invention and/or in some further such embodiments of its related technologies, such configuration files would only be provided after the specific DPD has been registered through the mobile application portal and approved as being eligible for download to the DAD.

In embodiments of the present invention and/or in embodiments of its related technologies, the DAD is operable as a proxy for secure communication between one or more provisioning agents in a provisioning network and the DTPU on the DPD. In some such embodiments of the present invention and/or in some such embodiments of its related technologies, the secure communication includes communication using secure protocols, including any one or more of SCP02, SCP03, and other similar and/or related secure communication protocols. In some such embodiments of the present invention and/or in some such embodiments of its related technologies, the secure communication protocol includes using SCP02 i=55.

In some such embodiments of the present invention and/or in some such embodiments of its related technologies, where the DAD is operable as a proxy, the DAD is operable to receive digital objects, including encrypted scripts, from one or more provisioning agents in a provisioning network on a secure communication channel between the DAD and the one or more provisioning agents where the digital objects have been encrypted using SCP02 i=55. In some such embodiments of the present invention and/or in some such embodiments of its related technologies, the DAD, having received digital objects encrypted using SCP02 i=55, is operable to retain the received digital objects after the secure communication channel is disconnected, the DAD is further operable to send the digital objects to the DPD for execution on the DTPU.

In embodiments of the present invention and/or in embodiments of its related technologies, the DAD includes a DAD registry for storage of metadata, wherein the metadata is data related to one or more personalities hosted on the DPD (each personality associated with a DTP/PDTP hosted on the DTPU). In some such embodiments of the present invention and/or in some such embodiments of its related technologies, the DAD registry is hosted on a secure memory chip in the DAD. In some such embodiments of the present invention and/or in some such embodiments of its related technologies, the memory chip is secured memory, such as a secure element.

In some such embodiments of the present invention and/or in some such embodiments of its related technologies, the DAD registry includes one or more tables of metadata. In some such embodiments of the present invention and/or in some such embodiments of its related technologies, a first DAD registry metadata table includes columns for one or more of:

- an address (being a reference for a pointer to a memory location in the DAD) for each entry in the table (in other embodiments, the DAD could store the metadata in a table, thus not requiring the addresses);
- a personality index (an index for facilitating reference to each personality on the DPD, each personality being associated with a DTP/PDTP hosted in the DTPU);
- a personality identifier (for payment card personalities, this will be a PAN, including its IIN);
- a payment scheme name for each personality (where the personality is for a payment card or the like);
- an issuer name for each personality;
- an expiry date for each personality;
- a nickname for each personality;
- a CVV for each transaction application in a PDTP associated with a personality (where the personality is for a payment card or the like);
- a logo index for each personality (a reference to a logo to be displayed on the DPD for each personality when it is the active personality of the DPD);
- a holder name for the personality (for payment cards or the like, this is typically referred to as a cardholder name);
- a personality activation state, which shows the present state of each personality (this may use the following codes: 0: deactivated on all interfaces (contact and contactless), 1: activated on contact interface, 2: activated on contactless interface 3: activated on both contact and contactless interfaces);
- a default personality activation state, showing what the default state of activation for each personality should be in prescribed circumstances, such as if the personality activation state is somehow lost (this may use the following codes: 0: not default for both contact and contactless interfaces, 1: default for contact interface, 2: default for contactless interface, 3: default for both contact and contactless interfaces);
- a flag to indicate if the activation state/default activation state of each personality has been changed; and
- a head of AID list (being the address of the first AID for one or more AIDs associated with transactions applications associated to the DTP).

In some such embodiments of the present invention and/or in some such embodiments of its related technologies, a second DAD registry metadata table includes columns for one or more of:
- an address (being a reference for a pointer to a memory location in the DAD) for each entry in the table (in other embodiments, the DAD could store the metadata in a table, thus not requiring the addresses);
- an address for the next AID;
- an address for the associated (owning) personality;
- an interface code (including 0: none (neither contact nor contactless interfaces), 1: contact interface, 2: contactless interface, 3: both contact and contactless interfaces);
- an activation state (this may use the following codes: 0: deactivated on all interfaces (contact and contactless), 1: activated on contact interface, 2: activated on contactless interface 3: activated on both contact and contactless interfaces).

In other such embodiments of the present invention and/or in other such embodiments of its related technologies, where each personality includes two or more transaction types, the DAD first registry metadata table includes columns for one or more of:
- a head of transaction type list (being the address of the first AID for two or more AIDs each associated with a transactions application for a transaction type associated to the personality, wherein each transaction application associated to a DTP/PDTP hosted on the DTPU).

In some such embodiments of the present invention and/or in some such embodiments of its related technologies, where each personality includes two or more transaction types, a further DAD registry metadata table includes columns for one or more of:
- an address (being a reference for a pointer to a memory location in the DAD) for each entry in the table (in other embodiments, the DAD could store the metadata in a table, thus not requiring the addresses);
- an address for the next AID;
- an address for the associated (owning) personality;
- a name for the transaction type;
- a nickname for the transaction type (this may be the name displayed on the DPD to indicate which transaction type is active for an active personality, and may also be displayed on the DPD for the purposes of the user selecting between different optional transaction types);
- an association for the transaction type (that is, what is the transaction type associated to including: a bank account for different purchase types from others of the transaction types for the personality, a currency account for different currency types from others of the transaction types for the personality, and other associations);
- an indication method (during a digital transaction there must be a means for indicating to the bank or other institution processing the transaction which transaction type is being used. The indicators may include: a sequence number (which are typically used to indicate primary or supplementary card holders), or the AID of the transaction application associated with the transaction type).
- an interface code (including 0: none (neither contact nor contactless interfaces), 1: contact interface, 2: contactless interface, 3: both contact and contactless interfaces);
- an activation state (this may use the following codes: 0: deactivated on all interfaces (contact and contactless), 1: activated on contact interface, 2: activated on contactless interface 3: activated on both contact and contactless interfaces).

In other such embodiments of the present invention and/or in other such embodiments of its related technologies, where the DPD (and/or DTPU) is (are) configured to host one or more tokenized personalities (that is, wherein a personality has one or more associated tokenized transaction applications, and wherein each tokenized transaction application has a tokenized identifier (for payment card personalities, this will be a tokenized PAN)), the first DAD registry metadata table includes columns for one or more of:
- a head of tokenized transaction application list (being the address of the first AID for two or more AIDs each associated with a tokenized transactions application associated to the personality, wherein each transaction application associated to a DTP/PDTP hosted on the DTPU).

In some such embodiments of the present invention and/or in some such embodiments of its related technologies, where each personality includes one or more tokenized transaction applications, a further DAD registry metadata table includes columns for one or more of:
- an address (being a reference for a pointer to a memory location in the DAD) for each entry in the table (in other embodiments, the DAD could store the metadata in a table, thus not requiring the addresses);
- an address for the next AID;
- an address for the associated (owning) personality;
- a selection method which indicates how a tokenized transaction application is to be selected from the one or more tokenized transaction applications associated with a personality (which is selected by the user for being the active personality), the methods including: random or pseudo random selection (automatically effected by the DPD without the user's input), sequential selection (wherein the DPD automatically selects the AID of the next tokenized transaction application on the list for the selected personality, and user selection (wherein the user selects the tokenized transaction application to be activated for the selected personality to be activated).
- a name for the tokenized transaction application (this would typically only be relevant where user selection of the tokenized transaction application is permitted);
- a nickname for the tokenized transaction application (this may be the name displayed on the DPD to indicate which tokenized transaction application is active for an active personality, and may also be displayed on the DPD for the purposes of the user selecting between different optional tokenized transaction applications. This would typically only be relevant where user selection of the tokenized transaction application is permitted);
- an interface code (including 0: none (neither contact nor contactless interfaces), 1: contact interface, 2: contactless interface, 3: both contact and contactless interfaces);
- an activation state (this may use the following codes: 0: deactivated on all interfaces (contact and contactless), 1: activated on contact interface, 2: activated on contactless interface 3: activated on both contact and contactless interfaces).

In some such embodiments of the present invention and/or in some such embodiments of its related technologies, the DAD registry is a copy of a registry on the DPD, such as the MCU or OSE registry. In some such embodiments of the present invention and/or in some such embodiments of its related technologies, the MCU or OSE registry is a master registry to the DAD registry. In some other such embodiments of the present invention and/or in some other such embodiments of its related technologies, the DAD registry is a subset of a registry on the DPD, such as the MCU or OSE registry. In some such embodiments of the present invention and/or in some such embodiments of its related technologies, the DAD registry operates as a backup of a registry on the DPD, such as the MCU or OSE registry. In some such embodiments of the present invention and/or in some such embodiments of its related technologies, the DAD registry is synchronized with the registry on the DPD, such as the MCU or OSE registry, when the DAD and DPD are linked for intercommunication, wherein the registry on the DPD is the master registry.

Payment Schemes

In embodiments of the present invention and/or in embodiments of its related technologies, the DTPU is configured to operate with one or more payment schemes. Example payment schemes include Visa, Mastercard, American Express, and there are many others.

In embodiments of the present invention and/or in embodiments of its related technologies, each payment scheme operational on a DTPU has an associated container, which is used to create and install DTPs on the DTPU, wherein the DTP (and the PDTP, when the DTP has been personalized), along with all the one or more transaction applications of the DTP/PDTP is associated with the payment scheme of the container from which it was created. In some such embodiments of the present invention and/or in some such embodiments of its related technologies, each container is hosted under a separate security domain. In some such embodiments of the present invention and/or in some such embodiments of its related technologies, the security domains for containers are Utility Security Domains (USDs), each USD being an application with an associated AID, the USD hosting a container in its domain, each container having an AID. In embodiments of the present invention and/or in embodiments of its related technologies, where a domestic and international network exists for the same PDTP (or associated personality of the DPD), 2 containers can be the base of a PDTP.

In embodiments of the present invention and/or in embodiments of its related technologies, where provisioning a DTP/PDTP to a DTPU from a TSP, payment schemes have control of a security domain (an SSD). In other such embodiments of the present invention and/or in other such embodiments of its related technologies, a TSP has control of an SSD (and its related security domain). In some such embodiments of the present invention and/or in some such embodiments of its related technologies, transaction applications (or associated PDTPs) from different issuers have separate SSDs (sub-domains) under the payment scheme SSD.

In embodiments of the present invention and/or in embodiments of its related technologies, where provisioning a DTP/PDTP to a DTPU from a TSM, the issuers TSM has control of a security domain (an SSD). In some such embodiments of the present invention and/or in some such embodiments of its related technologies, transaction applications (or associated PDTPs) from different payment schemes have separate SSDs (sub-domains) under the issuer's TSM SSD.

In some such embodiments of the present invention and/or in some such embodiments of its related technologies, where there is more than one payment scheme currently hosted on the DTPU, the DTPU is operable to selectively operate with a subset of one or more of the one or more payment schemes. In some such embodiments of the present invention and/or in some such embodiments of its related technologies, each USD for a containers associated with a payment scheme in the subset is in an unlocked state, and each USD for a containers associated with a payment scheme outside the subset is in an locked state. In some such embodiments of the present invention and/or in some such embodiments of its related technologies, a container with its USD in a locked state cannot extradite a transaction application instantiated by the container into an SSD in the part of the security hierarchy where transaction applications are hosted. In this way, locking of the USD of a container effectively disables the container and its associated payment scheme from being able to install any transaction applications on the DTPU. In some other such embodiments of the present invention and/or in some other such embodiments of its related technologies, a container with its USD in a locked state cannot instantiate a transaction application. In yet other such embodiments of the present invention and/or in yet other such embodiments of its related technologies, transaction applications instantiated before the USD is locked are able to keep operating, but after the USD is locked no further applications can be instantiated and/or extradited.

Provisioning Infrastructure

In embodiments of the present invention and/or in embodiments of its related technologies, each DPD is provisioned by a provisioning infrastructure.

In some such embodiments of the present invention and/or in some such embodiments of its related technologies, the provisioning infrastructure is configured to provision to each DPD when the DPD is remote from the provisioning infrastructure. In some other such embodiments of the present invention and/or in some other such embodiments of its related technologies, the provisioning network is configured to provision to each DPD when the DPD is proximal to the provisioning network (that is, the DPD can be brought into direct physical contact with at least a part of the provisioning network to be provisioned).

In some embodiments of the present invention and/or in some embodiments of its related technologies, the provisioning infrastructure includes one or more entities, services and providers for performing roles as required for provisioning of a DPD (including any one or more components of the DPD, such as the MCU, the OSE, the CKSM, and the DTPU). In embodiments of the present invention and/or in embodiments of its related technologies, the provisioning infrastructure further includes other entities, services and providers for performing roles as required for provisioning of a DAD.

In embodiments of the present invention and/or in embodiments of its related technologies, the provisioning infrastructure includes one or more provisioning networks. In some such embodiments of the present invention and/or in some such embodiments of its related technologies, each provisioning network includes one or more entities, services and providers for performing roles as required for provisioning of a DPD (including components of the DPD, such as the MCU and the DTPU). In some such embodiments of the present invention and/or in some such embodiments of its related technologies, each provisioning network includes one or more provisioning agents. In some such embodiments of the present invention and/or in some such embodiments of its related technologies, each provisioning network includes one or more DPD managers. In some such embodiments of the present invention and/or in some such embodiments of its related technologies, each one of the one or more DPD managers is operable to manage one or more DPDs.

In embodiments of the present invention and/or in embodiments of its related technologies, the provisioning infrastructure includes one or more issuers. In some such embodiments of the present invention and/or in some such embodiments of its related technologies, at least one issuer authorizes issuance of a DPD to a user. In some such embodiments of the present invention and/or in some such embodiments of its related technologies, each such issuer is a card issuer or a financial institution. In some such embodiments of the present invention and/or in some such embodiments of its related technologies, each issuer authorizes issuance of one or more digital cards or digital documents for installation on the DPD, wherein each digital card or each digital document is represented by or included in a PDTP hosted on the DTPU of a DPD.

In embodiments of the present invention and/or in embodiments of its related technologies, the provisioning infrastructure includes one or more DAD application portals (also referred to as mobile application portals). In some such embodiments of the present invention and/or in some such embodiments of its related technologies, each DAD application portal is operable to provide digital objects to each DAD, such digital objects including digital files, firmware, software and DAD applications (sometimes referred to as mobile applications or apps). In some such embodiments of the present invention and/or in some such embodiments of its related technologies, each DAD application portal is operable to provide to each DAD a DAD application (sometimes referred to as a mobile application). In some such embodiments of the present invention and/or in some such embodiments of its related technologies, each DAD application portal is operable to provide to each DAD a DAD gateway.

In embodiments of the present invention and/or in embodiments of its related technologies, the provisioning infrastructure includes one or more factories. In some such embodiments of the present invention and/or in some such embodiments of its related technologies, at least one factory is operable to perform one or more of: manufacture of a component of a DPD, assembly of a DPD, lamination of a DPD (in the form of a DTC), and testing of a DPD.

In embodiments of the present invention and/or in embodiments of its related technologies, the provisioning infrastructure includes one or more key injection partners, each key injection partner operable to inject one or more cryptographic keys into a DPD. In some such embodiments of the present invention and/or in some such embodiments of its related technologies, at least one of the one or more cryptographic keys are injected into the DTPU. In some such embodiments of the present invention and/or in some such embodiments of its related technologies, at least one of the one or more cryptographic keys are injected directly into the DTPU. In some such embodiments of the present invention and/or in some such embodiments of its related technologies, at least one of the one or more cryptographic keys are injected into the DTPU via the MCU. In some such embodiments of the present invention and/or in some such embodiments of its related technologies, at least one of the one or more cryptographic keys are injected into the MCU. In some such embodiments of the present invention and/or in some such embodiments of its related technologies, at least one of the one or more cryptographic keys are injected into the OSE. In some such embodiments of the present invention and/or in some such embodiments of its related technologies, at least one of the one or more cryptographic keys are injected into the SKSM.

In embodiments of the present invention and/or in embodiments of its related technologies, the provisioning infrastructure includes one or more perso bureaus, each perso bureau operable for personalizing one or more DTPs hosted on the DTPU of a DPD, wherein each DTP has one or more associated transaction applications which are each personalized by one or more scripts provided by the perso bureau. In some such embodiments of the present invention and/or in some such embodiments of its related technologies, the perso bureau is operable for key injection for personalization of an SSD.

It will be appreciated that the one or more factories, the one or more key injection partners, the one or more lamination factories, the one or more perso bureaus, and other entities of the provisioning infrastructure are configured to provide the physical DPDs (for example, in the form of a DTC) and to optionally pre-provision the DPDs before the DPDs are sent to their respective users.

In embodiments of the present invention and/or in embodiments of its related technologies, the provisioning infrastructure includes one or more provisioning networks interlinked for communication with one or more issuers (including financial institution issuers). In some such embodiments of the present invention and/or in some such embodiments of its related technologies, there is a one-to-many relationship between an issuer and multiple provisioning networks. In some other such embodiments of the present invention and/or in some other such embodiments of its related technologies, there is a one-to-many relationship between a provisioning network and multiple issuers. In yet some other such embodiments of the present invention and/or in yet some other such embodiments of its related technologies, there is a many-to-many relationship between multiple issuers and multiple provisioning networks. In further such embodiments of the present invention and/or in further such embodiments of its related technologies, there is a one-to-one relationship between an issuer and a provisioning network. In some such embodiments of the present invention and/or in some such embodiments of its related technologies, the issuer is a part of the provisioning network.

Provisioning Network

In embodiments of the present invention and/or in embodiments of its related technologies, each DPD is provisioned by a provisioning network. In some such embodiments of the present invention and/or in some such embodiments of its related technologies, the provisioning network is configured to provision to the DPD when the DPD is remote from the provisioning network. In some other such embodiments of the present invention and/or in some other such embodiments of its related technologies, the provisioning network is configured to provision to the DPD when the DPD is proximal to the provisioning network (that is, the DPD can be brought into direct physical contact with at least a part of the provisioning network to be provisioned).

In some such embodiments of the present invention and/or in some such embodiments of its related technologies, the provisioning network includes one or more entities, services and providers for performing roles as required for provisioning of a DPD (in including any one or more components of the DPD, such as the MCU, the OSE, the CKSM, and the DTPU). In embodiments of the present invention and/or in embodiments of its related technologies, the provisioning network further includes other entities, services and providers for performing roles as required for provisioning of a DAD.

In some such embodiments of the present invention and/or in some such embodiments of its related technologies, the provisioning network includes one or more provisioning agents.

In other embodiments of the present invention and/or in other embodiments of its related technologies, the provisioning network includes a DPD manager for managing one or more operations on one or more DPDs.

Provisioning Agent

In embodiments of the present invention and/or in embodiments of its related technologies, a provisioning network includes one or more provisioning agents. In some such embodiments of the present invention and/or in some such embodiments of its related technologies, each provisioning agent is an entity or organization for providing services and digital objects to one or more DPDs (including DTCs). In other embodiments of the present invention and/or in other embodiments of its related technologies, each provisioning agent is an entity or organization for providing services and digital objects to one or more DADs.

In embodiments of the present invention and/or in embodiments of its related technologies, each provisioning agent is one of a Trusted Service Manager (TSM), a Token Service Provider (TSP), a Secure Element Management Service (SEMS), and a DPD manager.

In some such embodiments of the present invention and/or in some such embodiments of its related technologies, digital objects provisioned by each provisioning agent includes one or more of: one or more commands (including GP commands), one or more scripts, one or more script templates, one or more encryption keys, one or more files, and/or other data objects, such as data packets.

In some such embodiments of the present invention and/or in some such embodiments of its related technologies, each provisioning agent provides to one or more DPDs when the DPDs are remote from the provisioning agent (that is, while the DPD and DAD are in the field, typically in possession of a DPD/DAD user). In some other such embodiments of the present invention and/or in some other such embodiments of its related technologies, each provisioning agent provides to one or more DPDs while the DPDs are proximal to the provisioning agent (wherein the DPDs are yet to be in possession of a DPD user).

In embodiments of the present invention and/or in embodiments of its related technologies, each provisioning agent is operable to receive from an issuer personalization data for one or more transaction applications. In some such embodiments of the present invention and/or in some such embodiments of its related technologies, the provisioning agent is operable to convert the personalization data for each transaction application into one or more APDUs, wherein the one or more APDUs are written into one or more personalization scripts. In some such embodiments of the present invention and/or in some such embodiments of its related technologies, each provisioning agent is operable to send the one or more personalization scripts for each transaction application to the DPD manager. In some such embodiments of the present invention and/or in some such embodiments of its related technologies, the DPD manager sends the one or more personalization scripts for each transaction application to the DPD for execution on the DTPU and for personalization of transaction application which has been instantiated in the DTPU.

In embodiments of the present invention and/or in embodiments of its related technologies, for transaction applications configured for payment digital transactions, the personalization data includes, but is not limited to, any one or more of: a PAN, a transaction key, a cardholder's name, an expiry date, a PIN, a CVV, and other data for risk management. In other embodiments of the present invention and/or in other embodiments of its related technologies, for transaction applications configured for non-payment digital transactions, the personalization data includes, but is not limited to, any one or more of: a unique identifier, a name of the relevant person, an expiry date, a PIN, and other data for risk management.

In embodiments of the present invention and/or in embodiments of its related technologies, where a DPD has a DTP hosted on the DTPU, and the DTP has one or more transaction applications associated therewith, each provisioning agent is operable to provide at least one personalization script for each of their one or more transaction applications for execution on the DTPU, such that, when each transaction application is personalized it becomes a personalized transaction application and the DTP becomes a PDTP.

In embodiments of the present invention and/or in embodiments of its related technologies, where a DPD has a DTP hosted on the DTPU, and the DTP has one or more transaction applications associated therewith, and each transaction application is to be associated with a different transaction type, each provisioning agent is operable to provide at least one personalization script for each of the one or more transaction applications, the at least one personalization script for each transaction application being capable of execution on the DTPU, wherein the at least one personalization script for each transaction application includes personalization data for its transaction type, such that, when each transaction application is personalized it becomes a personalized transaction application for a transaction type and the DTP becomes a PDTP. In some such embodiments of the present invention and/or in some such embodiments of its related technologies, the further personalization data for a transaction type for a personalized transaction application includes a sequence number which is different from each other sequence number for one or more others of the transaction types for the personalized transaction applications in the PDTP.

In embodiments of the present invention and/or in embodiments of its related technologies, where a DPD has a DTP hosted on the DTPU, and the DTP has one or more transaction applications associated therewith, and each transaction application is to be personalized with a tokenized identifier, each provisioning agent is operable to provide at least one personalization script for each of the one or more transaction applications for execution on the DTPU, wherein the at least one personalization script for each transaction application includes data for providing a tokenized identifier to the transaction application, such that, when each transaction application is personalized it becomes a tokenized personalized transaction application and the DTP becomes a PDTP. In some such embodiments of the present invention and/or in some such embodiments of its related technologies, each provisioning agent for providing the at least one personalization script for each transaction application including data for providing a tokenized identifier is a TSP.

DPD Manager

In other embodiments of the present invention and/or in other embodiments of its related technologies, the provisioning network includes a DPD manager for managing one or more operations on the DPD. In some such embodiments of the present invention and/or in some such embodiments of its related technologies, the one or more operations include operations for instantiating one or more DTPs on the DTPU of the DPD. In some such embodiments of the present invention and/or in some such embodiments of its related technologies, the one or more operations include operations for delivering metadata to the DPD.

In some such embodiments of the present invention and/or in some such embodiments of its related technologies, the DPD manager is operable to generate digital objects additional to those provided by the traditional provisioning agents such as TSMs and TSPs, and to transmit such digital objects to a DPD. In some such embodiments of the present invention and/or in some such embodiments of its related technologies, the DPD manager is operable to transmit the digital objects to a DPD via a DAD. In some such embodiments of the present invention and/or in some such embodiments of its related technologies, the DPD manager is operable to transmit digital objects to a DPD directly, for example, via a WiFi connection (that is, without a DAD). In some such embodiments of the present invention and/or in some such embodiments of its related technologies, the DPD manager is operable to provide digital objects to at least one of the MCU, OSE, CKSM, and DTPU of a DPD.

In some such embodiments of the present invention and/or in some such embodiments of its related technologies, the DPD manager is operable to receive digital objects provided by one or more provisioning agents and to transmit those digital objects to a DPD.

In some such embodiments of the present invention and/or in some such embodiments of its related technologies, the DPD manager is also operable to maintain a record of the state of a DPD, including a record of each personality installed on the DPD, and characteristics of the DPD, for example the device model.

In some such embodiments of the present invention and/or in some such embodiments of its related technologies, the DPD manager is operable to receive requests from a cardholder (DPD user) for a new personality to be installed on the DPD of the user, while the DPD is in the field (that is, remote from the provisioning network or the provisioning infrastructure), wherein installation of a personality includes the actions of: creating one or more SSDs (if required), instantiating one or more transaction applications in the DTPU (wherein the one or more transaction applications may be associated with a DTP), personalizing each of the one or transaction applications on the DTPU (wherein the one or more personalized transaction applications may be associated with a PDTP), and installing metadata on the DPD (in embodiments, on the MCU), the metadata associated with the transaction applications (and or DTP/PDTP), along with installation of metadata elsewhere on the DPD, along with installation of meta data on the DAD (if required), and along with installation of metadata in the provisioning network (such as on the DPD manager) or in the provisioning infrastructure. In some such embodiments of the present invention and/or in some such embodiments of its related technologies, a DAD is operable to transmit each such cardholder (DPD user) request to the DPD manager, and the DPD manager is operable to forward each such cardholder (DPD user) request to a provisioning agent, which in turn is operable to forward each such cardholder (DPD user) request to an issuer (wherein the issuer is the issuer related to the personality addition request). In such embodiments, If the issuer approves the request, the issuer initiates a process in which DPD manager and at least one provisioning agent provide digital objects for installation on the DPD.

In embodiments of the present invention and/or in embodiments of its related technologies, the DPD manager includes a DPD manager registry for storage of metadata, wherein the metadata is data related to one or more personalities hosted on the DPD (each personality associated with a DTP/PDTP hosted on the DTPU).

In some such embodiments of the present invention and/or in some such embodiments of its related technologies, the DPD manager registry includes one or more tables of metadata. In some such embodiments of the present invention and/or in some such embodiments of its related technologies, a first DPD manager registry metadata table includes columns for one or more of:
  an address (being a reference for a pointer to a memory location in the DPD manager) for each entry in the table (in other embodiments, the DPD manager could store the metadata in a table, thus not requiring the addresses);
  a personality index (an index for facilitating reference to each personality on the DPD, each personality being associated with a DTP/PDTP hosted in the DTPU);
  a personality identifier (for payment card personalities, this will be a PAN, including its IIN);
  a payment scheme name for each personality (where the personality is for a payment card or the like);
  an issuer name for each personality;
  an expiry date for each personality;
  a nickname for each personality;
  a CVV for each transaction application in a PDTP associated with a personality (where the personality is for a payment card or the like);
  a logo index for each personality (a reference to a logo to be displayed on the DPD for each personality when it is the active personality of the DPD);
  a holder name for the personality (for payment cards or the like, this is typically referred to as a cardholder name);
  a personality activation state, which shows the present state of each personality (this may use the following codes: 0: deactivated on all interfaces (contact and contactless), 1: activated on contact interface, 2: activated on contactless interface 3: activated on both contact and contactless interfaces);
  a default personality activation state, showing what the default state of activation for each personality should be in prescribed circumstances, such as if the personality activation state is somehow lost (this may use the following codes: 0: not default for both contact and contactless interfaces, 1: default for contact interface, 2: default for contactless interface, 3: default for both contact and contactless interfaces);
  a flag to indicate if the activation state/default activation state of each personality has been changed; and
  a head of AID list (being the address of the first AID for one or more AIDs associated with transactions applications associated to the DTP).

In some such embodiments of the present invention and/or in some such embodiments of its related technologies, a second DPD manager registry metadata table includes columns for one or more of:
  an address (being a reference for a pointer to a memory location in the DPD manager) for each entry in the table (in other embodiments, the DPD manager could store the metadata in a table, thus not requiring the addresses);
an address for the next AID;
an address for the associated (owning) personality;
an interface code (including 0: none (neither contact nor contactless interfaces), 1: contact interface, 2: contactless interface, 3: both contact and contactless interfaces);
an activation state (this may use the following codes: 0: deactivated on all interfaces (contact and contactless), 1: activated on contact interface, 2: activated on contactless interface 3: activated on both contact and contactless interfaces).

In other such embodiments of the present invention and/or in other such embodiments of its related technologies, where each personality includes two or more transaction types, the DPD manager first registry metadata table includes columns for one or more of:
a head of transaction type list (being the address of the first AID for two or more AIDs each associated with a transactions application for a transaction type associated to the personality, wherein each transaction application associated to a DTP/PDTP hosted on the DTPU).

In some such embodiments of the present invention and/or in some such embodiments of its related technologies, where each personality includes two or more transaction types, a further MCU registry metadata table includes columns for one or more of:
an address (being a reference for a pointer to a memory location in the DPD manager) for each entry in the table (in other embodiments, the DPD manager could store the metadata in a table, thus not requiring the addresses);
an address for the next AID;
an address for the associated (owning) personality;
a name for the transaction type;
a nickname for the transaction type (this may be the name displayed on the DPD to indicate which transaction type is active for an active personality, and may also be displayed on the DPD for the purposes of the user selecting between different optional transaction types);
an association for the transaction type (that is, what is the transaction type associated to including: a bank account for different purchase types from others of the transaction types for the personality, a currency account for different currency types from others of the transaction types for the personality, and other associations);
an indication method (during a digital transaction there must be a means for indicating to the bank or other institution processing the transaction which transaction type is being used. The indicators may include: a sequence number (which are typically used to indicate primary or supplementary card holders), or the AID of the transaction application associated with the transaction type).
an interface code (including 0: none (neither contact nor contactless interfaces), 1: contact interface, 2: contactless interface, 3: both contact and contactless interfaces);
an activation state (this may use the following codes: 0: deactivated on all interfaces (contact and contactless), 1: activated on contact interface, 2: activated on contactless interface 3: activated on both contact and contactless interfaces).

In other such embodiments of the present invention and/or in other such embodiments of its related technologies, where the DPD (and/or DTPU) is (are) configured to host one or more tokenized personalities (that is, wherein a personality has one or more associated tokenized transaction applications, and wherein each tokenized transaction application has a tokenized identifier (for payment card personalities, this will be a tokenized PAN)), the first DPD manager registry metadata table includes columns for one or more of:
a head of tokenized transaction application list (being the address of the first AID for two or more AIDs each associated with a tokenized transactions application associated to the personality, wherein each transaction application associated to a DTP/PDTP hosted on the DTPU).

In some such embodiments of the present invention and/or in some such embodiments of its related technologies, where each personality includes one or more tokenized transaction applications, a further DPD manager registry metadata table includes columns for one or more of:
an address (being a reference for a pointer to a memory location in the DPD manager) for each entry in the table (in other embodiments, the DPD manager could store the metadata in a table, thus not requiring the addresses);
an address for the next AID;
an address for the associated (owning) personality;
a selection method which indicates how a tokenized transaction application is to be selected from the one or more tokenized transaction applications associated with a personality (which is selected by the user for being the active personality), the methods including: random or pseudo random selection (automatically effected by the DPD without the user's input), sequential selection (wherein the DPD automatically selects the AID of the next tokenized transaction application on the list for the selected personality, and user selection (wherein the user selects the tokenized transaction application to be activated for the selected personality to be activated).
a name for the tokenized transaction application (this would typically only be relevant where user selection of the tokenized transaction application is permitted);
a nickname for the tokenized transaction application (this may be the name displayed on the DPD to indicate which tokenized transaction application is active for an active personality, and may also be displayed on the DPD for the purposes of the user selecting between different optional tokenized transaction applications. This would typically only be relevant where user selection of the tokenized transaction application is permitted);
an interface code (including 0: none (neither contact nor contactless interfaces), 1: contact interface, 2: contactless interface, 3: both contact and contactless interfaces);
an activation state (this may use the following codes: 0: deactivated on all interfaces (contact and contactless), 1: activated on contact interface, 2: activated on contactless interface 3: activated on both contact and contactless interfaces).

In embodiments of the present invention and/or in embodiments of its related technologies, the DPD Manager includes a DAD application server (sometimes referred to as a mobile application server) for providing applications to a DAD (such as apps to manage operations of the DAD with a DPD, wherein the DPD is to be linked with the DAD). In some such embodiments of the present invention and/or in some such embodiments of its related technologies, the DAD application server is operable as an interface between the DPD manager gateway and the other components of the DPD manager (for example, the DPD content management system, the DPD application management system, and the DPD key manager). In some other such embodiments of the present invention and/or in some other such embodiments of its related technologies, the DAD application server is also operable to store configuration files for the DAD application (mobile application) installed on the DAD.

Digital Transaction Device (DTD)

In embodiments of the present invention and/or in embodiments of its related technologies, the DTDs with which the DPD (typically in such embodiments, a DTC) is operable to engage for digital transactions are POS terminals or EFTPOS terminals (as they are called in Australia). In other embodiments of the present invention and/or in other embodiments of its related technologies, the DTDs are ATMs. In yet other embodiments of the present invention and/or in yet other embodiments of its related technologies, the DTDs are personal computers, which may be equipped with DTC readers. In yet further embodiments of the present invention and/or in yet further embodiments of its related technologies, the DTDs are mobile devices, such as smartphones, which may be equipped with DPD readers. In embodiments of the present invention and/or in embodiments of its related technologies, for DPD including non-financial (or non-payment) personalities, a DTD may include any one or more of: a passport reader, drivers licence reader, and a transit agency validator.

In other embodiments of the present invention and/or in other embodiments of its related technologies, the DTDs with which the DPD is operable to engage for digital transactions are also adapted to operate as a Data Assistance Devices (DADs) to link to the DPD for communication therebetween and to provide data, commands, files and other digital objects and information between the DPD and the DTD (when acting as a DAD).

In some embodiments of the present invention and/or in some embodiments of its related technologies, where the DTPU of the DPD is operable to host one or more transaction types associated with a PDTP and/or a tokenized PDTP, some DTDs with which the DPD engages for a digital transaction are operable to display a list of available transaction types from which the DPD user or the operator of the DTD can select in order to determine which of the transaction applications associated with the selected transaction type are to be called by the DTD for the digital transaction.

In other embodiments of the present invention and/or in other embodiments of its related technologies, where the DTPU of the DPD is operable to host one or more transaction types associated with a PDTP and/or a tokenized PDTP, some DTDs with which the DPD engages for a digital transaction are operable to automatically select a transaction type. In some embodiments of the present invention and/or in some embodiments of its related technologies, the DTD is presented with a candidate list of transaction application identifiers (AIDs) with priority indicators for each transaction application identifier, wherein the DTD is operable to select the transaction application identifier with the highest priority for the digital transaction.

In yet other embodiments of the present invention and/or in yet other embodiments of its related technologies, where the DTPU of the DPD is operable to host one or more transaction types associated with a PDTP and/or a tokenized PDTP, the transaction type is selected on the DPD or via the DAD in advance of presenting the DPD to the DTD for a digital transaction, in which case the DTD is provided only with the associated one or more transaction applications associated with the selected transaction type either through the selection applications which are set with the identifiers of the relevant one or more transaction applications, or through direct selection (wherein all other transaction applications are locked).

In some embodiments of the present invention and/or in some embodiments of its related technologies, the DTDs with which the DPD is operable to engage for digital transactions are operable to build a candidate list of transaction application identifiers when presented with the transaction application identifiers from one of the one or more selection applications selected during a digital transaction.

Issuer

In embodiments of the present invention and/or in embodiments of its related technologies, an issuer is a party that authorizes a payment service to be provided by a DPD. In other embodiments of the present invention and/or in other embodiments of its related technologies, an issuer is a party that authorizes a non-payment service to be provided by the DPD, such as a passport issuer. In some such embodiments of the present invention and/or in some such embodiments of its related technologies, an issuer may be a financial institution or a party with a banking licence. In some such embodiments of the present invention and/or in some such embodiments of its related technologies, the issuer authorises the provisioning network to provision the DPD while in the field.

In some such embodiments of the present invention and/or in some such embodiments of its related technologies, at least one issuer of the one or more issuers authorizes issuance of a DPD to a user. In some such embodiments of the present invention and/or in some such embodiments of its related technologies, each issuer authorizes issuance of one or more digital cards or digital documents for installation on the DPD.

In embodiments of the present invention and/or in embodiments of its related technologies, the issuer issues the DPD to a cardholder (or DPD user). In other embodiments of the present invention and/or in other embodiments of its related technologies, the DPD is issued by another authorized provider (sometimes referred to as an additional card issuer or distributor). However, in this specification the system will be exemplified with an initial card issuer.

In other embodiments of the present invention and/or in other embodiments of its related technologies, the provisioning infrastructure is operable with multiple issuers (for example, issuers for many different banks and/or financial institutions). In yet other embodiments of the present invention and/or in yet other embodiments of its related technologies, the provisioning network may be associated with a single issuer.

In embodiments of the present invention and/or in embodiments of its related technologies, an issuer will retain authority to deal with a PDTP which is hosted on a DPD. In some such embodiments of the present invention and/or in some such embodiments of its related technologies, the issuer has security control over at least a part of the DTPU. In some such embodiments of the present invention and/or in some such embodiments of its related technologies, this control may be implemented by allowing the issuer to have authority over one or more SSDs in the DTPU by having the SSD key for each of the SSDs. In other embodiments of the present invention and/or in other embodiments of its related technologies, an issuer is operable to delegate authority to deal with a PDTP which is hosted on a DPD, including security control over at least a part of the DTPU, and to have authority over one or more SSDs in the DTPU by having the SSD key for each of the SSDs. In some such embodiments of the present invention and/or in some such embodiments of its related technologies, such delegation is to a TSP.

In embodiments of the present invention and/or in embodiments of its related technologies, the issuer may also have control (being the owner) of a transaction key used for personalization of a PDTP.

In embodiments of the present invention and/or in embodiments of its related technologies, an issuer may have a primary purpose other than financial, but an interest in issuing financial instruments (including credit and debit cards) to customers. For example, a ride share provider may be an issuer, where it issues cards for payment of rides. In other embodiments of the present invention and/or in other embodiments of its related technologies, an issuer may be an entity or organization which provides non-financial documents, such as IDs, passports, and age verification cards.

In yet other embodiments of the present invention and/or in yet other embodiments of its related technologies, issuers are outside of the provisioning network, but in communication with the provisioning network to provide required digital objects, such as personalization data and/or personalization scripts.

In further embodiments of the present invention and/or in further embodiments of its technologies, an issuer includes one or more of a TSM and a TSP.

Security Hierarchy

In embodiments of the present invention and/or in embodiments of its related technologies, the DTPU is provided with a security hierarchy wherein the highest authority is allotted to the Issuer Security Domain (ISD), and each security domain lower than the ISD are referred to as Supplementary Security Domain (SSD). The SSDs or the security domains under the SSDs in the hierarchy may also be referred to as nodes. In yet other embodiments of the present invention and/or in yet other embodiments of its related technologies, a DTPU may include multiple security hierarchies. In embodiments of the present invention and/or in embodiments of its related technologies, the DTPU is provided with a security hierarchy wherein the first application installed is allotted to the Issuer Security Domain (ISD).

In some such embodiments of the present invention and/or in some such embodiments of its related technologies, each domain in the security hierarchy is secured with a cryptographic key (in embodiments, a symmetrical key), which allows access to that security domain for operations therein only by a party or parties which have access (or ownership) of the same cryptographic key. When a party has or has authority or control over a security domain, this typically means that party has in its possession or in its control the cryptographic key for that security domain, such that the party is able to encrypt (or sign) scripts with that cryptographic key so the encrypted scripts will target that security domain (or any one or more applications directly under that security domain) and authenticate to the SSD to be allowed to execute operations under that security domain.

In embodiments of the present invention and/or in embodiments of its related technologies, each bank (or financial institution), or issuing authority, or NBIA third party with a presence on the DPD (or on the DTPU) may have a different SSD in the DTPU security hierarchy.

In other embodiments of the present invention and/or in other embodiments of its related technologies, the security hierarchy is configured to allow one or more third parties, each of which is not a bank or issuing authority, to personalize applications on the DTPU. Such third parties may be referred to as Non-Bank/Issuing Authority (NBIA) third parties.

Typically, a bank or issuing authority, or NBIA third party, SSD will reside under the ISD.

In embodiments of the present invention and/or in embodiments of its related technologies, each bank, issuing authority, or NBIA may be capable of hosting PDTPs or transaction applications within a number of different payment schemes or a number of different non-payment schemes. For example, "Bank A" may be capable of hosting PDTPs or transaction applications using Visa and Mastercard, "Bank B" may be capable of hosting PDTPs or transaction applications using Visa, Mastercard and American Express. In some such embodiments of the present invention and/or in some such embodiments of its related technologies, each payment or non-payment scheme hosted by a bank or issuing authority may be under its own separate SSD, wherein each of the payment or non-payment scheme SSDs are directly under the SSD of the bank or issuing authority.

In yet other embodiments of the present invention and/or in yet other embodiments of its related technologies, on a DTPU there could be an SSD for "Bank A", and the domain of "Bank A" includes a "PDTP A1" (for example, a credit card PDTP) under "Payment Scheme A1" (for example, Visa), the domain of "Bank A" also includes a "PDTP A2" (for example, a debit card PDTP) under "Payment Scheme A2" (for example, Mastercard). The DTPU could further include an SSD for "Bank B", and the domain of "Bank B" includes a "PDTP B1" (for example, a credit card PDTP) under "Payment Scheme B1" (for example, American Express), the domain of "Bank B" also includes a "PDTP B2" (for example, a debit card PDTP) under "Payment Scheme B2" (for example, Visa).

In yet other embodiments of the present invention and/or in yet other embodiments of its related technologies, a third party which is a not bank may also have an SSD on a DTPU.

In embodiments of the present invention and/or in embodiments of its related technologies, the security hierarchy is arranged to be suitable for operation with a TSM. In such a hierarchy, there is a lower part of the hierarchy (or sub-hierarchy) in which an SSD at the top of the sub-hierarchy is controlled by an issuer and one or more lower SSDs under the top SSD each host a PDTP. In some such embodiments of the present invention and/or in some such embodiments of its related technologies, each lower SSD may be for a different payment scheme (for example, Mastercard, Visa, American Express). In some such embodiments of the present invention and/or in some such embodiments of its related technologies, each DTP/PDTP has one or more SSDs, each of the DTP/PDTP SSDs associated with at least one transaction application (each transaction application associated with the DTP/PDTP).

In other embodiments of the present invention and/or in other embodiments of its related technologies, the security hierarchy is arranged to be suitable for operation with a TSP. In some such embodiments of the present invention and/or in some such embodiments of its related technologies, in such a hierarchy, there is a lower part of the hierarchy (or sub-hierarchy) in which an SSD at the top of the sub-hierarchy is controlled by a payment scheme (for example, VTS for Visa, MDES for Mastercard, or AETS for American Express) and one or more lower SSDs under the top SSD. In some such embodiments of the present invention and/or in some such embodiments of its related technologies, each of the lower SSDs are for one or more issuers to host one or more PDTPs (wherein the SSDs may be owned by a TSP), wherein each PDTP is for the same payment scheme. In some such embodiments of the present invention and/or in some such embodiments of its related technologies, each DTP/PDTP has one or more SSDs, each of the DTP/PDTP SSDs associated with at least one transaction application (each transaction application associated with the DTP/PDTP).

In other embodiments of the present invention and/or in other embodiments of its related technologies, the security hierarchy is arranged to be suitable for operation with both a TSM and a TSP. In some such embodiments of the present invention and/or in some such embodiments of its related technologies, the security hierarchy includes sub-hierarchies structured for both TSM and TSP operations as described above.

In some embodiments of the present invention and/or in some embodiments of its related technologies, the security hierarchy includes a lock SSD, which is operable and used to lock all SSDs under it. In some such embodiments of the present invention and/or in some such embodiments of its related technologies, the lock SSD can implement a cascade lock (which is operable to lock all directly and indirectly related SSDs under the lock SSD), which is instigated by a single lock command and has the advantage of not requiring each SSD in the hierarchy under the lock SSD to be individually locked.

In some embodiments of the present invention and/or in some embodiments of its related technologies, the security hierarchy includes an application selection module SSD, being an SSD under which there are one or more selection applications, including one or both of a PSE selection application for contact digital transactions and a PPSE selection application for contactless digital transactions.

In other embodiments of the present invention and/or in other embodiments of its related technologies, the security hierarchy includes one or more Utility Security Domains (USDs), and it will be understood that the term USD is used in this specification to denote an SSD for a container. Each USD is used to host one or more containers for a payment scheme. In some such embodiments of the present invention and/or in some such embodiments of its related technologies, there are three USDs, with a first USD hosting containers for Visa, a second USD hosting ELFs for Mastercard, and a third USD hosting ELFs for American Express.

In some embodiments of the present invention and/or in some embodiments of its related technologies, a security domain (under an ISD, a USD, or an SSD) in the security hierarchy is configured so that its key accesses only the immediate security domain of the ISD, USD, or SSD. In other embodiments of the present invention and/or in other embodiments of its related technologies, the security domain is configured so that its key accesses all security domains under the immediate security domain.

In some embodiments of the present invention and/or in some embodiments of its related technologies, a bank or issuing authority (for example a bank or issuing authority which issues the DPD) will manage an ISD for a DTPU (including holding and operating with the ISD). In other embodiments of the present invention and/or in other embodiments of its related technologies, a third-party management agent (separate from a bank or issuing authority which issues the DPD) may be appointed to manage an ISD for a DTPU (including holding and operating with the ISD). In yet other embodiments of the present invention and/or in yet other embodiments of its related technologies, a bank or issuing authority and a third-party management agent may both manage an ISD for a DTPU.

In some embodiments of the present invention and/or in some embodiments of its related technologies, the DTPU has one SSD as a domain for a bank or other type of issuing authority. In such embodiments of the present invention and/or in such embodiments of its related technologies, the DTPU has a plurality of SSDs as domains for a different bank or other type of issuing authority. In some other embodiments of the present invention and/or in some other embodiments of its related technologies, at least one SSD of the one or plurality of SSDs hosts an at least one PDTP or at least one transaction application. In some other embodiments of the present invention and/or in some other embodiments of its related technologies, though an SSD for a bank or other type of issuing authority may be installed on the DTPU, that particular SSD may not host any DTP/PDTP or transaction application.

In some embodiments of the present invention and/or in some embodiments of its related technologies, each DTP/PDTP is associated with a payment scheme. In some embodiments of the present invention and/or in some embodiments of its related technologies, only one DTP/PDTP or one transaction application for each payment scheme is allowed under a particular SSD for a bank or other type of issuing authority. In some other embodiments of the present invention and/or in some other embodiments of its related technologies, more than one DTP/PDTP or more than one transaction application for each payment scheme is allowed under a particular SSD for a bank or other type of issuing authority.

In some embodiments of the present invention and/or in some embodiments of its related technologies, the DTPU is operable to have installed thereon a plurality of SSDs for different banks or other types of issuing authority, but the DTPU is limited to allowing DTPs/PDTPs or transaction applications hosted thereon to be associated with only one payment scheme. In some other embodiments of the present invention and/or in some other embodiments of its related technologies, the DTPU is limited to allowing DTPs/PDTPs or transaction applications hosted thereon to be associated with only a limited range of payment schemes.

In some embodiments of the present invention and/or in some embodiments of its related technologies, the DTPU is operable to host a variety of SSDs for different banks or other types of issuing authorities, a variety of PDTPs or transaction applications (sometimes for a variety of payment schemes) under those SSDs, wherein some of the PDTPs or transaction applications have associated tokenized PDTPs or tokenized transaction applications and some of the PDTPs or transaction applications do not have associated tokenized PDTPs or tokenized transaction applications, wherein some of the PDTPs or transaction applications and/or some of the tokenized PDTPs or tokenized transaction applications have an associated variety of transaction types and some of the PDTPs or transaction applications and/or some of the tokenized PDTPs or tokenized transaction applications do not have associated transaction types, wherein each PDTP or transaction application, tokenized PDTP or tokenized transaction application, and/or transaction type has one or more associated transaction applications, and wherein the one or more associated transaction applications includes a single dual contact/contactless interfaces transaction application, two transaction applications each having either a contact or contactless interface, or a mixture of dual interface and single interface transaction applications. In some embodiments of the present invention and/or in some embodiments of its related technologies, the DTPU hosts some or all the varieties of bank/issuing authority SSDs, PDTPs or transaction applications, tokenized PDTPs or tokenized transaction applications, transaction types, and transaction applications. In some embodiments of the present invention and/or in some embodiments of its related technologies, the DTPU hosts only a single bank/issuing authority SSD, with a single PDTP having one or more associated transaction applications or a single transaction application.

In other embodiments of the present invention and/or in other embodiments of its related technologies, the DTPU is operable to host only a limited range of the varieties of bank/issuing authority SSDs, personalities, tokenized PDTPs or tokenized transaction applications, transaction types, and transaction applications mentioned above.

Controlling Authority Security Domain (CASD)

In embodiments of the present invention and/or in embodiments of its related technologies, the DTPU includes a domain called a Controlling Authority Security Domain (CASD). A CASD is an additional security domain typically available in mobile devices applications on a UICC or eSE chips.

In some embodiments of the present invention and/or in some embodiments of its related technologies, the CASD is for brokering trust between the DPD manager and other parties, such as an issuer or a NBIA.

In some embodiments of the present invention and/or in some embodiments of its related technologies, the DPD manager is operable for installing SSDs and instantiating transaction applications under those SSDs, in which case, the DPD manager has control of the cryptographic key for each SSD it has installed. In some such embodiments of the present invention and/or in some such embodiments of its related technologies, the DPD manager is to pass control of one of the security domains to another party (such as an issuer or a NBIA) so the other party can perform operations on the one or more transaction applications in that security domain, but it is not desired that the DPD manager provide the cryptographic key for the SSD directly to the other party. The CASD, which is controlled by a mutually trusted third party is operable to assist in performing a key rotation on the SSD, so that control of the SSD is passed to the other party, wherein the SSD is now controlled by the cryptographic key of the other party, without this key having potentially been revealed to the DPD Manager. The other party is then able to authenticate to the SSD with its cryptographic key so that it can perform operations on the one or more transaction applications in that security domain. In some such embodiments of the present invention and/or in some such embodiments of its related technologies, the other party can personalise the one or more transaction applications.

In some such embodiments of the present invention and/or in some such embodiments of its related technologies, the CASD is provided to a "finance" approved chip (as typically used in credit and debit cards) where used as the DTPU. It will be appreciated that such "finance" chips have not required a CASD previously as they were not provided with any one or more of: new personalities, new DTPs/PDTPs, or new transaction applications from a provisioning agent.

In other embodiments of the present invention and/or in other embodiments of its related technologies, the DTPU is a UICC/eSE type chip wherein the DTC (or, more generally, the DPD where appropriate) is adapted to allow the UICC type chip to operate for both contact and contactless transactions, and wherein the DTPU has a CASD installed.

In some embodiments of the present invention and/or in some embodiments of its related technologies, the CASD is on a DTPU when issued by a chip manufacturer or provider. In other embodiments of the present invention and/or in other embodiments of its related technologies, a CASD may be provided to the DTPU when it is remote from a provisioning agent or a provisioning network.

Cryptographic Keys

In embodiments of the present invention and/or in embodiments of its related technologies, each security domain in a security hierarchy (for example, including ISD or SSD security domains) has an associated cryptographic key or keyset, sometimes referred to simply as a key or keyset. If an operation is to be performed under a particular security domain a cryptographic key is required to generate a session key for encrypting a script or command so that the script or command is able to authenticate to the SSD of the security domain. In embodiments of the present invention and/or in embodiments of its related technologies, one or more security domains are configured so that its key accesses only the directly associated applications of the SSD or may be configured so that its key accesses all security domains of SSDs under the immediate SSD.

In embodiments of the present invention and/or in embodiments of its related technologies, in a security hierarchy there may be a number of different types of domain, including ISD, SSD, CASD and USD (all of which are SSDs with a flag set to provide them with certain privileges).

Transaction Keys

In embodiments of the present invention and/or in embodiments of its related technologies, in a transaction with a DTD security is required between the DTPU and the issuing bank, when engaging in a digital transaction with the DTD. In part, the security is provided by a cryptographic key which is included in personalization of a DTP (to become a PDTP). The transaction key is typically owned by and known only to the issuer of the PDTP, which may be a bank or other such institution.

In embodiments of the present invention and/or in embodiments of its related technologies, a transaction session key is generated using the transaction key for a PDTP (or for any of the transaction applications associated with the PDTP) and other inputs for each digital transaction between the DPD (or the DTPU thereon) and a DTD.

Transaction Applications

In embodiments of the present invention and/or in embodiments of its related technologies, the DPD is operable for payment digital transactions. Transaction applications used for payment transactions may be referred to as payment applications. In other embodiments of the present invention and/or in other embodiments of its related technologies, the DPD is operable for non-payment digital transactions, such as identification transactions, wherein the DPD may adopt the personality of a passport or a drivers licence.

In embodiments of the present invention and/or in embodiments of its related technologies, each transaction application has a transaction application identifier. In some embodiments of the present invention and/or in some embodiments of its related technologies, the transaction application identifier is an Application ID (AID).

In some embodiments of the present invention and/or in some embodiments of its related technologies, for example, on JavaCards (or on DPDs using JavaCard or JavaCard-like technology), transaction applications are implemented on the DTPU as Java applets, and these are sometimes referred to as transaction apps, payment apps, or simply as apps.

In embodiments of the present invention and/or in embodiments of its related technologies, each transaction application is instantiated on the DTPU and, when personalized, includes data, such as the PAN of the PDTP with which the transaction application is associated. In other embodiments of the present invention and/or in other embodiments of its related technologies, the PAN and other data of the personality are located in another application also associated with the personality. In yet other embodiments of the present invention and/or in yet other embodiments of its related technologies, the PAN and other data of the personality are located in another memory area of the DTPU to which the transaction application has access to read the PAN. The other data of the personality may include expiry date of the personality, owner's name (cardholder's name) for the personality, and tokenized PANs of the personality.

In embodiments of the present invention and/or in embodiments of its related technologies, the DPD manager is operable to provide scripts to the DTPU for instantiating transaction applications on the DTPU. In yet other embodiments of the present invention and/or in yet other embodiments of its related technologies, other provisioning agents, such as TSMs and TSPs are operable to provide scripts to the DTPU for personalizing transaction applications.

In embodiments of the present invention and/or in embodiments of its related technologies, a DTP has one or more associated transaction applications. In such embodiments of the present invention and/or in such embodiments of its related technologies, the one or more transaction applications are associated with the DTP (given that the one or more transaction applications have not yet been personalized).

In embodiments of the present invention and/or in embodiments of its related technologies, a PDTP has one or more associated transaction applications. In such embodiments of the present invention and/or in such embodiments of its related technologies, the one or more transaction applications are associated with the PDTP after personalization of the one or more transaction applications.

Transaction Interface

In embodiments of the present invention and/or in embodiments of its related technologies, a transaction application may have one or more interfaces, which are sometimes referred to as digital transaction interfaces or digital transaction communication channels. In some embodiments of the present invention and/or in some embodiments of its related technologies, a single transaction application is provided which has a dual interface for both contact and contactless transactions, and thus the same AID is supplied to the application selection module for the PSE (contact selection application) for contact transaction application identification and for the PPSE (contactless selection application) for contactless transaction application identification.

In other embodiments of the present invention and/or in other embodiments of its related technologies, two transaction applications are provided, one being a contact transaction application with a contact transaction interface and the other being a contactless transaction application with a contactless transaction interface. In such implementations, a different AID is supplied to the application selection module for the PSE and for the PPSE.

In yet other embodiments of the present invention and/or in yet other embodiments of its related technologies, it is possible to provide both a dual contact/contactless interface transaction application and the two transaction applications each having a single contact or contactless interface.

Digital Transaction

In embodiments of the present invention and/or in embodiments of its related technologies, a digital transaction occurs between the DTPU of a DPD and a DTD in a transaction network. In embodiments, the digital transaction of the DPD is governed by EMVCo standards for data transfer and security between the DTPU and the DTD. Although, the present invention (and its related inventive technologies) contemplates digital transactions for both financial and non-financial purposes, the majority of the description and embodiments are directed towards financial digital transactions, sometimes referred to as payment transactions or simply as payments.

Transaction Types

In embodiments of the present invention and/or in embodiments of its related technologies, each PDTP/personality may have one or more transaction types (or digital transaction types) associated therewith. In some embodiments of the present invention and/or in some embodiments of its related technologies, a transaction type may be an account, and if a PDTP/personality has two associated transaction types, one transaction type could be an account for transactions in USD currency and the other transaction type could be an account in Euro currency. In some such embodiments of the present invention and/or in some such embodiments of its related technologies, a card user is able select which transaction type will be used for the PDTP/personality during a digital transaction and can select, for example, among different currency accounts linked to the same PDTP/personality (or linked to the same primary identifier or PAN). In some such embodiments of the present invention and/or in some such embodiments of its related technologies, different transaction types associated with a single PDTP/personality may also include transaction types for the same account, but with different information registered for an account record or statement.

In some such embodiments of the present invention and/or in some such embodiments of its related technologies, each transaction type is associated with one transaction application of a PDTP. In some such embodiments of the present invention and/or in some such embodiments of its related technologies, each transaction application associated with a transaction type will be personalized with data such that the associated transaction will operate in a digital transaction to associate that digital transaction with the transaction type.

In embodiments of the present invention and/or in embodiments of its related technologies, examples of different transaction types which may be associated with a single PDTP/personality include:
  Two or more different currency accounts;
  Multiple accounts for different family members (partners, children, siblings, parents, etc);
  Multiple accounts for different spending categories in a business (or could be the same account with different registrations in an account statement);
  Business/personal spending (could be the same account, but registered differently on an account statement);
  Different transaction types for multiple loyalty reward schemes (perhaps each linked to the same account).

In some embodiments of the present invention and/or in some embodiments of its related technologies, a card user (or DPD user) is able select which transaction type will be used for the PDTP/personality during a digital transaction and can select, for example, among different currency accounts linked to the same personality (or linked to the same primary identifier or PAN for each of the transaction applications in the associated PDTP).

In other embodiments of the present invention and/or in other embodiments of its related technologies, the DPD is operable to automatically select which transaction type is used for the current operating personality of the DPD. In some such embodiments of the present invention and/or in some such embodiments of its related technologies, the DPD user programs the DPD to always use a US currency account for whichever personality is selected to be the operable personality of the DPD, provided a US currency account is an available transaction type option for the selected operating personality. The programming for the automatic transaction type selection could be effected through the DPD user interface or through a DAD user interface when the DAD is linked to the DPD for communication therebetween. In a further usage example for such embodiments, the DPD user may be travelling in Europe and could program the DPD to use Euro account transaction types (or payment types), where such transaction types are available for the selected personality. In some such embodiments and in scenarios where a particular currency account transaction type for a personality is preferred, but isn't available, the DPD is operable to default to a selected default transaction type.

Digital Transaction Package (DTP)/Personalized Digital Transaction Package (PDTP)

In embodiments of the present invention and/or in embodiments of its related technologies, a Digital Transaction Package (DTP) is a grouping of one or more transaction applications, each transaction application having either or both of a contact and contactless interface for engaging in digital transactions with DTDs in a transaction network.

In embodiments of the present invention and/or in embodiments of its related technologies, a DTP is instantiated on a DTPU using a container, and extradited to an SSD elsewhere in the security hierarchy of the DTPU. Once extradited to its target SSD, the DTP is then personalized to become a Personalized DTP (PDTP).

In embodiments of the present invention and/or in embodiments of its related technologies, the SSD to which the DTP is extradited is installed on the DTPU in a selected place in the security hierarchy in advance of creating and extraditing the DTP. In some such embodiments of the present invention and/or in some such embodiments of its related technologies, the SSD is created by one or more scripts provided to the DTPU by the DPD manager.

In embodiments of the present invention and/or in embodiments of its related technologies, a DTP is created on the DTPU by reference to a container for a particular payment scheme, which provides a library of functions for the one or more transaction applications associated with the DTP to operate on the DTPU for transactions. For example, a DTP for a Visa credit card is created on the DTPU by sending a script of commands to an ELF (container) for the Visa credit card, wherein the container creates the one or more transaction applications associated with the DTP in a part of the memory of the DTPU. At this stage, the DTP has not been personalized and so its one or more associated transaction applications do not have any one or more of an associated primary identifier (PAN), an expiry date, a transaction key and other personalization data, but the DTP has only the one or more associated transaction applications and transaction interfaces, none of which have been personalized.

In this specification, unless otherwise indicated or where the context requires or benefits, a DTP includes only the transaction applications and/or associated payment interfaces. A DTP does not include personalization data associated with the specific card. For example, a DTP for a credit card does not include the PAN, cardholder name, expiry date and other personalization data. A DTP may be personalized to become a Personalized Digital Transaction Package (PDTP), in which case personalization data is provided to or with the DTP.

In embodiments of the present invention and/or in embodiments of its related technologies, personalization data is written to the DTP to become a PDTP. In some embodiments, personalization data is provided to the DTPU on which a DTP is installed in the form of a script so that the DTPU can transform the DTP to a PDTP.

In embodiments of the present invention and/or in embodiments of its related technologies, a DTP/PDTP is operable for both contact and contactless transactions (or has one or more associated transaction applications operable for both contact and/or contactless transactions). In other embodiments, a DTP/PDTP may be operable only for one of either contact or contactless transactions (or has one or more associated transaction applications operable for only contact or contactless transactions).

In embodiments of the present invention and/or in embodiments of its related technologies, some DTP/PDTPs are suitable for payment transactions, and some for non-payment transactions, such as secure storage and presentation (or secure presentation) personal ID, age verification and other non-payment functions.

In embodiments of the present invention and/or in embodiments of its related technologies, the scripts to create the DTP/PDTP may also be provided to the DPD with other DPD files and data (including metadata), including:
- file(s) to provide a logo or mark for the payment scheme associated with the DTP/PDTP to be displayed on the graphical user interface of the DPD;
- file(s) containing one or more AIDs associated with the one or more transaction applications which are provided to the DTPU for updating the application selection module, including the PSE and PPSE selection applications, when changing the operating personality of the DTPU (or the DPD) to that associated with the PDTP. In alternative embodiments, the DTP/PDTP can be provided along with one or more modified application selection module file including AIDs for the one or more transaction applications which are provided with the DTP/PDTP, wherein the modified application selection module file are installed onto the DTPU to overwrite or substitute for the previously installed modified application selection module files;
- file(s) containing the PAN of the PDTP for display on the graphical user interface when the PDTP is the operating PDTP for the DTPU, associated with the operating personality of the DPD (sometimes referred to as metadata).

In embodiments of the present invention and/or in embodiments of its related technologies, each PDTP is an aspect of a personality, the PDTP being installed on the DTPU, and other aspects of a personality are the metadata associated with the PDTP. In embodiments of the present invention and/or in embodiments of its related technologies, metadata associated with the PDTP and constituting the personality is stored by any one or more of: the DPD, the DAD, and the DPD manager. In embodiments of the present invention and/or in embodiments of its related technologies, the metadata associated with the PDTP and constituting the personality is stored by any one or more of: a TSM, a TSP, and an issuer.

In some embodiments of the present invention and/or in some embodiments of its related technologies, the DTPU may be provided with a container for a new payment scheme if that payment scheme does not have a container on the DTPU, or if a replacement container is required for an existing payment scheme on the DPTU. If loading a new payment scheme container onto the DPTU, a new USD security domain is created and the new container loaded (or installed) therein. In embodiments, the script(s) to create the USD may be provided by one party, such as the DPD manager, and the script(s) to create the container under that USD may be provided by the payment scheme or the DPPD manager. In some such embodiments, a key rotation for the USD may be required before the container is installed in the USD by the payment scheme.

In some embodiments of the present invention and/or in some embodiments of its related technologies, each DTP/PDTP is associated with a separate security domain. In such embodiments, all commands (as APDUs) for or associated with the DTP/PDTP must be authenticated to the security domain of the DTP/PDTP. Typically, the security domain is an SSD. In some such embodiments of the present invention and/or in some such embodiments of its related technologies, the SSD of the DTP/PDTP can host contact and contactless instances (applications) together or keep them in separate sub-security domains (sub-SSDs).

In some embodiments of the present invention and/or in some embodiments of its related technologies, a security domain associated with a DTP/PDTP (as associated with a personality of the DPD) can be re-personalized by substituting a keyset (a set of cryptographic keys, for example, an SCP02 keyset for OTA communications, or SCP80/81 for OTI communications) for that security domain with a new keyset. In such embodiments, and particularly where the instances (applications) are in a separate sub-domain, changing the keyset will not affect the ELFs (containers) or applications/instances associated to that security domain.

In some embodiments of the present invention and/or in some embodiments of its related technologies, a DTP/PDTP has a plurality of associated transaction applications wherein one or more of the plurality of transaction applications are for a first transaction type, and one or more of the plurality of transaction applications are for a second transaction type. In such embodiments, the first transaction type is for a first account associated with the PAN of the PDTP and the second transaction type is for a second account associated with the PAN of the PDTP. In embodiments, in personalization, the one or more transaction applications associated with the first transaction type are personalized with data including a first sequence number and the one or more transaction applications associated with the second transaction type are personalized with data including a second sequence number.

In an example usage of such embodiments, a DPD user may choose the PDTP with different transaction type transaction applications from amongst a number of selectable PDTPs installed on the DTPU of the DPD, the DPD user may then choose an account for that PDTP from amongst a number of selectable accounts for that PDTP, the MCU of the DPD requests the scripts from the OSE to lock all PDTPs (or lock all the transaction applications associated therewith) in the DTPU (by targeting the Lock SSD). The MCU then requests an unlock script targeted only at the one or more transaction applications in the selected PDTP which are associated with the selected transaction type (selected account), the MCU send the unlock script to the DPTU for execution. In some such embodiments, the unlock script targets the application selection module (by targeting one of the PSE or PPSE selection applications in the application selection module) to first update the registry of the application selection module to include the AID(s) of the one or more transaction applications to be unlocked, the application selection module then targets the one or more transaction applications to be unlocked (in some circumstances, the SSD of the targeted transaction applications can remain locked while the transaction applications are targeted to be locked or unlocked). The DPD can then be presented to a DTD for a digital transaction, either by contact (dipping) or contactless (waving or tapping). The application selection module will provide the AIDs (in a candidate list) to the DTD, and the unlocked transaction applications will be available for the digital transaction with the DTD (the locking of non-selected transaction applications being important if the DTD engages in direct selection, rather than using the PSE for a contact transaction). During such a digital transaction, the transaction application provides the PAN and the sequence number (and other information) to the DTD, wherein the provided sequence number allows the issuer (say, a bank) to target the desired associated one of the one or more accounts for that PAN for debit.

Personality

In embodiments of the present invention and/or in embodiments of its related technologies, a personality includes a PDTP (hosted on the DTPU), along with metadata associated with the PDTP. In some embodiments of the present invention and/or in some embodiments of its related technologies, the metadata is hosted by any one or more of: the DPD (for example, on the MCU), the DAD, and the DPD manager.

In embodiments of the present invention and/or in embodiments of its related technologies, a personality or digital transaction personality includes aspects of the external appearance and operation of a PDTP (as observed by a user of the PDTP). In embodiments of the present invention and/or in embodiments of its related technologies, the personality is also associated with a cardholder name, expiry date, a CVV and various other data, however, in embodiments, the primary association of each personality is its PAN or its unique identifier (for a PAN, each issuer has a different combination of the first six PAN digits and each cardholders account number (the remainder of the PAN digits) is different). For payment transaction personalities, such as credit or debit cards, the PAN is always numeric. Other types of transaction cards or documents, such as passports, drivers licences, and proof of age cards may have unique identifiers which are alphanumeric.

In embodiments of the present invention and/or in embodiments of its related technologies, a DTPU may have one or more personalities (PDTPs), wherein each personality is associated with at least a PAN or another unique identifier.

In embodiments of the present invention and/or in embodiments of its related technologies, each personality (or associated DTP/PDTP) is associated with one or more transaction applications.

In embodiments of the present invention and/or in embodiments of its related technologies, the DPD can have more than one active personality at the same time. In some such embodiments of the present invention and/or in some such embodiments of its related technologies, the DPD has an active financial personality (for example, a credit card), and an active non-financial personality (such as a drivers licence). These two different types of personality have different transaction applications on the DTPU associated with the personalities, and the different transaction applications are operable with different types of DTD. Accordingly, the personalities, while both being active on the DPD (and the DTPU) will not have a conflict when used at the different DTDs. In some other such embodiments of the present invention and/or in some other such embodiments of its related technologies, there can be two financial personalities active on the DPD at the same time, however, one personality will be restricted to contact only transactions, and the other personality will be restricted to contactless only transactions, otherwise the two financial personalities would cause conflicts in the DTD behaviour.

Tokenized PDTP

In embodiments of the present invention and/or in embodiments of its related technologies, each PDTP may be associated with one or more tokenized transaction applications, wherein the primary identifier for each associated transaction application has a different tokenized value (for finance PDTPs the primary identifier is a PAN). Where token PDTPs are used, for enhanced security, the graphical display of the DPD may display only the PAN for the token PDTP, but not display the primary PAN of that PDTP.

In embodiments of the present invention and/or in embodiments of its related technologies, when personalizing a DTP by personalizing each of the one or more transaction applications associated with the DTP, each of the one or more transaction applications is personalized with a different tokenized identifier associated with the one primary identifier.

In embodiments of the present invention and/or in embodiments of its related technologies, a tokenized PDTP with associated tokenized transaction applications may provide for enhanced security as the actual primary identifier (or PAN) of the PDTP is not revealed for a transaction and the tokenized primary identifier is used instead. In some embodiments of the present invention and/or in some embodiments of its related technologies, the graphical display of the DPD (where optionally having a graphical display) may display only the tokenized primary identifier (or PAN) for the unlocked tokenized transaction application, but not display the primary identifier (or primary PAN) of that unlocked transaction application.

In embodiments of the present invention and/or in embodiments of its related technologies, one of the one or more tokenized transaction applications of a tokenized PDTP associated with a personality is used for a digital transaction instead of the non-tokenized transaction application.

In embodiments of the present invention and/or in embodiments of its related technologies, where one or more tokenized transaction applications are available (each tokenized transaction application associated with one of one or more tokenized PDTPs and each tokenized PDTP associated with a personality or tokenized personality), the DPD is operable for a DPD user (sometimes referred to as a DPD-holder, DTC user or cardholder) to select from tokenized transaction applications and a non-tokenized transaction applications for use in a digital transaction. In further embodiments of the present invention and/or in further embodiments of its related technologies, the DPD is operable for a DPD user to select one of a plurality of tokenized transaction applications for use in a digital transaction.

In yet other embodiments of the present invention and/or in yet other embodiments of its related technologies, the DPD is configured to use a tokenized transaction application of there is at least one available tokenized transaction application for an active PDTP associated with an operating personality of the DPD. In further embodiments of the present invention and/or in further embodiments of its related technologies, if there is a range of available tokenized transaction applications for an active PDTP associated with an operating personality of the DPD, the DPD is configured to select automatically one of the tokenized transaction applications. In some such embodiments of the present invention and/or in some such embodiments of its related technologies, the automatic selection is random or pseudo-random from the range. In other such embodiments, the selection is based on a pre-set order of the tokenized transaction applications in the range.

Although a Token Service Provider (TSP) may be used in some embodiments to provision one or more DTPs/PDTPs (each PDTP associated with a personality of the DPD) to the DTPU, it should be noted that such provisioning may use only a single PAN for each PDTP (that is, a single PAN for personalizing the one or more transaction application associated with the DTP/PDTP) as provided by the TSP, rather than a plurality of tokenized PANs related to a primary PAN of a PDTP.

Application Selection Module and Selection Applications

When a DPD is presented to a DTD for a digital transaction, there must be a determination as to which one of possibly multiple PDTPs and/or which of the transaction applications associated with the one PDTP is/are to be used for effecting the payment transaction. Different DTDs in different parts of the world will likely operate with different payment networks (transaction providers), and so it may be that a DTPU having several installed PDTPs with one or more transaction applications associated with each PDTP can effect the transaction with only a subset of the several transaction applications. The process for selection of the one or more payment applications on a DPD which are able to effect a payment transaction with payment networks available to the DTD is called application selection. Each transaction provider is an agent remote from the DTD and is able to cause required actions for the transaction to be effected. For payment transactions between a payment DTC and a payment DTD, each transaction provider operable with the DTD is a payment network and is able to authorize a payment from an account of the cardholder to an account of the owner of the DTD.

Application selection can occur in one of three ways: direct selection, selection through the Payment System Environment (PSE), or selection through the Proximity Payment System Environment (PPSE). Direct selection and PSE are employed for contact digital transactions with a DTD. PPSE is employed for contactless digital transactions.

In direct selection, the DTD directly interrogates the SE/EMV+GP chip to find the unique AIDs for the payment applications. The DTD will then determine which, if any, of the available applications it is capable of operating to effect a payment transaction with payment networks available to the DTD. This process is liable to have some uncertainties as DTDs operate in different ways. The DTD may simply choose the first AID with which it can operate or may look through all the available AIDs on the SE/EMV+GP chip. The DTC is unable to control the direct selection process.

PSE operates by means of an application which has an associated unique AID and may be referred to as a selection application, a PSE selection application, or a PSE application. The PSE method is optional for both a DTC and DTD for a contact transaction, with direct selection being a fall-back option. Depending on the region, the network, setup and configuration or the supplier of the DTD either a PSE or a direct selection method is used. For a standard credit or debit card which has a single personality, the PSE application selection method operates as follows:

the DTD selects the PSE;
the File Control Information (FCI) returned by the PSE contains the AID of the Payment System Directory;
the DTD selects the Payment System Directory ADF;
for each record in the ADF the DTD reads the payment application AID;
if the AID matches an AID (or, more likely, an RID) on the DTD's list of payment applications with which it is capable of conducting a transaction, the AID is entered onto the candidate list created by the DTD;
after the last record is processed the DTD selects a payment application AID based on priorities kept by the PSE;
the DTD then processes the payment transaction using the selected payment application.

For PSE, if the AID on the candidate list (sometimes referred to as a PSE list) does not match an AID with which the DTD is configured to operate, the DTD is able to revert to direct selection.

PPSE also operates by means of an application with a unique AID. The PPSE method is mandatory for both the DTC and DTD for contactless transactions. Unlike PSE, the PPSE application returns a list of available payment application AIDs in its FCI. For a standard credit or debit card having a single personality, the PPSE application selection method operates as follows:

the DTD selects the PPSE;
the PPSE FCI returned has a list of AIDs and meta information (for example, payment application priority) for selection by the DTD;
if the AID matches an AID on the DTD's list of payment applications with which it is capable of conducting a transaction, the AID is entered onto the candidate list created by the DTD;
after the last record is processed the DTD selects a payment application AID based on priorities in the PPSE FCI;
the DTD then processes the payment transaction using the selected payment application.

The PSE application and PPSE application on the SE/EMV+GP chip are static in that the list of AIDs for these selection applications (typically populated during personalization of a traditional payment card) is not changed for the operable life of the DTC. Further, traditional PSE and PPSE applications are adapted to function with a SE/EMV+GP chip having a single personality installed thereon. Implementation of PPSE on mobile payment devices, such as smartphones (on an eSE), is different from implementation of PPSE for SE/EMV+GPs on DTCs. On a mobile device PPSE dynamically accommodates for changes in the personalities on the device, whereas PPSE on a DTC does not need to accommodate such change as, with traditional DTCs, the personalities have remained fixed after issuance of the DTC to a cardholder.

In some of the selection application embodiments discussed below, the one or more transaction application identifiers set in the one or more selection applications will be understood to be identifiers of one or more unlocked transaction applications (associated with an active (or activated) PDTP of the DTPU, which is associated with a personality of the DPD selected to be the operable personality of the DPD). In some other embodiments selection application embodiments discussed below, the one or more transaction application identifiers set in the one or more selection applications will be understood to be identifiers of one or more unlocked tokenized transaction applications (associated with an active (or activated) tokenized PDTP of the DTPU, which is associated with a personality (or tokenized personality) of the DPD selected to be the operable personality of the DPD). In some other embodiments selection application embodiments discussed below, the one or more transaction application identifiers set in the one or more selection applications will be understood to be identifiers of one or more transaction applications associated with a selected transaction type itself (associated with an active (or activated) PDTP of the DTPU, which is associated with a personality of the DPD selected to be the operable personality of the DPD). In some other application selection module embodiments discussed below, the one or more transaction application identifiers set in the one or more selection applications will be understood to be identifiers of one or more tokenized transaction applications associated with a selected transaction type itself (associated with an active (or activated) tokenized PDTP of the DTPU, which is associated with a personality (or tokenized personality) of the DPD selected to be the operable personality of the DPD).

In embodiments of the present invention and/or in embodiments of its related technologies, the DTPU includes an application selection module, wherein the application selection module includes one or both of a selection application for contact digital transactions (PSE application) and a selection application for contactless digital transactions (PPSE application).

In embodiments of the present invention and/or in embodiments of its related technologies, the application selection module is operable to be set with one or more transaction application identifiers. In some such embodiments of the present invention and/or in some such embodiments of its related technologies, the transaction application identifier is an application ID (AID).

In embodiments of the present invention and/or in embodiments of its related technologies, when a personality is selected to be the active personality of the DPD, the application selection module is set with one or more transaction application identifiers associated with the transaction applications of the PDTP associated with the personality selected to be the active personality.

In embodiments of the present invention and/or in embodiments of its related technologies, the PDTP of a personality has a single associated transaction application with dual contact/contactless interfaces, and the single associated transaction application has an identifier, which in some embodiments is an AID. In such embodiments of the present invention and/or in such embodiments of its related technologies, the PSE and the PPSE selection applications are each set with the same identifier.

In embodiments of the present invention and/or in embodiments of its related technologies, a PDTP has two associated transaction applications, one with a contact interface and the other with a contactless interface, and the associated transaction applications have different transaction application identifiers from each other. In such embodiments of the present invention and/or in such embodiments of its related technologies, the PSE selection application is set with the identifier of the transaction application having the contact interface and the PPSE selection application is set with the identifier of the transaction application having the contactless interface.

In other embodiments of the present invention and/or in other embodiments of its related technologies, where a tokenized PDTP includes one or more tokenized transaction applications, and where one of the tokenized transaction applications is selected to be the unlocked transaction application when the PDTP is selected to be the active PDTP (or to be one of the active PDTPs) on the DTPU, and where the unlocked transaction application is dual interface for both contact and contactless transactions, the transaction application identifier (AID) for the unlocked transaction application is provided to the application selection module to set both the contact selection application and the contactless selection application with the same transaction application identifier.

In yet other embodiments of the present invention and/or in other embodiments of its related technologies, where a tokenized PDTP includes two or more tokenized transaction applications, and where two of the tokenized transaction applications (each having the same tokenized PAN) are selected to be the unlocked transaction applications when the PDTP is selected to be the active PDTP (or to be one of the active PDTPs) on the DTPU, and where the unlocked transaction applications each have one of a contact interface and a contactless interface, the transaction application identifiers (AIDs) for each of the unlocked transaction application is provided to the application selection module to set each of the contact selection application and the contactless selection application with the respective transaction application identifier for the two unlocked tokenized transaction applications.

In other embodiments of the present invention and/or in other embodiments of its related technologies, where a PDTP includes two or more transaction type transaction applications, and where one of the transaction type transaction applications is selected to be the unlocked transaction application when the PDTP is selected to be the active PDTP (or to be one of the active PDTPs) on the DTPU, and where the unlocked transaction application is dual interface for both contact and contactless transactions, the transaction application identifier (AID) for the unlocked transaction application is provided to the application selection module to set both the contact selection application and the contactless selection application with the same transaction application identifier.

In yet other embodiments of the present invention and/or in other embodiments of its related technologies, where a PDTP includes two or more transaction type transaction applications, and where two of the transaction applications (each having the same transaction type identifier) are selected to be the unlocked transaction applications when the PDTP is selected to be the active PDTP (or to be one of the active PDTPs) on the DTPU, and where the unlocked transaction applications each have one of a contact interface and a contactless interface, the transaction application identifiers (AIDs) for each of the unlocked transaction application is provided to the application selection module to set each of the contact selection application and the contactless selection application with the respective transaction application identifier for the two unlocked tokenized transaction applications.

In other embodiments of the present invention and/or in other embodiments of its related technologies, the DTPU hosts a variety of SSDs for different banks or other types of issuing authorities, a variety of PDTPs (sometimes for a variety of payment schemes) under those SSDs, wherein some of the PDTPs have associated tokenized transaction applications (tokenized PDTPs) and some of the PDTPs do not have associated tokenized transaction applications, wherein some of the PDTPs and/or some of the tokenized PDTPs have an associated variety of transaction types and some of the PDTPs and/or some of the tokenized PDTPs do not have associated transaction types, wherein each PDTP, tokenized PDTP, and/or transaction type PDTP has one or more associated transaction applications, and wherein the one or more associated transaction applications include dual contact/contactless interface transaction application, two transaction applications each having either a contact or contactless interface, or a mixture of dual interface and single interface transaction applications. In such embodiments, how the transaction application identifier(s) for the one or more selection applications are set will depend on whether the selected PDTP, tokenized PDTP or transaction type PDTP is associated with a single dual interface transaction application or two single interface transaction applications.

In other embodiments of the present invention and/or in other embodiments of its related technologies, the one or more selection applications are set with an identifier by placing into a registry of the application selection module the transaction application identifier(s) of one or more transaction applications associated with a selected operating PDTP, tokenized PDTP, and/or transaction type PDTP (associated with the operating personality of the DPD). In some such embodiments, at least one of the selection applications is operable to automatically set its transaction application identifier when the transaction application identifier is placed into the application selection module registry. In other embodiments of the present invention and/or in other embodiments of its related technologies, at least one of the selection applications has its identifier set when the identifier is placed into the registry and the selection application is provided a command to retrieve the identifier from the registry. In other embodiments of the present invention and/or in other embodiments of its related technologies, the command is provided as either a script or an command delivered from the MCU.

In other embodiments of the present invention and/or in other embodiments of its related technologies, the PPSE selection application automatically sets its transaction application identifier when the transaction application identifier is placed in the registry and then PSE selection application has its transaction application identifier set when the transaction application identifier is placed into the registry and the PSE selection application is provided a command to retrieve the transaction application identifier from the registry.

In other embodiments of the present invention and/or in other embodiments of its related technologies, the one or more selection applications are set with an transaction application identifier by passing the identifier(s) as a parameter to the one or more selection applications wherein the one or more selection applications are each operable to re-set themselves with the passed transaction application identifier parameter.

In other embodiments of the present invention and/or in other embodiments of its related technologies, where there is a plurality of transaction applications each of the same sort (dual interface contact and contactless, or single interface contact or contactless) associated with a personality, tokenized PDTP, and/or a transaction type PDTP, and the transaction applications of the same sort each have a different transaction application identifier (AID in some embodiments) with a priority indicator, the one or more selection applications are operable to be set with the plurality of transaction application identifiers of the transaction applications of the same sort and to be set with the related priority indicators.

In embodiments of the present invention and/or in embodiments of its related technologies, the one or more selection applications are called during a digital transaction and the transaction application identifier set in each of the one or more selection applications is used to build a candidate list of transaction application identifiers. The candidate list is used by a DTD in a digital transaction to determine which of the transaction applications hosted on the DTPU the DTD is able to operate with in order to effect the digital transaction. In embodiments where a selection application provides multiple transaction application identifiers, each for a different transaction application, the candidate list may include priority indicators provided by the selection application, which assist the DTD in determining which of the transaction applications identified in the candidate list is preferred to be called by the DTD for a digital transaction.

In other embodiments of the present invention and/or in other embodiments of its related technologies, the DTD is operable to build a candidate list of transaction application identifiers (AIDs in some embodiments), which are passed to a DTD during a digital transaction so that the DTD is able to determine the identity of an unlocked transaction application on the DPD with which it is able to perform a digital transaction. In some such embodiments, the candidate list is built when a DPD user selects a new personality (including selection of a tokenized transaction application associated with the PDTP of the personality, and/or selection of a transaction application having a particular transaction type) to be the operating personality of the DPD. In some other such embodiments, the candidate list is built by the DTD when a DPD is presented to a DTD for a digital transaction.

It will be understood that a digital transaction is either a contact transaction or a contactless transaction, but never both, so that either a PSE selection application is called during the digital transaction to provide the identifiers of contact interface transaction applications, or a PPSE selection application is called during the digital transaction to provide the identifiers of contactless interface transaction applications. In other embodiments of the present invention and/or in other embodiments of its related technologies, the DPD is operable for QR code payments, by display of a QR code by the DPD, the QR code representing the one or more unlocked transaction applications (or representing the PDTP/personality associated with the one or more unlocked transaction applications).

Containers

In embodiments of the present invention and/or in embodiments of its related technologies, Elementary Load Files (ELFs) or packages are referred to as containers. It will be recognised that the terminology is interchangeable and should be applied as required for the technology used for implementing embodiments of the present invention. For example, if the embodiment is implemented on a JavaCard (or using JavaCard-like technology), the DTPU hosts packages for providing basic or common functionality to transaction applications instantiated under a payment scheme. In this specification, the term container is intended to be a generalised reference to ELFs and packages.

In embodiments of the present invention and/or in embodiments of its related technologies, a container for the present invention is implemented on the DTPU of a physical card (a DTC) or on a DPD, and may be operable with DTPs/PDTPs (see below) for both contact and contactless digital transactions.

In embodiments of the present invention and/or in embodiments of its related technologies, each container (for example, one or more ELFs comprising the container) is associated with a payment scheme. In the security hierarchy, each container is installed (or hosted) under an associated USD. For example, a USD for the Visa payment scheme hosts one or more ELFs for creating Visa DTPs on the DTPU.

In embodiments of the present invention and/or in embodiments of its related technologies, a container is used to create the DTP, which is then extradited from being under the USD of the container to an SSD elsewhere in the security hierarchy.

In embodiments of the present invention and/or in embodiments of its related technologies, each USD can be locked or unlocked. Locking or unlocking of a container USD (or SSD) renders the container thereunder, respectively, as being active (unlocked) or inactive (locked). In some such embodiments of the present invention and/or in some such embodiments of its related technologies, it is possible to limit which payment schemes are operable on the DTPU.

In embodiments of the present invention and/or in embodiments of its related technologies, for example, a payment scheme, say the Visa payment scheme, may desire that the DPD is not used for hosting any DTP/PDTPs of other payment schemes, such as Mastercard and American Express. The Visa payment scheme organisation may request for all USDs for payment schemes apart from the USD for the Visa payment scheme to be locked. The DPD will then only be operable to create and install DTPs/PDTPs for the Visa payment scheme. It is understood that, in practice, which DTPs/PDTPs are created and installed on a DTPU can be controlled by the provisioning network by simply not providing means for creating and installing DTPs/PDTPs from payment schemes other than from a desired (or from a number of desired) payment schemes. However, allowing for locking/unlocking of container USDs provides an extra assurance that the DPD can be controlled to only allow creation and installation of DTPs/PDTPs from one or more desired payment schemes. Although the above description of containers focuses on those for payment schemes, it will be appreciated that other types of container can be hosted on a DTPU, including containers for creation and hosting library functions for ID cards, passports, and other non-financial electronic documents.

In embodiments of the present invention and/or in embodiments of its related technologies, the DTPU includes at least some containers (ELFs) installed which are operable to instantiate transaction applications for further provisioning (personalization) by scripts provided by both a TSP and a TSM.

In other embodiments of the present invention and/or in other embodiments of its related technologies, the DTPU includes at least some containers which are operable to instantiate transaction applications for further provisioning (personalization) by scripts provided by a TSM only.

In other embodiments of the present invention and/or in other embodiments of its related technologies, the DTPU includes at least some containers which are operable to instantiate transaction applications for further provisioning (personalization) by scripts provided by a TSP only.

In embodiments of the present invention and/or in embodiments of its related technologies, where a container is operable to instantiate transaction applications for further provisioning (personalization) by scripts provided by a TSM only, the DTPU is operable to have another container installed which is operable to instantiate transaction applications for further provisioning (personalization) by scripts provided by a TSP.

In embodiments of the present invention and/or in embodiments of its related technologies, where a container is operable to instantiate transaction applications for further provisioning (personalization) by scripts provided by a TSP only, the DTPU is operable to have another container installed which is operable to instantiate transaction applications for further provisioning (personalization) by scripts provided by a TSM.

Digital Objects

In embodiments of the present invention and/or in embodiments of its related technologies, the provisioning network is operable to send digital objects to the DPD and the DAD, to the DPD via the DAD, and to the DAD via the DPD. In embodiments of the present invention and/or in embodiments of its related technologies, the digital objects include command, scripts, script templates, metadata, firmware, and other files which are used on the DPD and/or the DAD.

Scripts and Commands

In embodiments of the present invention and/or in embodiments of its related technologies, a command is sent to the DTPU to effect an action on the DTPU. A command, in various circumstances, may be referred to as an APDU. In other circumstances, a command may be broken up into APDUs.

In embodiments of the present invention and/or in embodiments of its related technologies, in a GP standards compliant DTPU all commands sent to a DTPU are in the form of one or more scripts.

In embodiments of the present invention and/or in embodiments of its related technologies, some scripts require encryption with a session key derived from a cryptographic key for an SSD to be authenticated to an SSD for authorizing a command to the security domain of the SSD.

In embodiments of the present invention and/or in embodiments of its related technologies, some scripts do not require encryption.

In embodiments of the present invention and/or in embodiments of its related technologies, some scripts require encryption, the DPD is operable to store and operate with template scripts, wherein the template script requires one or more parameters, and when the one or more parameters are written into the template script, the script is encrypted with a session key derived from a cryptographic key and a counter.

In embodiments of the present invention and/or in embodiments of its related technologies, some scripts require encryption, scripts include command scripts and response scripts, wherein a response script is generated by the DTPU when it has executed a command script, and the response script is sent by the DTPU via the DPD and back to the relevant provisioning agent.

Metadata and Other On-DPD Files

In embodiments of the present invention and/or in embodiments of its related technologies, each personality is associated with a single PDTP on the DPTU. In some such embodiments of the present invention and/or in some such embodiments of its related technologies, each personality is also associated with metadata related to the PDTP on the DTPU, wherein the metadata is recorded in registries on any one or more of: the DPD (for example, in the MCU), the DAD, the DPD manager, and elsewhere. In this regard, a personality includes the PDTP and its associated metadata.

In embodiments of the present invention and/or in embodiments of its related technologies, the DPD is provided with files (sometimes referred to as DPD files and data) for operations of selected components of the DPD, wherein the files and/or data are not associated with (or not directly associated with) data and operations on the DTPU.

In embodiments of the present invention and/or in embodiments of its related technologies, the DPD files and data includes firmware instructions for operations of components such as DPD buttons, the DPD communications module, the DPD graphical display, and other such files and/or data.

Provisioning

In embodiments of the present invention and/or in embodiments of its related technologies, the provisioning network is operable to issue one or more provisioning entities for providing, to the DPD, provisioning data associated with at least one DTP/PDTP. In some embodiments of the present invention and/or in some embodiments of its related technologies, the one or more provisioning entities include data, digital objects, software or signalling entities generated by, or received by, the at least one provisioning agent for establishing communication sessions.

In embodiments of the present invention and/or in embodiments of its related technologies, provisioning includes providing from the provisioning network and/or the provisioning infrastructure to the DTPU the one or more provisioning entities, including data, digital objects, software or signalling entities generated by the at least one provisioning agent. In some such embodiments of the present invention and/or in some such embodiments of its related technologies, provisioning includes one or more responses from the DTPU back to the provisioning network, the responses including one or more of data and digital objects.

In some further embodiments of the present invention and/or in some further embodiments of its related technologies, provisioning includes providing from the provisioning network and/or the provisioning infrastructure to the MCU or some other component of the DPD external to the DTPU the one or more provisioning entities, including data, digital objects, software or signalling entities generated by the at least one provisioning agent. In some such embodiments of the present invention and/or in some such embodiments of its related technologies, provisioning includes one or more responses from the MCU or some other component of the DPD external to the DTPU back to the provisioning network, the responses including one or more of data and digital objects.

Provisioning Data (for the DTPU)

In embodiments of the present invention and/or in embodiments of its related technologies, the provisioning data includes data associated with at least one DTP. In embodiments of the present invention and/or in embodiments of its related technologies, the data associated with at least one DTP includes scripts and/or commands for installing one or more SSDs on the DTPU. In embodiments of the present invention and/or in embodiments of its related technologies, the data associated with the DTP includes scripts and/or commands for instantiating one or more transaction applications each under one of the one or more SSDs. In embodiments of the present invention and/or in embodiments of its related technologies, the data associated with at least one DTP includes scripts and/or commands for personalization to render the DTP a PDTP.

In embodiments of the present invention and/or in embodiments of its related technologies, a DTP is installed or created on the DTPU by providing one or more scripts and/or commands to the DTPU from the provisioning network (or from a least one provisioning agent in the provisioning network) to instruct the DTPU to create or install the DTP. In some such embodiments of the present invention and/or in some such embodiments of its related technologies, the script instructs the DTPU to create the DTP with reference to a container (for example, an ELF) associated with a payment scheme (for example, Visa, Mastercard, American Express). In some such embodiments of the present invention and/or in some such embodiments of its related technologies, the at least one provisioning agent is the DPD manager.

In some other embodiments of the present invention and/or in some other embodiments of its related technologies, the provisioning data includes scripts and/or commands for instantiating an application selection module on the DTPU, including one or both of a selection application for a PSE and a selection application for a PPSE, each of the PSE and PPSE selection applications operable to provide to a DTD one or more transaction application identifiers associated with the one or more transaction applications associated with the at least one DTP/PDTP. In some such embodiments of the present invention and/or in some such embodiments of its related technologies, the provisioning data for instantiating the application selection module is provided from the DPD manager.

In embodiments of the present invention and/or in embodiments of its related technologies, the data associated with at least one DTP/PDTP includes one or both of a manifest for a PSE selection application and a PPSE selection application, or a manifest for the application selection module, each manifest for modifying its respective selection application to include one or more transaction application identifiers associated with the at least one DTP/PDTP. In such embodiments of the present invention and/or in such embodiments of its related technologies, the manifest for a PSE selection application and a PPSE selection application are for installation or storage on the MCU, the OSE or some other component of the DPD external to the DTPU, the MCU, the OSE or other component being operable to modify PSE and PPSE selection applications on the DPTU with data from each or both manifests. In embodiments of the present invention and/or in embodiments of its related technologies, the at least one manifest is provided in the form of one or more scripts and/or commands. In embodiments of the present invention and/or in embodiments of its related technologies, the at least one manifest is provided in the form of one or more template scripts and/or template commands. In embodiments of the present invention and/or in embodiments of its related technologies, the one or more transaction application identifiers (AIDs) associated with the at least one DTP/PDTP are in the metadata (for example the metadata on the MCU), and are provided to the PSE selection application and the PPSE selection application, or provided to the application selection module when the personality (and/or tokenized transaction application, and/or transaction type) is selected to be the operational personality of the DPD.

In yet some other embodiments of the present invention and/or in yet some other embodiments of its related technologies, the data associated with at least one DTP includes personalization data, including one or more commands and/or scripts, for the at least one DTP to be personalized on the DTPU, thus becoming a PDTP. In some such embodiments of the present invention and/or in some such embodiments of its related technologies, the personalization data is provided by a TSM and/or a TSP in the provisioning network. In some such embodiments of the present invention and/or in some such embodiments of its related technologies, the personalization data is provided to the TSM and/or the TSP and converted by the TSM and/or TSP into one or more scripts and/or commands. In some such embodiments of the present invention and/or in some such embodiments of its related technologies, the personalization scripts and/or commands are provided from the TSM and/or the TSP to the DPD manager for delivery to the DPD.

In embodiments of the present invention and/or in embodiments of its related technologies, the data associated with at least one DTP/PDTP includes a container for providing functions for the at least one DTP/PDTP, the container for installation on the DTPU, wherein the container is associated with the payment scheme for the DTP/PDTP. In some such embodiments of the present invention and/or in some such embodiments of its related technologies, the container is operable to instantiate one or more transaction applications for the DTP/PDTP for contact and contactless payments to provide functionality required for the DTP/PDTP which is operable for contact and contactless payments.

In embodiments of the present invention and/or in embodiments of its related technologies, digital objects provided by the provisioning network to the DTPU include any one or more of the application selection module (including one or more PSE and PPSE selection applications), the container, the DTP/PDTP and the personalization data for the DTP (if provided separately). In embodiments of the present invention and/or in embodiments of its related technologies, the digital objects for the DTPU are created by the provisioning network as APDUs or converted by the provisioning network from digital object files to APDUs for installation on the DTPU.

Provisioning Data (for MCU or Other DPD Component Outside the DTPU)

In embodiments of the present invention and/or in embodiments of its related technologies, the data associated with at least one DTP/PDTP includes at least one cryptographic key associated with a respective at least one security domain, each at least one security domain associated with the respective at least one DTP/PDTP. In such embodiments of the present invention and/or in such embodiments of its related technologies, the at least one cryptographic key is for installation or storage on the MCU, the OSE or some other component of the DPD external to the DTPU. In some embodiments, the MCU, the CKSM, the OSE and/or the other component being operable to use the key to encrypt (authenticate) template scripts and/or template commands to become scripts and/or commands for execution on the DTPU. In some such embodiments of the present invention and/or in some such embodiments of its related technologies, the at least one cryptographic key includes at least one key for a Subsidiary Security Domain (SSD) associated with the DTP/PDTP. In some such embodiments of the present invention and/or in some such embodiments of its related technologies, the SSD key is used for encrypting/authenticating communications between the MCU and the DTPU. In some such embodiments of the present invention and/or in some such embodiments of its related technologies, the SSD key is stored in secure memory on the DTC, wherein the secure memory is external of the DTPU. In some such embodiments of the present invention and/or in some such embodiments of its related technologies, the secure memory is a component of the MCU. In some such embodiments of the present invention and/or in some such embodiments of its related technologies, the secure memory is within the OSE.

In some other embodiments of the present invention and/or in some other embodiments of its related technologies, the data associated with at least one DTP/PDTP includes at least one script for executing commands on the DTPU associated with the at least one DTP/PDTP. In such embodiments of the present invention and/or in such embodiments of its related technologies, the at least one script is for installation or storage on the MCU, the OSE or some other component of the DPD external to the DTPU. In some embodiments of the present invention and/or in some embodiments of its related technologies, the MCU, the OSE, and/or the other component being operable to use the script to execute actions on the DTPU. In some such embodiments of the present invention and/or in some such embodiments of its related technologies, the at least one script is a standards compliant script encrypted/authenticated by an SSD key associated with the security domain in which the DTP/PDTP will execute on the DTPU. The script may include one or more commands for effecting one or more actions on the DTPU. In some such embodiments of the present invention and/or in some such embodiments of its related technologies, the one or more actions include personalizing one or more transaction applications of the one or more DTPs. In other embodiments of the present invention and/or in other embodiments of its related technologies, the one or more actions include locking and/or unlocking transaction applications.

In yet some other embodiments of the present invention and/or in yet some other embodiments of its related technologies, the data associated with at least one DTP/PDTP includes metadata for operating DPD components outside of the DTPU, wherein the operating is associated with the at least one PDTP. In such embodiments of the present invention and/or in such embodiments of its related technologies, the metadata is for installation or storage on the MCU or some other component of the DPD external to the DTPU. In some embodiments of the present invention and/or in some embodiments of its related technologies, the MCU and/or the other component being operable to use the metadata for displaying DTP/PDTP details on a user interface. In embodiments of the present invention and/or in embodiments of its related technologies, the data associated with at least one PDTP are used by the DPD for displaying a primary identifier (a PAN for payment card PDTPs), a card image, cardholder name, expiration date, CVV, and other such details associated with the PDTP.

In embodiments of the present invention and/or in embodiments of its related technologies, digital objects provided by the provisioning network to the MCU, the OSE or some other component of the DPD external to the DTPU include the one or more scripts, the one or more security keys, and the metadata. In some other embodiments of the present invention and/or in some other embodiments of its related technologies, the digital objects for the MCU, the OSE or some other component of the DPD external to the DTPU are created by the provisioning network as digital files for storage or installation on the MCU and/or the other component.

In embodiments of the present invention and/or in embodiments of its related technologies, digital objects provided by the provisioning network to the MCU, the OSE or some other component of the DPD external to the DTPU include an updated application selection module manifest, being a file including transaction application identifiers (such as AIDs) associated with DTPs/PDTPs installed or to be installed into the DTPU. In embodiments of the present invention and/or in embodiments of its related technologies, the MCU, the OSE or some other component of the DPD external to the DTPU is operable to update the application selection module with the transaction application identifiers in the updated application selection module manifest. In some such embodiments of the present invention and/or in some such embodiments of its related technologies, the digital objects provided by the provisioning network to the MCU, the OSE or some other component of the DPD external to the DTPU are in the form of one or more scripts and/or commands, and/or one or more template scripts and/or template commands.

Provisioning (Delivery to the DTPU)

In embodiments of the present invention and/or in embodiments of its related technologies, the digital entities, data, and/or digital objects from the provisioning network to the DTPU are provided via a secure communication session to the DTPU. In some embodiments of the present invention and/or in some embodiments of its related technologies, the secure communication session is in accordance with one of SCP01, SCP02, SCP03, SCP80 and SCP81 communication protocols. In some such embodiments, the secure communication session is a synchronous secure communication session.

In some embodiments of the present invention and/or in some embodiments of its related technologies, the secure communication session is in accordance with SCP02 i=55. In some such embodiments of the present invention and/or in some such embodiments of its related technologies, the secure communication session is an asynchronous secure communication session.

In some embodiments of the present invention and/or in some embodiments of its related technologies, the provisioning network is operable, selectively, for both synchronous and asynchronous sessions.

Provisioning (Delivery to the MCU or Other DPD Component Outside the DTPU)

In embodiments of the present invention and/or in embodiments of its related technologies, the digital entities, data, and/or digital objects from the provisioning network to the MCU, the CKSM, the OSE or some other component of the DPD external to the DTPU are provided via a secure communication session to the MCU. In some embodiments of the present invention and/or in some embodiments of its related technologies, the secure communication session is in accordance with GP SCP11 communication protocol. In some embodiments of the present invention and/or in some embodiments of its related technologies, the session is a synchronous session. In other such embodiments, the session is an asynchronous session. In some such embodiments of the present invention and/or in some such embodiments of its related technologies, the provisioning network is operable, selectively, for both synchronous and asynchronous sessions.

In some embodiments of the present invention and/or in some embodiments of its related technologies, the digital entities, data, and/or digital objects from the provisioning network to the MCU, the CKSM, the OSE or some other component of the DPD external to the DTPU are provided via a communication using TLS.

In yet other embodiments of the present invention and/or in yet other embodiments of its related technologies, the digital entities, data, and/or digital objects from the provisioning network to the MCU or some other component of the DPD external to the DTPU are provided via a SEMS or SEMS-like communication.

Transaction Application Instantiation

In embodiments of the present invention and/or in embodiments of its related technologies, the provisioning network includes a DPD manager. In some such embodiments of the present invention and/or in some such embodiments of its related technologies, the DPD manager is operable to provide one or more scripts and/or commands to the DTPU of the DPD to install one or more transaction applications on the DTPU (each transaction application associated with a DTP). In some such embodiments of the present invention and/or in some such embodiments of its related technologies, the DPD manager is operable to provide one or more scripts and/or commands to the DTPU of the DPD to install one or more SSDs for each one or more DTPs on the DTPU. In some such embodiments of the present invention and/or in some such embodiments of its related technologies, the DPD manager is operable to provide one or more scripts and/or commands to the DTPU of the DPD to instantiate one or more transaction applications for each one or more DTPs on the DTPU.

In embodiments of the present invention and/or in embodiments of its related technologies, the DPD manager is operable to effect a key rotation for each of the one or more SSDs. In some such embodiments of the present invention and/or in some such embodiments of its related technologies, the key rotation passes control of each SSD to another provisioning agent in the provisioning network, including a TSM, a TSP or a SEMS, for personalization of the one or more transaction applications in the DTP. In some such embodiments of the present invention and/or in some such embodiments of its related technologies, the key rotation is effected by provision of one or more key rotation scripts and/or commands to the DTPU from the DPD manager. In other such embodiments of the present invention and/or in other such embodiments of its related technologies, the key rotation is effected by a CASD on the DTPU. In yet other embodiments of the present invention and/or in yet other embodiments of its related technologies, key rotation is done by the TSM and/or TSP, but not by the DPD manager.

Personalization

In embodiments of the present invention and/or in embodiments of its related technologies, personalization the process of personalizing a DTP with data specific to the particular card or other digital document such that the DTP becomes a PDTP. In embodiments of the present invention and/or in embodiments of its related technologies, the personalization data may include one or more of: a primary identifier (such as a PAN for a credit or debit card), a cardholder's name, expiry date, a PIN, a CVV, and other data.

In embodiments of the present invention and/or in embodiments of its related technologies, where a DTP is associated with a single transaction application, the personalization data (or personalization details) will be written into (or associated with) the single transaction application.

In other embodiments of the present invention and/or in other embodiments of its related technologies, where a DTP is associated with more than one transaction application, the personalization data (or personalization details) will be written separately into (or associated with) each of the more than one transaction applications. In some other embodiments of the present invention and/or in some other embodiments of its related technologies, where a DTP is associated with more than one transaction application, a subset of the same personalization data (or personalization details) will be written separately into (or associated with) each of the more than one transaction applications, wherein the subset of personalization data (or personalization details) for each transaction application of the PDTP is different from others of the more than one transaction applications.

In some other embodiments of the present invention and/or in some other embodiments of its related technologies, where a DTP is associated with one or more transaction application, the personalization data (or personalization details) includes a tokenized primary identifier (or tokenized PAN) for each of the one or more transaction applications, wherein each tokenized primary identifier is different from others of the tokenized primary identifiers, such that, following personalization, the PDTP is a tokenized PDTP having one or more associated tokenized transaction applications. In some such embodiments of the present invention and/or in some such embodiments of its related technologies, the tokenized PDTP includes one transaction application personalized with the primary identifier (a non-tokenized transaction application). In some other such embodiments of the present invention and/or in some other such embodiments of its related technologies, the tokenized PDTP includes only tokenized transaction applications. In some such embodiments of the present invention and/or in some such embodiments of its related technologies, the tokenized personalization data is provided by a TSP in the provisioning network.

In other embodiments of the present invention and/or in other embodiments of its related technologies, where the PDTP is to be operable with transaction types, wherein each transaction type is associated with a transaction application associated with a same primary identifier, the DTP is personalized with transaction type identifiers (or identifying information) for each transaction application. In some such embodiments of the present invention and/or in some such embodiments of its related technologies, the transaction type identifiers include a sequence number for each associated transaction application. In some such embodiments of the present invention and/or in some such embodiments of its related technologies, the transaction type identifiers include personalizing each associated transaction application with a different tokenized primary identifier. In some such embodiments of the present invention and/or in some such embodiments of its related technologies, the transaction type identifiers include the transaction application identifier (AID) of each transaction application (it will be appreciated that the AID of each transaction application is provided when the transaction application is initially instantiated and extradited to its associated DTP and/or SSD of the DTP).

Linking DPD to DAD (Using DTPU)

In embodiments of the present invention and/or in embodiments of its related technologies, the DAD is operable to link with only one specified DPD, and the DPD may be uniquely identified by the ID of the DTPU. In other embodiments of the present invention and/or in other embodiments of its related technologies, the DAD is operable to link with multiple DPDs, each of which may be uniquely identified by the ID of their DTPU. In yet other embodiments of the present invention and/or in yet other embodiments of its related technologies, the DPD is operable to link with only one DAD, and the DAD may be uniquely identified by its device fingerprint, which may include its International Mobile Equipment Identity (IMEI) number. In yet further embodiments of the present invention and/or in yet further embodiments of its related technologies, the DPD is operable to link with more than one DAD, each of which may be uniquely identified by its device fingerprint.

Linking DPD to DAD (using MCU or Other DPD Component Outside the DTPU)

In embodiments of the present invention and/or in embodiments of its related technologies, the DAD is operable to link with only one specified DPD, and the DPD may be uniquely identified by the ID of the MCU or Other DPD component outside the DTPU. In other embodiments of the present invention and/or in other embodiments of its related technologies, the DAD is operable to link with multiple DPDs, each of which may be uniquely identified by the ID of their MCU or other DPD Component Outside the DTPU. In yet other embodiments of the present invention and/or in yet other embodiments of its related technologies, the DPD is operable to link with only one DAD, and the DAD may be uniquely identified by its device fingerprint, which may include its International Mobile Equipment Identity (IMEI) number. In yet further embodiments of the present invention and/or in yet further embodiments of its related technologies, the DPD is operable to link with more than one DAD, each of which may be uniquely identified by its device fingerprint.

Locking/Unlocking/Active/Inactive/Operable/Inoperable Terminology

In embodiments of the present invention and/or in embodiments of its related technologies, the DPD is operable to store or generate scripts and/or commands for locking and unlocking transaction applications (and other applications) in the DTPU. In such embodiments of the present invention and/or in such embodiments of its related technologies, an unlocked transaction application can be accessed by a DTD for a digital transaction, and a locked transaction application cannot be accessed by a DTD for a digital transaction. In some such embodiments of the present invention and/or in some such embodiments of its related technologies, the scripts and/or commands for locking/unlocking, and/or the template scripts and/or template commands for locking/unlocking are stored on and/or generated by the OSE.

In embodiments of the present invention and/or in embodiments of its related technologies, a PDTP is inactive when all its associated transaction applications are locked. In embodiments of the present invention and/or in embodiments of its related technologies, a PDTP is active when at least one of its one or more associated transaction applications are unlocked.

In embodiments of the present invention and/or in embodiments of its related technologies, a personality is active or operable when its associated PDTP is active. In embodiments of the present invention and/or in embodiments of its related technologies, a personality is inactive or inoperable when its associated PDTP is inactive.

In embodiments of the present invention and/or in embodiments of its related technologies, the DPD is operable to have more than one personality active or operable. In such embodiments of the present invention and/or in such embodiments of its related technologies, if there are two or more operable personalities, each personality is for a different function, such as one personality being for payments and another personality being for identification. It will be appreciated that a personality for payments uses a different type of DTD from a personality for identification, so that the operation of the personalities in the different DTDs will not conflict.

In embodiments of the present invention and/or in embodiments of its related technologies, the DPD is operable to have two payment personalities active or operable (the DTPU having two payment PDTPs active), however, one of the personalities (and its associated PDTP) must be for contact transactions only, and the other personality (and its associated PDTP) must be for contactless transactions only. It will be appreciated that a personality (and its associated PDTP) for contact payments uses a different aspect of a DTD from a personality (and its associated PDTP) for contactless payments, so that the operation of the personalities (and their respective PDTPs) in the different DTDs will not conflict.

For the operation of transaction applications (or non-transaction applications), other terms used include activating/inactivating, blocking/unblocking, activating/deactivating and enabling/disabling. The terms lock/unlock will be preferred in this specification. The terms may also refer to the state of an application, that is, being in either a lock(ed) state or unlock(ed) state. Sometimes, instead of specifying that one or more transaction applications associated with a PDTP/personality have each been locked/unlocked (as appropriate in the context), the PDTP/personality will be described as being locked/unlocked or active/inactive (as appropriate in the context).

In embodiments of the present invention and/or in embodiments of its related technologies, the security hierarchy of the DTPU is configured to allow a single command (single script) to be sent to the DTPU to lock all transaction applications for all PDTPs on the DTPU. In embodiments, this is provided by a cascade locking routine from an SSD with a position in the security hierarchy above all transaction applications and PDTPs (and above the SSDs associated with those transaction applications and PDTPs).

DPD Variations

In embodiments of the present invention and/or in embodiments of its related technologies, a DPD is provided to a user with one or more PDTPs/personalities pre-installed, wherein the DPD is not operable for further provisioning of PDTPs/personalities.

In embodiments of the present invention and/or in embodiments of its related technologies, a DPD is provided to a user with one or more PDTPs/personalities pre-installed, wherein the DPD is operable for further provisioning of PDTPs/personalities (including personality metadata).

In embodiments of the present invention and/or in embodiments of its related technologies, a DPD is provided to a user with no PDTPs/personalities pre-installed, wherein the DPD is operable for provisioning of PDTPs/personalities (including personality metadata).

In embodiments of the present invention and/or in embodiments of its related technologies, a DPD is provided to a user with one or more containers pre-installed, wherein the DPD is operable for further provisioning of one or more containers.

In embodiments of the present invention and/or in embodiments of its related technologies, a DPD is provided to a user with no containers pre-installed, wherein the DPD is operable for further provisioning of one or more containers.

In embodiments of the present invention and/or in embodiments of its related technologies, a DPD is provided to a user with an application selection module installed.

In embodiments of the present invention and/or in embodiments of its related technologies, a DPD is provided to a user with no application selection module installed, wherein the DPD is operable for further provisioning of an application selection module.

Certifications, Protocols and/or Standards

In embodiments of the present invention and/or in embodiments of its related technologies, the DPD, or one of its components including the DTPU, the MCU, OSE, CKSM and other components on the DPD, comply with one or more of the following certifications, protocols and/or standards:

GlobalPlatform Industry Configuration Certification:
    Finance Configuration specification v1.0;
    UICC Configuration specification v2.0;
    UICC Configuration specification v1.0.1.

GlobalPlatform functionality and features:
  Secure Messaging (such as SCP 02 option i='55');
  Secure Messaging (such as SCP 03 option i='10', '30' and '70');
  Secure Messaging (such as SCP81 with TLS 1.0-1.2 with all PSK cipher suites);
  GlobalPlatform Card Specification v2.1.1 or 2.3;
  GlobalPlatform Card v2.2.1 or 2.3 Amd. A;
  GlobalPlatform Card v2.2.1 or 2.3 Amd. B (SCP81);
  GlobalPlatform Card v2.2.1 or 2.3 Amd. C;
  GlobalPlatform Card v2.2.1 or 2.3 Amd. D;
  GlobalPlatform Card v2.1.1 (on card GP applet API);
  Key Management (including Put Key and Store Data GP commands) for 3DES, and may also include DES, AES, RSA (1024 & 2048 bit) and ECC keys;
  Data Store (for operations such as storage and retrieval of DGI objects);
  Card Content Management (for operations such as loading, installing, and deleting applications) for 3DES, and may also include AES, RSA (1024 & 2048 bit) and ECC algorithms;
  Security Domain Tree (for operations such as deletion and extradition with the Security Domain hierarchy);
  Confidential Card Content Management (such as Security Domain personalization using Controlling Authority Security Domain (CASD));
  Logical Channel Management.
GlobalPlatform Privileges:
  Security Domain;
  Trusted Path;
  Global Registry;
  Global Delete;
  Global Lock;
  Authorized Management.
Finance Certification:
  Contact L1 EMVCo Protocol & Electrical;
  Contactless L1 EMVCo Analogue & Digital;
  Contact L2 EMVCo CPA & CCD;
  Contact L2 VISA Integrated Circuit Card Spec (VIS);
  Contactless L2 VISA Contactless Payment Spec (VCPS);
  Contactless L2 VISA Mobile Payment Application (VMPA);
  Contact L2 MasterCard M/Chip;
  Contactless L2 MasterCard PayPass M/Chip advance;
  Contactless L2 Mobile MasterCard PayPass (MMPP);
  Contact L1 AEIPS Chip Card Spec;
  Contactless L2 ExpressPay Card Spec;
  Contactless L2 Express Mobile Functional (AEMF);
Transport Layer Protocols:
  NFC-P1 ISO 18092 & NFC-P2 ISO 21481;
  ETSI 102 613 (SWP) and ETSI 102 622 (HCI).
Transaction Interface Protocols:
  ISO 7816;
  ISO 14443.

Each of the above-listed certifications, protocols and/or standards is incorporated into this specification by reference.

BRIEF DESCRIPTION OF THE DRAWINGS

FIG. 15 is a tree diagram of an embodiment of a branch of a security hierarchy in a DTPU.

FIG. 16 is a tree diagram of an embodiment of a branch of a security hierarchy in a DTPU.

DETAILED DESCRIPTION OF SOME EMBODIMENTS

Figure 1A:
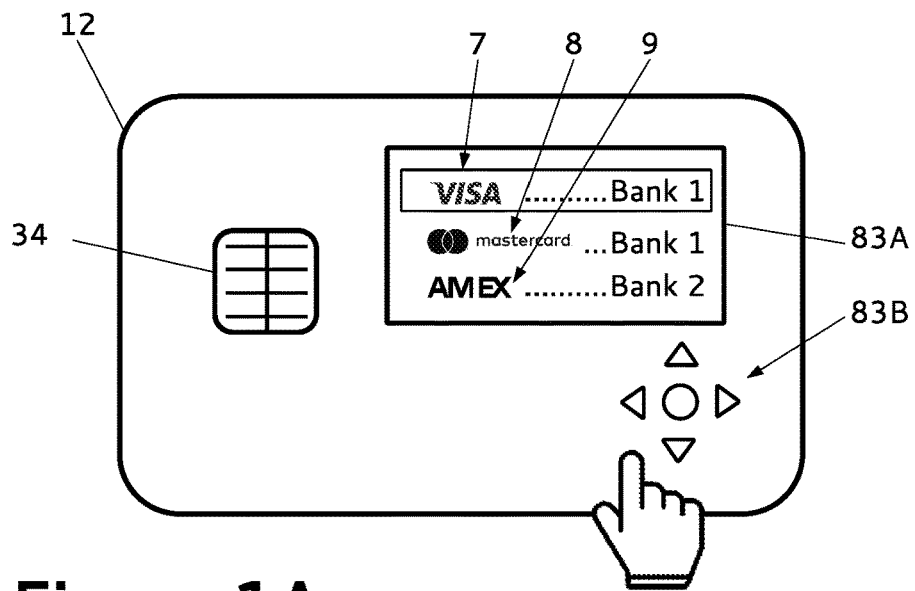
FIG. 1A is an illustration of the exterior of an embodiment of a DTC.
Figure 1B:
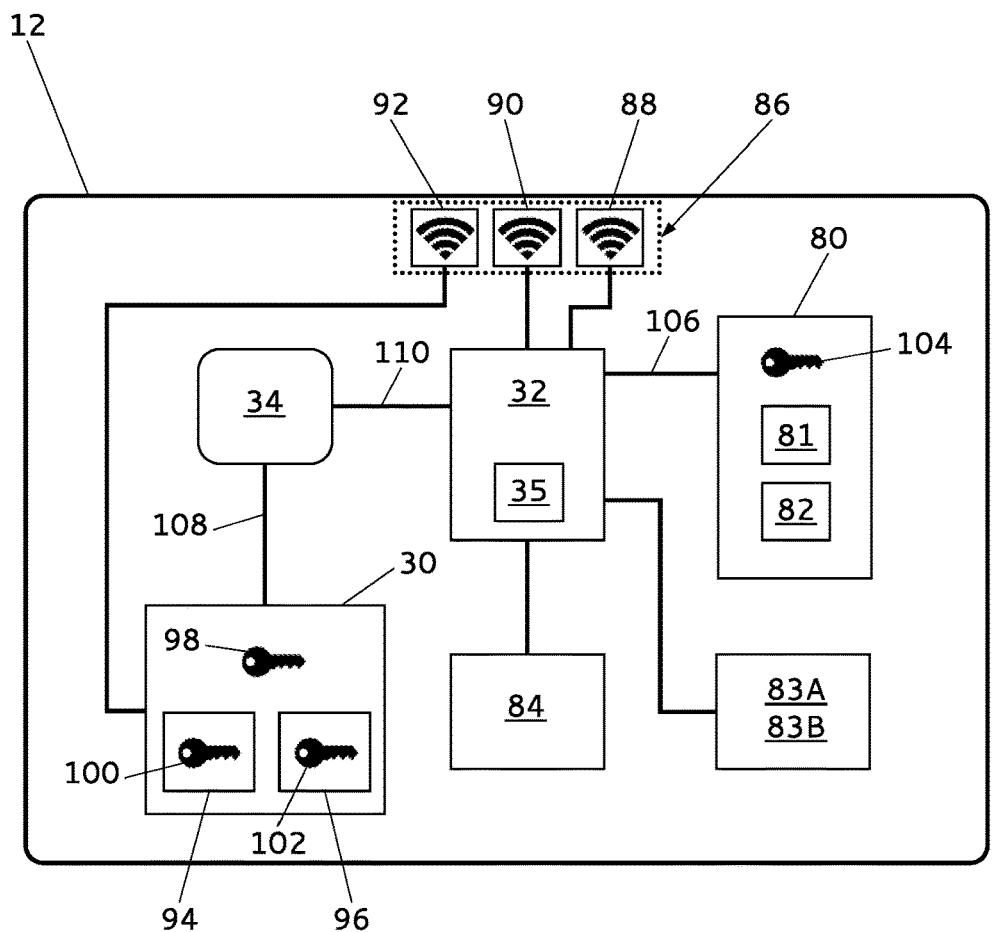
FIG. 1B is a diagram of components in an embodiment of a DTC.

FIGS. 1A and 1B show the main components of an embodiment of a Digital Payment Device (DPD) 12 in accordance with the invention. In the embodiments illustrated in the figures, the Digital Payment Device (DPD) is exemplified as a DTC. In at least some embodiments, the DTC has dimensions and a shape which conform to specifications for a traditional plastic transaction card, such as a credit card, which is suitable for use in an automated teller machine or contact payment terminal. For example, the DTC can be in accordance with at least one of ISO 7816-1 (physical characteristics), ISO 14443-1 (physical characteristics), and ISO 7816-2 (location of contacts). It will be appreciated that in other embodiments the DPD can have a different shape and/or dimensions, and can for example be configured for use in wearable applications (for example a ring, pendant or watch), non-wearable goods (for example a refrigerator or vehicle), non-payment applications (for example an identity document), and transport payment devices.

In the prior art, a plastic credit card or debit card has a single operable personality provided by a single issuer, for example a single bank. Some cards in the prior art are operable to route transactions through two payment schemes (also known as payment networks) which consist of a single domestic payment scheme (for example, EFTPOS in Australia, Interac in Canada, or RuPay in India), and a single international payment scheme (for example, Visa or Mastercard). Such cards include a different transaction application for each payment scheme, but only include transaction applications for a single international payment scheme and a single domestic payment scheme. Such prior art cards do not include transaction applications for two different international payment schemes, and do not include transaction applications for two different domestic payment schemes. One transaction application on the card is used whenever the card performs a transaction with a Digital Transaction Device (DTD), for example a POS terminal. The DTD selects an appropriate transaction application to be used, for example a domestic transaction application or an international transaction application. Some cards have separate transaction applications for contact and contactless transactions. Again, the DTD selects an appropriate transaction application to be used.

Since transaction cards of the prior art have only one operable personality, there is no possibility to select a personality from one or more personalities hosted by the card. Where a card has a plurality of transaction applications, there is no facility on the card itself to select one particular transaction application for use in a transaction.

In embodiments of the present invention, the DTC 12 is operable to host one or more personalities and the DTC is operable to adopt a personality selected from one or more hosted personalities. The one or more hosted personalities can be associated with at least one issuer. In an embodiment, the DTC 12 is operable to host a plurality of personalities including at least one personality associated with a first issuer and at least one personality associated with a second issuer. In an embodiment, the DTC is operable to host one or more personalities associated with the same issuer.

In an embodiment, the DTC 12 is operable to host one or more transaction applications associated with at least one domestic payment scheme. In an embodiment, the DTC 12 is operable to host one or more transaction applications associated with at least one international payment scheme. In an embodiment, the DTC 12 is operable to host a plurality of transaction applications including at least one transaction application associated with a first domestic payment scheme and at least one transaction application associated with a second domestic payment scheme. In an embodiment, the DTC 12 is operable to host a plurality of transaction applications including at least one transaction application associated with a first international payment scheme and at least one transaction application associated with a second international payment scheme.

A "hosted" personality is one which is installed on the DTC. An installed personality is either in an active state or an inoperable state. A personality in an active state (an "active" personality) is capable of being used by the DTC in a transaction with a DTD. A personality in an inoperable state (an "inoperable" personality) cannot be used by the DTC in transactions with a DTD. An inoperable personality is available to be made active (activated) while the DTC is in the field, and an active personality can be made inoperable (de-activated) while the DTC is in the field. The DTC is operable to enable a cardholder to initiate the activation or de-activation of a personality while the DTC is in the field.

Activating a personality is also referred to as adopting a personality. Changing the active personality/personalities is also simply referred to as changing the personality. An embodiment of a process for activating/adopting a personality is described below with reference to FIGS. 7-8 and 9-10.

Referring to FIG. 1A, an example of a DTC 12 is shown in which three personalities 7, 8, 9 are installed on (hosted by) the DTC 12. The three personalities 7, 8, 9 correspond to three transaction accounts issued by various payment schemes and banks:

personality 7: Visa credit account (issued by Bank 1);
personality 8: Mastercard debit account (issued by Bank 1); and
personality 9: American Express credit account (issued by Bank 2).

Each personality 7, 8, 9 represents a different transaction account and enables the DTC to conduct transactions with one specific transaction account. To conduct a transaction with a transaction account, the personality associated with the transaction account must be adopted by the DTC. The adoption is triggered by a cardholder.

Each hosted personality 7, 8, 9 is associated with a single Personalized Digital Transaction Package (PDTP). An active personality is associated with an active PDTP, and an inoperable personality is associated with an inoperable PDTP.

Each PDTP is associated with at least one transaction application, therefore each personality is also associated with at least one transaction application. A transaction application which is inoperable for transactions with the DTC is referred to as being "locked", and a transaction application which is operable for transactions with the DTC is referred to as being "unlocked". A locked transaction application is not selectable in a transaction with a DTD, even with direct selection.

The DTC 12 includes a user interface 83A, 83B which can be used by a cardholder to select one of the personalities or transaction applications for use in a transaction. In this embodiment, the user interface includes a display screen 83A (for example a dot matrix display) and a button keypad 83B. In another embodiment the user interface includes a touchscreen display instead of a keypad.

Figures 1C, 2:
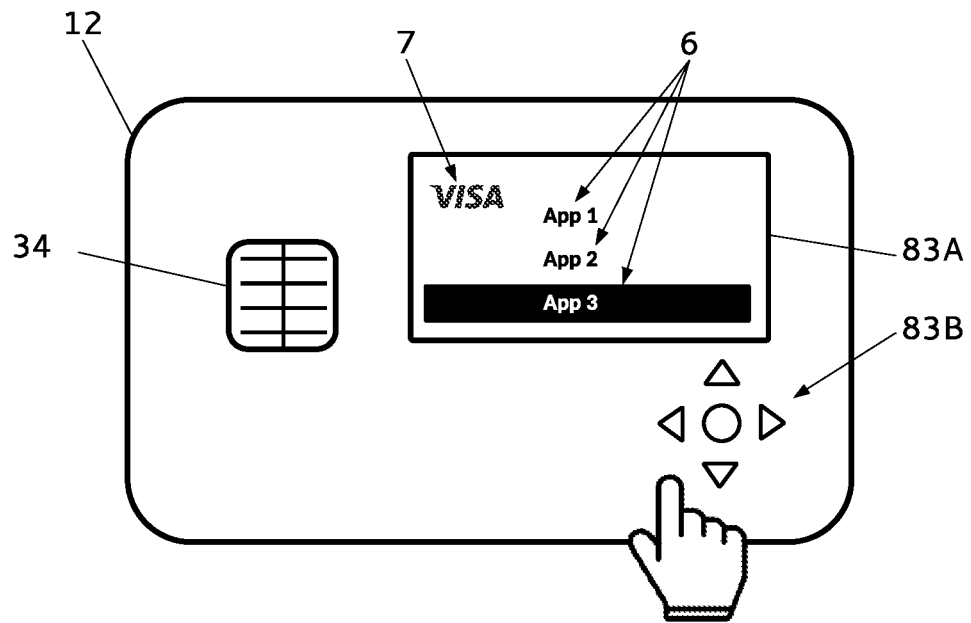
FIG. 1C is an illustration of the exterior of an embodiment of a DTC.
FIG. 2 is an embodiment of metadata associated with a personality.

In an embodiment, the DTC 12 enables the cardholder to select and adopt a transaction application from a plurality of transaction applications associated with the same personality. For example, FIG. 1C shows Visa credit account personality 7 associated with a plurality of transaction applications. The display screen 83A presents three respective options 6 (shown as "App 1", "App 2", and "App 3") which are indicative of three respective transaction applications (all of which are associated with the same personality 7). The three transaction applications could, for example, be associated with three different types of transaction, such as transactions in three different currencies, or transactions associated with three different expense categories.

Where an active PDTP is associated with a plurality of transaction applications, the PDTP may be associated with one or more unlocked transaction applications and one or more locked associated transaction applications. Such a PDTP (and associated personality) is considered to be active because it is operable to be used in at least some transactions.

In an embodiment, a personality is installed on the DTC 12 by providing various digital objects to the DTC. In at least some embodiments of the invention, the DTC 12 includes security arrangements to accept digital objects only from an authorised provider. Such security arrangements include being operable to check the authenticity of any digital objects to be installed. In an embodiment, digital objects associated with a personality installation are provided by a provisioning infrastructure 10 with suitable encryption and authentication protocols. An embodiment of a provisioning infrastructure 10 is described below.

In the following description of embodiments of the invention, the DTC is operable to host one or more personalities and to adopt a personality from the one or more personalities. The invention also includes embodiments in which the DTC is operable to host a personality associated with one or more transaction applications.

Referring to FIG. 1B, the DTC includes a DTPU 30 which is operable to host at least one PDTP, and at least one transaction application associated with each PDTP. The DTC is operable to reversibly unlock at least one transaction application on the DTPU, and to reversibly lock any other transaction application on the DTPU. The DTPU 30 is operable to adopt a PDTP selected from one or more hosted PDTPs and to perform a digital transaction with a DTD using the adopted PDTP.

The DTC 12 in this embodiment has interfaces for performing both contact and contactless transactions. In an alternative embodiment, the DTC 12 is operable to perform only contactless transactions, and in a further alternative embodiment, the DTC 12 is operable to perform only contact transactions. In the embodiment shown in FIG. 1B, contact transactions are conducted via a contact plate 34 and contactless transactions are conducted via an NFC antenna 92, as is well known in the prior art. The contact plate 34 has an external interface for the DTPU 30 and MCU 32 and enables data communication between the DTPU 30 and an MCU 32. The MCU 32 is also in data communication with an Operational Secure Element (OSE) 80, a secure memory 84, a communications module 86, and the user interface 83A, 83B.

The MCU 32 is operable to perform various operations on the DTC 12, including: routing digital objects to other components on the DTC 12, generating a list of AIDs for a personality selected by a cardholder, requesting scripts from a script applet 81 on the OSE 80, and forwarding scripts to the DTPU 30, reading and writing information to and from the secure memory 84, and managing the user interface 83A, 83B. The MCU 32 is also used during a process of provisioning the DTC 12, in which a personality or other functionality is installed on the DTC 12. Provisioning can occur while the DTC 12 is in a factory before distribution to the cardholder, or in at least some embodiments, when the DTC is physically remote from a provisioning infrastructure 10 (shown in FIG. 5). Being remote from the provisioning infrastructure 10 is referred to here as being "in the field".

In the depicted embodiment, the DTPU 30 is a tamper-resistant secure element suitable for performing financial transactions and capable of securely hosting applications and their confidential and cryptographic data (for example cryptographic keys) in accordance with the relevant rules and security requirements. The DTPU 30 has a GlobalPlatform-compliant (GP-compliant) operating system installed thereon and sufficient user memory to install multiple personalities which includes being operable to install multiple payment scheme containers, multiple PDTPs, and a security hierarchy with multiple supplementary security domains (SSDs). The SSDs in the security hierarchy include at least one SSD 94 associated with PDTPs, and at least one SSD 96 associated with an application selection module. The DTPU 30 stores multiple cryptographic keys including at least one ISD key 98 for an ISD of the DTPU, at least one SSD key 100 for each SSD 94 associated with PDTPs, and an SSD key 102 for the SSD 96 associated with the application selection module. The keys 98, 100, 102 are used by the DTPU 30 to authenticate a script to be executed thereon.

In an embodiment, the DTPU 30 is in an OP_READY or INITIALIZED state while in the factory, and the state must be changed to SECURED (using appropriate keys for authentication) before distribution to a cardholder.

The GP-compliant operating system on the DTPU 30 includes a "Global Lock" privilege which enables the locking and unlocking of a transaction application on the DTPU. When all transaction applications of a PDTP are locked, the PDTP and associated personality are inoperable. When one or more transaction applications of a PDTP are unlocked, the PDTP and associated personality are considered to be active. As each PDTP is associated with a personality, de-activating a PDTP effectively de-activates the associated personality, and activating a PDTP activates the associated personality. The locking and unlocking of transaction applications and the activation and de-activation of PDTPs are described below.

In at least some embodiments, the DTC is operable to simultaneously have multiple personalities in an active state. However, it is preferable that the simultaneously active personalities are those that would not have the potential to compete or conflict with each other during a transaction. For example, when conducting a contactless payment, a first personality which is exclusively associated with contact transactions application would not compete with a second personality which is exclusively associated with contactless transaction applications, so there would not be a conflict. Similarly, a personality for a document (e.g. a drivers licence) could not take part in a financial transaction, so the document personality can be simultaneously active with any personality for a financial transaction. In an embodiment, the MCU controls which of the personalities are operable to be simultaneously active. The MCU can refer to rules stored on the DTC, for example in an MCU register. Such rules can be recorded in metadata associated with personalities.

In an embodiment, the DTPU 30 is operable to use the Global Lock privilege to lock all transaction applications installed on the DTPU and then unlock one or more transaction applications associated with a PDTP (which is associated with a personality selected by the cardholder), while the DTC is in the field without the DTC communicating with the provisioning infrastructure 10. In an embodiment, such locking and unlocking of transaction applications can be triggered by a cardholder interacting with the user interface 83A, 83B and making a personality selection. In an alternative embodiment, the locking and unlocking of transaction applications can be triggered by a cardholder interacting with the DAD 14 and making a personality selection, and the DAD is operable to communicate the cardholder's personality selection to the DTC 12.

As will be described, the Global Lock action is implemented by executing one or more authenticated scripts in the DTPU 30. The MCU 32 is operable to initiate a process of generating such authenticated scripts. Authenticated scripts are generated by a command generation unit which in this embodiment is an applet referred to as a script applet 81. The script applet 81 uses a script template from a template store 82, and key(s) 104 to generate authenticated scripts which include commands. The template store 82 stores one or more script templates which are not functioning scripts until certain values are filled in, for example an AID of a target application in the DTPU. In the embodiment in FIG. 1B, the script applet 81, template store 82, and SSD key 104 are all stored in the OSE 80. The process of generating authenticated scripts is described in more detail below with reference to FIGS. 7-8 and 9-10.

Plastic credit or debit cards and digital wallets in the prior art do not have the capacity to generate authenticated scripts. In the case of plastic cards in the prior art, authenticated scripts are prepared externally (for example, by a perso bureau) and provided to the card while the card is in a secure environment such as a perso bureau. In the case of digital wallets in the prior art, authenticated scripts are prepared externally (typically by a TSM) and transmitted to the digital wallet for execution.

In the depicted embodiment, the OSE 80 is a tamper resistant secure element. In one embodiment, a GP-compliant operating system is installed on the OSE 80, and in another embodiment the OSE 80 does not include a GP-compliant operating system. In an embodiment, a security hierarchy with at least one SSD is installed on the OSE 80.

In the embodiment depicted in FIG. 1B, the secure memory 84 is a tamper resistant storage area which does not include a GP-compliant operating system. For example, the secure memory 84 can include ultra-secure hardware-based cryptographic key storage and cryptographic countermeasures designed to reduce or eliminate potential backdoors linked to software weaknesses. The MCU 32 has read and write access to the secure memory 84 and is operable to store digital objects in the secure memory 84 that do not require a GP-compliant operating system, for example Bluetooth keys and metadata associated with a personality. In an alternative embodiment, the DTC does not include a secure memory, and digital objects such as Bluetooth keys and metadata are instead stored in the MCU 32.

Figure 3:
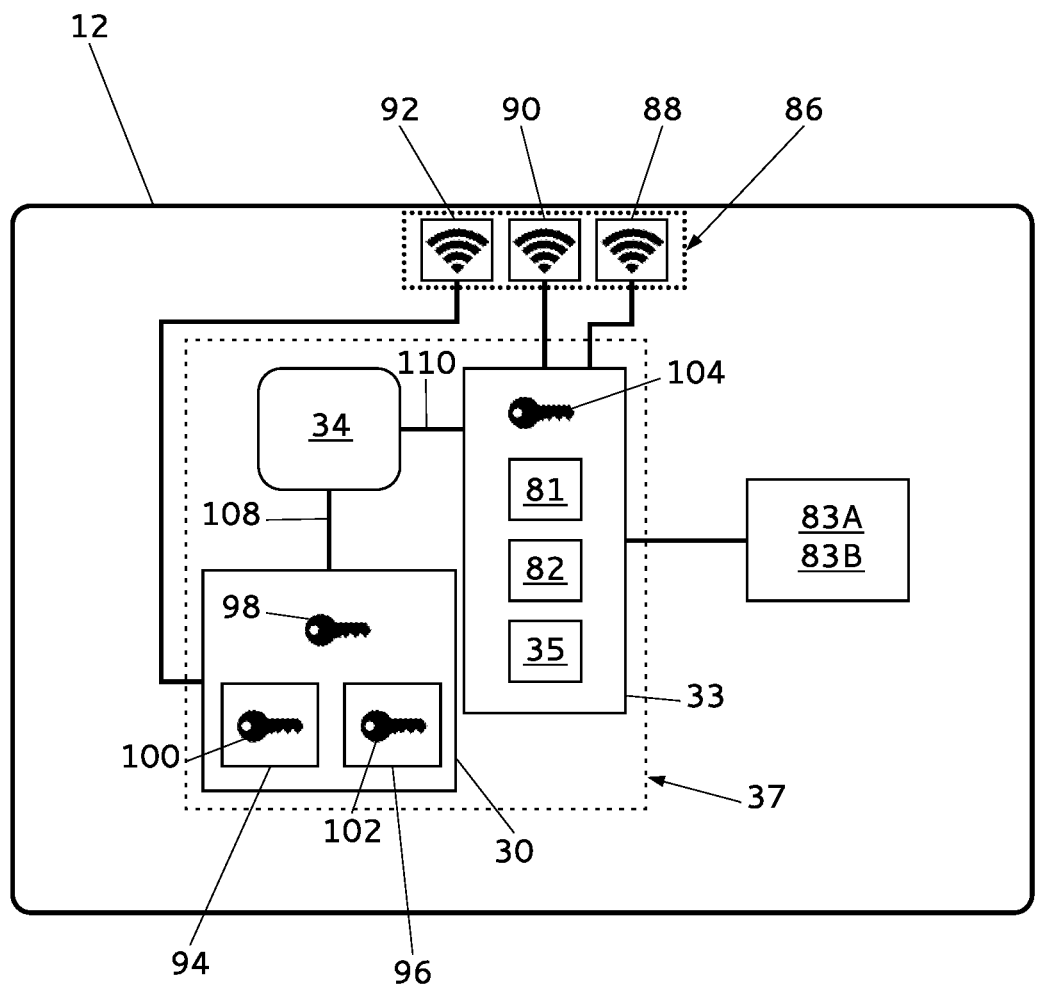
FIG. 3 is a diagram of components in a further embodiment of a DTC.

Referring to FIG. 3, an alternative embodiment of a DTC 12 is shown in which the script applet 81, template store 82, SSD key 104, and MCU registry 35 are included on a secure MCU 33. In this embodiment the function of the OSE 80 (shown in FIG. 1B) is performed by the secure MCU 33. Further, the DTPU 30 and secure MCU 33 are incorporated into a single integrated circuit chip 37 (indicated by a dotted line 37 in FIG. 3). The script applet 81, template store 82 and SSD key 104 should always be stored securely as they enable the generation of scripts capable of being executed on the DTPU 30. Therefore, the secure MCU 33 should have a level of security which is accordance with the relevant rules and security requirements. In an alternative embodiment (not shown), the secure MCU 33 and DTPU 30 are provided as separate chips.

The Communications Module of the DTC

At times, the DTC may need to be provisioned with digital objects from a provisioning infrastructure 10 (described below with reference to FIGS. 17-19) which is remote from the DTC. The DTC is operable to communicate wirelessly with the provisioning infrastructure by communicating with a Data Assistance Device (DAD) which in turn is operable to communicate with the provisioning infrastructure. For example, the DAD can be a mobile device such as a smart phone. The DTC in this embodiment is also operable to communicate directly with the provisioning infrastructure by WiFi without using a DAD. For such wireless communications (with the DAD and using WiFi), the DTC includes a communications module 86. In this embodiment, the communications module 86 includes a WiFi module 88 (which includes a WiFi chip and antenna), a Bluetooth module 90 (which includes a Bluetooth chip and antenna), and the NFC antenna 92. In the case of Bluetooth and NFC communications, the communications module enables the DTC 12 to be linked to (sometimes referred to as being paired with) the DAD for intercommunications.

The NFC antenna 92 is directly connected to the DTPU 30, whereas the Bluetooth module 90 and WiFi module 88 are connected to the MCU 32. The WiFi module 88, Bluetooth module 90 and NFC antenna 92 may be discrete components but are referred to collectively as the communications module 86. In other embodiments of the DTC 12, the communications module 86 does not have all three items 88, 90, 92, but includes at least one of a WiFi module, a Bluetooth module, and an NFC antenna. In one embodiment, the communications module 86 consists of the Bluetooth module 90. In another embodiment, the communications module 86 consists of the WiFi module 88. In another embodiment, the communications module 86 consists of both the WiFi module 88 and the Bluetooth module 90. Alternatively, any other suitable apparatus for wireless communication can be included in the communications module 86.

MCU, OSE and DTPU Connections

In an embodiment, a communication link 106 between the MCU 32 and OSE 80 uses a serial communication protocol. A communication link 108 between the DTPU 30 and the contact plate 34 is in accordance with the ISO 7816 standard, as is well known in the prior art. Unlike the prior art, the depicted embodiment illustrates a communication link 110 between the MCU 32 and the contact plate 34. In one embodiment, link 110 is in accordance with the ISO 7816 standard. In another embodiment, link 110 uses a serial communication protocol. Links 108, 110 enable command APDUs (C-APDUs) to be transmitted from the MCU to the DTPU 30, and response APDUs (R-APDUs) to be transmitted from the DTPU to the MCU.

Figure 4:
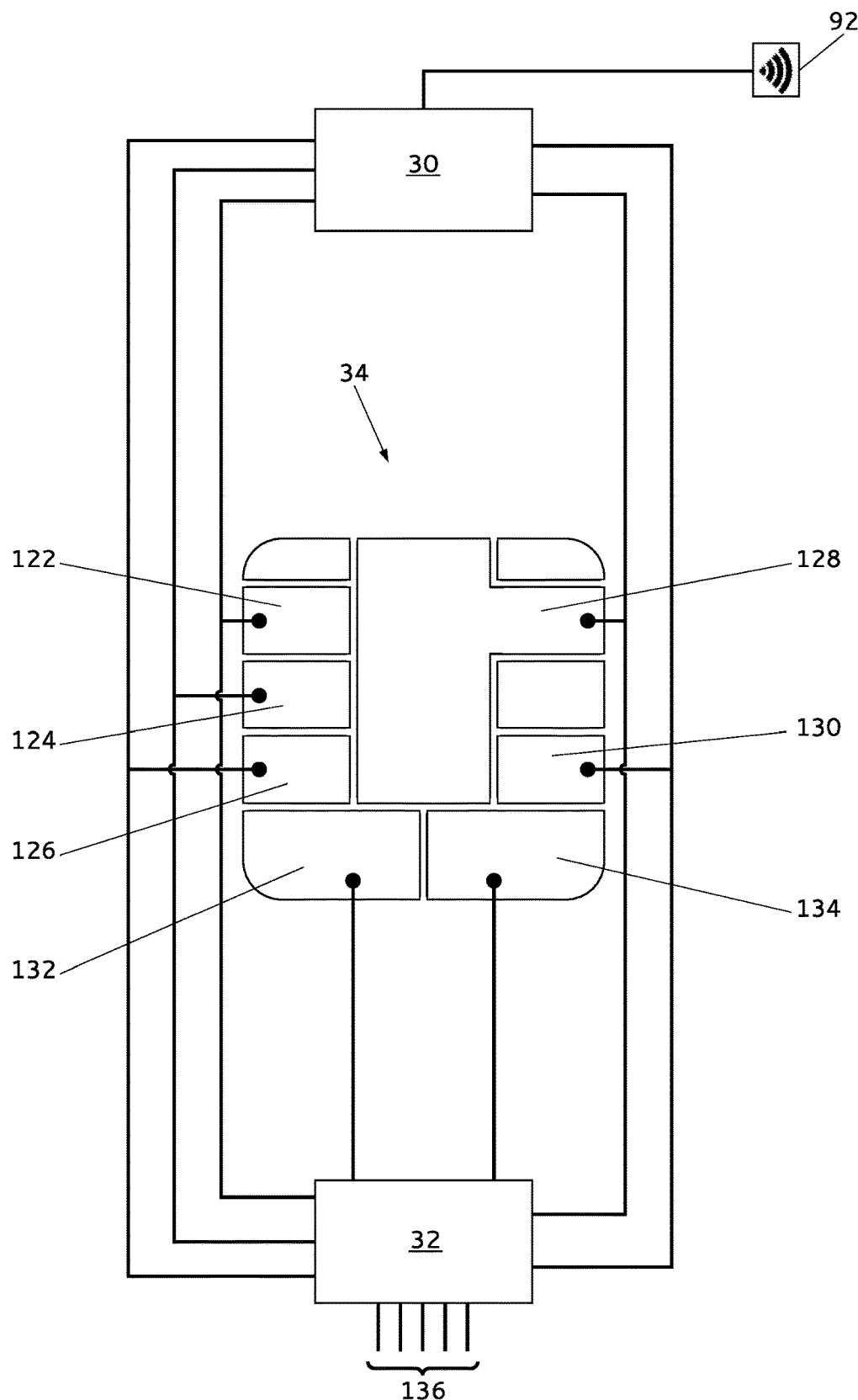
FIG. 4 is a diagram of electrical connections between contact pads, an MCU and a DTPU in an embodiment of a DTC.

FIG. 4 shows further details of the communication links between the contact plate 34 and the DTPU 30 and MCU 32 (shown in FIG. 1B). As is known in the prior art, the DTPU 30 is connected to five patterned metal contact pads within the contact plate 34, having standard functions: VCC (pad 122), RESET (pad 124), CLOCK (pad 126), GROUND (pad 128), and DATA (pad 130). These five contact pads (122, 124, 126, 128, 130) are conventionally used in financial transactions to exchange APDUs between a DTD (for example, a POS terminal) and the DTPU 30. In the embodiment in FIG. 4, the five contact pads (122, 124, 126, 128, 130) are also connected to the MCU 32. As indicated in FIG. 1B, the MCU has also communication links with the other components on the DTC (the OSE 80, user interface 83A, 83B, secure memory 84, Bluetooth module 90, and NFC antenna 92) and these links are indicated by lines 136 in FIG. 4.

The contact plate 34 depicted in FIG. 4 also includes two pads 132, 134 which are connected to the MCU 32 but not to the DTPU 30. The pads 132, 134 are specified by ISO 7816 to be used for custom applications, and in this embodiment pads 132, 134 are provided to enable serial communications with the MCU 32. In this embodiment, pad 132 is operable to transmit data to the MCU 32, and pad 134 is operable to receive data from the MCU. Custom contact pins will likely be required to contact pads 132, 134. It is anticipated that pads 132, 134 may be used in a factory or similar environment (for example a perso bureau) for provisioning the MCU with digital objects before the DTC is distributed to a cardholder. For example, digital objects provisioned via pads 132, 134 could include digital objects intended for the MCU 32 or digital objects for relocation (by the MCU) to either the OSE 80, secure memory 84, or communications module 86. The five contact pads (122, 124, 126, 128, 130) enable the DTPU 30 to be provisioned directly without using the MCU 32 to route digital objects to the DTPU, for example when transmitting scripts to the DTPU while the DTC is in the factory or in contact mode with a DTD.

In at least some embodiments, a switch (not shown) is included to disconnect the MCU 32 from pads 132, 134 when these pads are not in use, to avoid unwanted voltages inadvertently affecting the MCU and the risk of hacking via pads 132, 134.

The same communication links shown in FIG. 4 are also used in the embodiment shown in FIG. 3 between the contact plate 34, DTPU 30, and secure MCU 33 (in place of the MCU 32).

Metadata

The DTC 12 and DAD 14 store metadata associated with each personality hosted by the DTC. Such metadata is used by the MCU when changing the active personality on the DTC. The metadata enables the MCU to look up an AID of each transaction application associated with a selected personality and then request the script applet 81 to generate one or more scripts in respect of the AID(s). In an embodiment, at least some of the metadata is displayed on the display screen 83A to indicate the active personality/personalities.

FIG. 2 shows an embodiment of metadata for one personality. In this embodiment, the metadata is stored as a table in which a first column 888 comprises scheme name, issuer name, cardholder name and AID list, a second column 890 comprises the full PAN (personal account number or primary account number), the last four digits of the full PAN, expiry date and CVV, and a third column 892 comprises a nickname (generated by the cardholder) for the personality. In this embodiment, such metadata is stored on the MCU 32 in an MCU registry 35 (shown in FIG. 1B). In alternative embodiments, the metadata is stored outside the MCU 32. In an embodiment, the metadata is stored in the secure memory 84, and in another embodiment the metadata is stored in the OSE 80.

In an embodiment in which a PDTP is associated with a plurality of transaction applications and the DTC 12 is operable to unlock at least one transaction application (from the plurality of transaction applications) and to lock all other of the plurality of transaction applications, the DTC 12 stores additional metadata about the plurality of transaction applications. In an embodiment, metadata is stored for each transaction application and at least some of the metadata can be displayed on the display screen 83A. The metadata enables the MCU to look up each AID associated with each selected transaction application and then request the script applet 81 to generate one or more scripts in respect of the AID(s). In an embodiment, the metadata for each transaction application includes at least the following information: primary PAN, AID, identifying information, nickname, operation mode (contact or contactless). In an embodiment, the identifying information in the metadata is a tokenised PAN. In another embodiment, the identifying information is a sequence number. The purpose of the identifying information is to enable an issuer to identify a transaction application that has been used in a transaction.

Provisioning the DTC

The purpose of provisioning is to provide digital objects to the DTC 12, for example to give operational functionality to the DTC, or to install a personality. Examples of such digital objects include data for installing firmware needed for operation of the DTC (for example, MCU firmware), and for providing scripts, keys, payment scheme containers, metadata, and applications (including transaction applications, PDTPs, and selection applications). Scripts can be provided to the DTC to perform many functions on the DTC, including installing a payment scheme container, installing a DTP from a payment scheme container, personalising a DTP, and installing a security hierarchy in the OSE or DTPU, amongst others.

In an embodiment, the DTC is at least partially "pre-provisioned" in a factory, which means being provisioned with digital objects in a factory environment prior to the DTC being distributed to a cardholder in the field. The DTC in this embodiment is operable to be further provisioned in the field by the provisioning infrastructure 10. Pre-provisioning in the factory includes provisioning with the involvement of a component manufacturer, device assembly operation, device testing operation, key injection partner, lamination factory, perso bureau or any other party involved in the manufacture or preparation of the DTC before it reaches the field. At least some of the digital objects required to provision the DTC are provided to the factory by the provisioning infrastructure 10.

In one version, the DTC is pre-provisioned in the factory with at least one of firmware, a GP-compliant security hierarchy, a cryptographic key, a payment scheme container, a PDTP, and a selection application. For example, the DTC can be pre-provisioned with digital objects to install a number of personalities, and the DTC can be operable to be provisioned in the field (by the provisioning infrastructure 10) so as to install at least one more personality on the DTC. Alternatively, the DTC may be pre-provisioned with one or more payment scheme containers, and the DTC is operable to be provisioned in the field (by the provisioning infrastructure 10) so as install a PDTP from the one or more installed payment scheme containers.

In an alternative embodiment, the DTC is distributed to a cardholder after very little pre-provisioning in the factory, and is operable to be largely provisioned in the field by the provisioning infrastructure 10. In such an embodiment, the DTC is pre-provisioned with rudimentary bootstrap firmware (installed on the MCU) and keys, for example a TLS certificate, a key for decryption of a subsequent firmware update (for example a PKI key), and DTPU keys to enable the DTPU to be supplied in a SECURED state.

In an alternative embodiment, the DTC is pre-provisioned in the factory with a plurality of personalities and the DTC is not capable of being provisioned in the field. This embodiment of the DTC is also capable of hosting a plurality of personalities and for adopting a personality from the plurality of personalities while the DTC is in the field.

Interactions with a Payment Network

Figure 5:
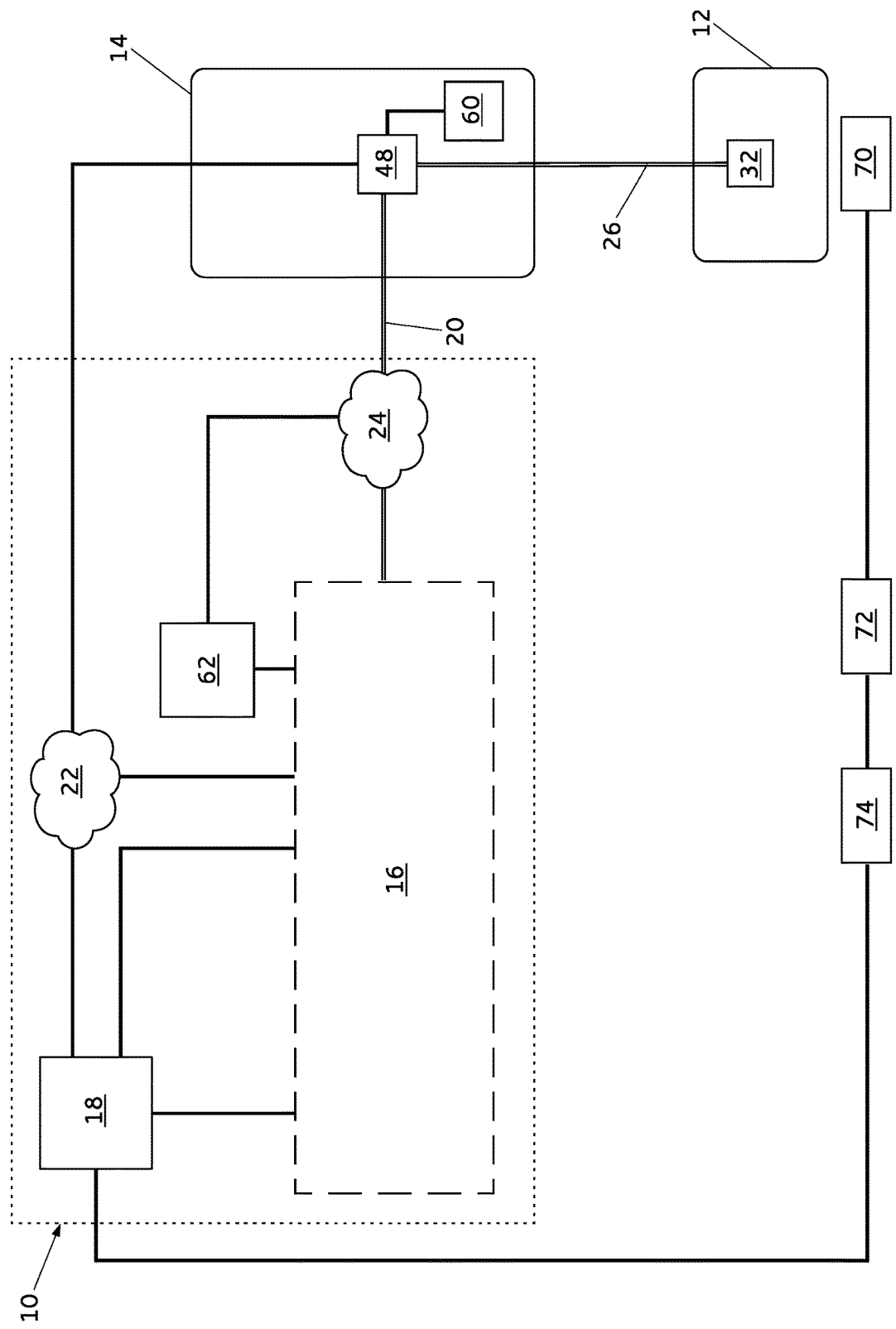
FIG. 5 is a diagram of an embodiment of a provisioning infrastructure, DAD, DTC and payment network.

Referring to FIG. 5, at least some embodiments of the DTC 12 are operable to conduct financial transactions with a conventional payment network including a DTD 70 (for example a POS terminal) which communicates with the DTC 12, an acquirer 72, a payment scheme 74, and the issuer 18. In the embodiment shown in FIG. 5, a provisioning network 16 (described below) is not involved in the process of conducting a transaction. However, the provisioning network 16, together with the issuer 18, are operable to provision the DTC 12 with digital objects that enable the DTC 12 to conduct transactions with a conventional payment network.

Embodiment of a Security Hierarchy

Figure 6:
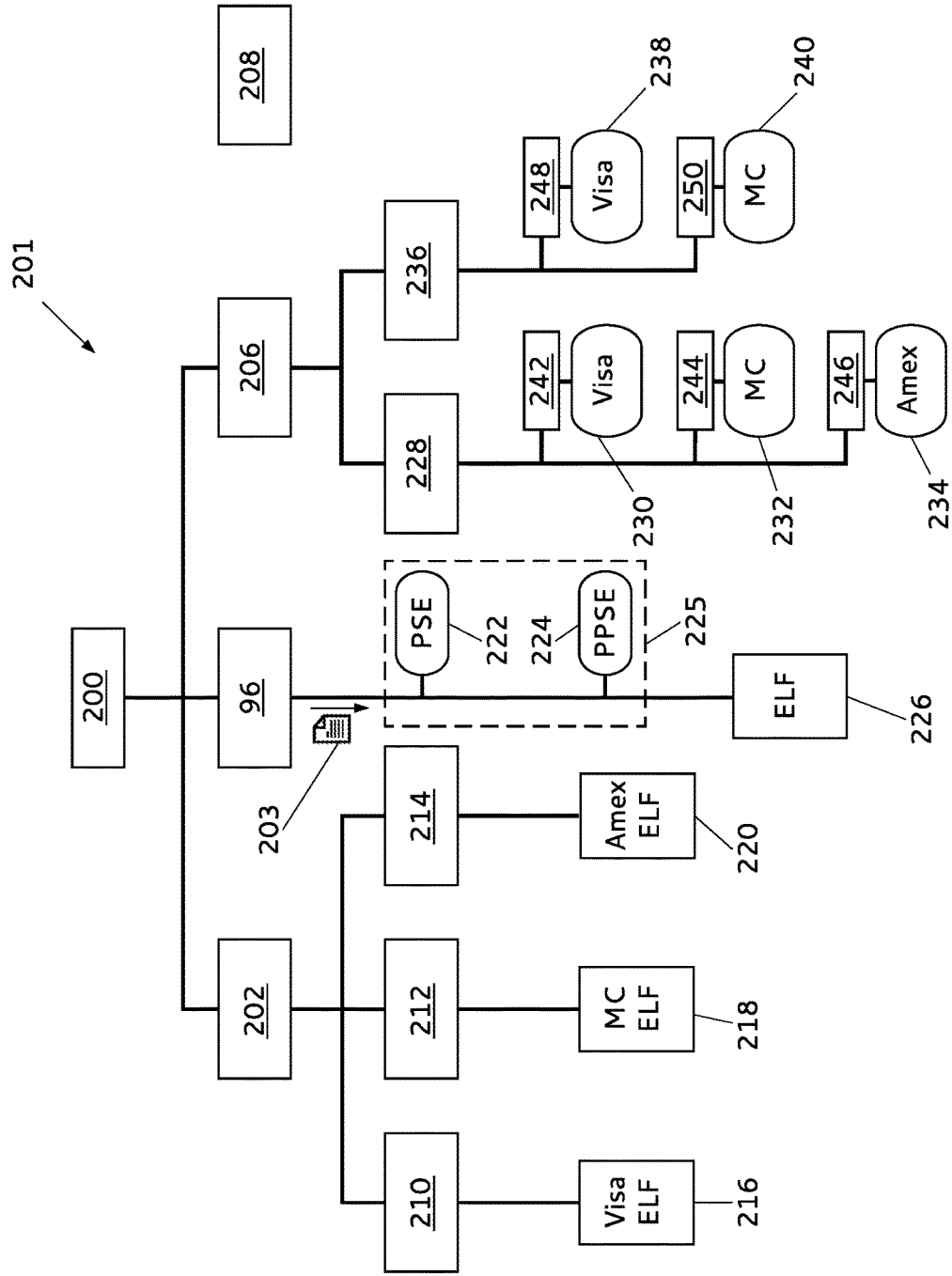
FIG. 6 is a tree diagram of an embodiment of a security hierarchy in a DTPU.

FIG. 6 illustrates an embodiment of a security hierarchy 201 on the DTPU which is suitable for hosting a plurality of personalities and for adopting a personality from the plurality of personalities while the DTC is in the field.

The security hierarchy 201 has a tree structure. The highest level of the security hierarchy is the Issuer Security Domain (ISD) 200. The ISD in this embodiment is a parent to three SSDs (202, 96, 206) which are each a parent to three sibling branches of the tree structure and described below. Each SSD in the hierarchy holds at least one cryptographic key which is operable to authenticate scripts targeting that SSD. For example, SSD 206 holds a key which is operable to authenticate any script targeting SSD 206. Only a party that has a copy of the appropriate key for a specific SSD can authenticate scripts targeting that SSD.

Figure 17:
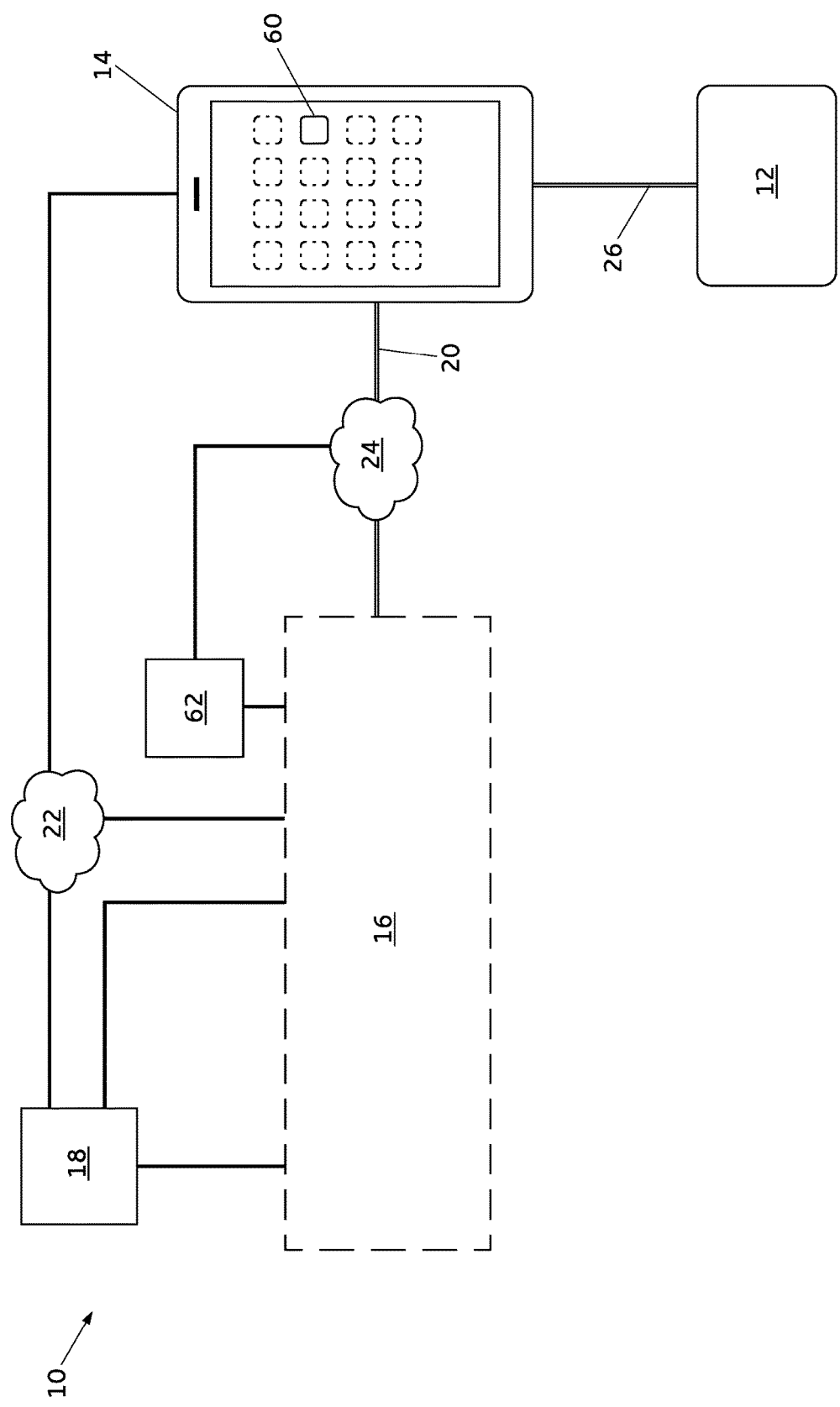
FIG. 17 is a diagram of an embodiment of a provisioning infrastructure, DAD, and DTC.
Figure 18:
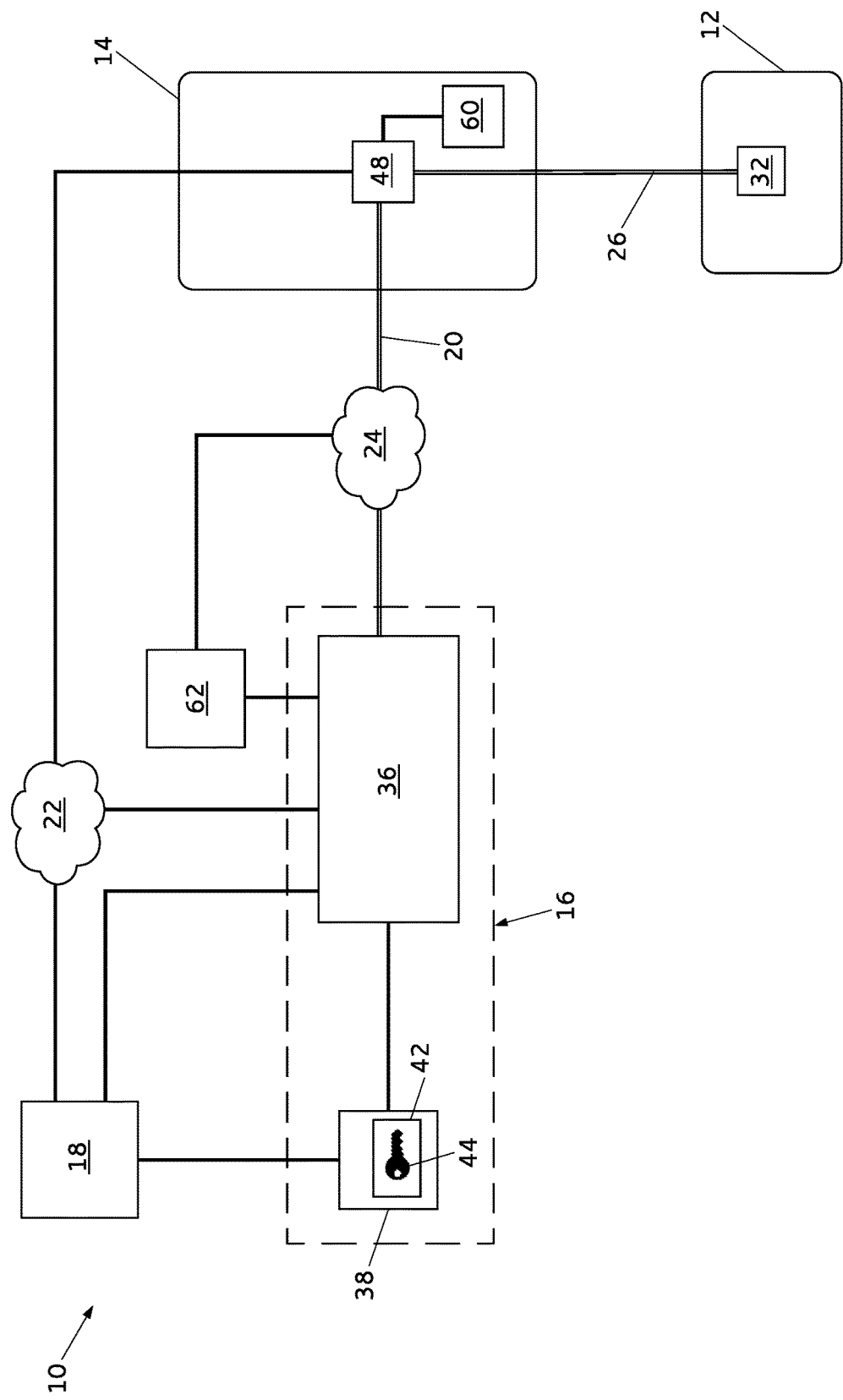
FIG. 18 is a diagram of an embodiment of a provisioning infrastructure, DAD, and DTC.
Figure 19:
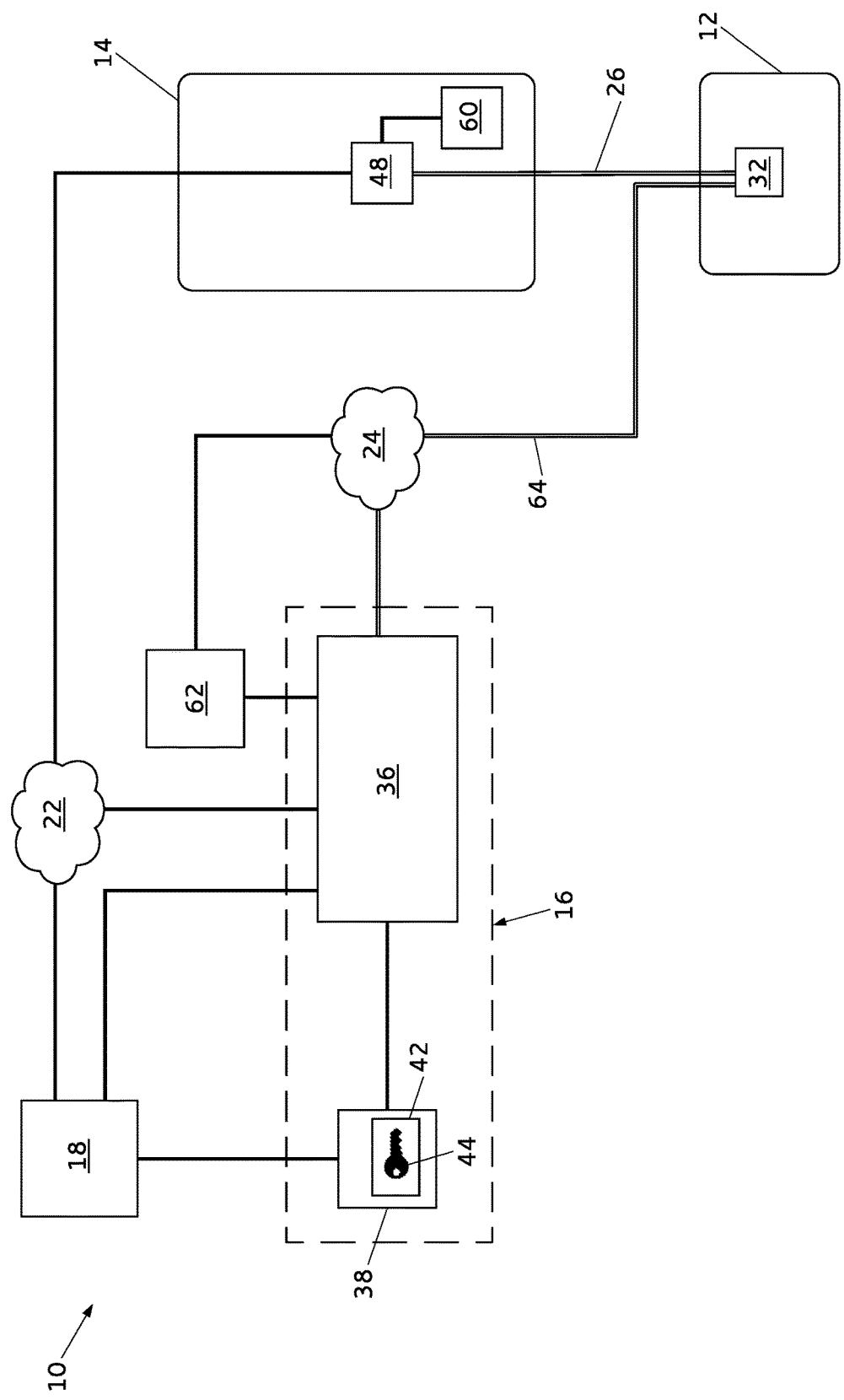
FIG. 19 is a diagram of an embodiment of a provisioning infrastructure, DAD, and DTC.

SSD 96 is a parent to a first branch of the tree structure. The first branch includes a PSE selection application 222, a PPSE selection application 224, and a container 226. A copy of the key held by SSD 96 is also held by the OSE 80 (shown in FIG. 1B) and a provisioning network 16 (specifically a DPD manager 36, as shown in FIGS. 17-19). Therefore, the OSE 80 and DPD manager 36 are each operable to authenticate scripts targeting SSD 96 and the applications 222, 224 associated with SSD 96 (in the terminology of a tree structure, applications 222, 224 are each a "child" of SSD 96). The PSE and PPSE selection applications are installed from the container 226 which in the form of at least one Elementary Load File (ELF).

SSD 206 is parent to a second branch of the tree structure. The second branch is a sibling to the first branch. SSD 206 is a parent to SSD 228 and SSD 236, each of which is under the control of a different party, for example a bank. SSD 228, which is controlled by "Bank 1", is a parent to three further SSDs 242, 244, 246, and each of these further SSDs is a parent to one PDTP (which includes at least one transaction application) for a single personality:

SSD 242 is a parent to PDTP 230 for a Bank 1 Visa personality;
SSD 244 is a parent to PDTP 232 for a Bank 1 Mastercard personality;
SSD 246 is a parent to PDTP 234 for a Bank 1 American Express personality.

Only Bank 1 has a copy of the keys held by SSDs 228, 242, 244, 246. Bank 1 would use its own SP-TSM to perform operations on SSDs 228, 242, 244, 246.

"Bank 2" controls SSD 236, which is a parent to two further SSDs 248, 250, and each of these further SSDs is a parent to a PDTP (which includes at least one transaction application) for a single personality:

SSD 248 is a parent to PDTP 238 for a Bank 2 Visa personality;
SSD 250 is a parent to PDTP 240 for a Bank 2 Mastercard personality.

Only Bank 2 has a copy of the key held by SSDs 236, 248, 250. Bank 2 would use its own SP-TSM to perform operations on SSD 236, 248, 250.

SSD 202 is a parent to a third branch of the tree structure. The third branch and is a sibling to the first and second branches. SSD 202 is a parent to three SSDs: SSD 210 (which is a parent to a payment scheme container 216 for Visa), SSD 212 (which is a parent to a payment scheme container 218 for Mastercard), and SSD 214 (which is a parent to a payment scheme container 220 for American Express). Each payment scheme container is used to generate (instantiate) an unpersonalised transaction application which (when combined with personalisation data) is used to create a transaction application. For example, the container 216 for Visa in FIG. 6 would have been used to generate unpersonalised Visa transaction applications for Bank 1 and Bank 2, which were subsequently personalised to create each transaction application included in Visa PDTP 230 and each transaction application included in Visa PDTP 238.

Within the DTPU is an additional security domain 208 known as a Controlling Authority Security Domain (CASD).

The CASD 208 in this embodiment is a domain which is trusted by both the DPD manager and the managers of PDTPs on the DTPU. This embodiment, Bank 1 and Bank 2 are the managers of the PDTPs on the DTPU. The CASD can be used to perform a key rotation, which is where a key provided by one party (for example, the DPD manager) is swapped for a key provided by another party (for example, a PDTP manager). A key rotation may be used after the DPD manager installs an SSD (for example, an SSD associated with a new personality) to give control of the SSD to the relevant PDTP manager (for example, Bank 1 or Bank 2). In some embodiments, the CASD is present on the DTPU when issued by a chip manufacturer or provider. In another embodiment, a CASD is installed when the DTC is in a secure factory environment and prior to the issuer 18 having access to the DTC (to avoid the possibility of tampering by the issuer). In embodiments in which there is trust between the DPD manager and the manager of each PDTP, a CASD may not be required. In some of such embodiments, the DTPU does not include a CASD.

Embodiments of an Application Selection Module

A function of the application selection module 225 is to enable the DTC 12 to provide an identifier for each transaction application on the DTPU 30 which is unlocked and therefore available to be used in a transaction with a DTD 70 (for example a POS terminal 70 shown in FIG. 5). In the embodiments described here, the identifier is a AID (application identifier) known in the prior art, but the identifier can alternatively be any information which is capable of identifying a transaction application and can be recognised and processed by a DTD 70 and complies with relevant standards and agreements for payment networks, payment processing methods, and DPDs for such payment networks.

In at least some embodiments, the DTC 12 is operable to unlock selected transaction applications and to lock any other transaction application on the DTPU 30. Each selected transaction application can be associated with one or more PDTPs. Such embodiments of a DTC 12, when performing a transaction with a DTD 70, are operable to provide to the DTD an AID for each unlocked transaction application on the DTPU 30, without providing an AID for any locked transaction application. The set of AIDs provided by the DTC 12 to the DTD 70 is referred to here as a "candidate list". During a transaction, the DTD 70 selects an AID from the candidate list, and the selected AID is subsequently used in the transaction.

In an embodiment of the invention, the application selection module 225 is operable to generate the candidate list during a transaction, and the DTPU 30 is operable to provide the candidate list to the DTD 70. The candidate list must only include transaction applications which are currently unlocked. If a personality is subsequently activated or de-activated (and a transaction application is therefore unlocked or locked, respectively), such a change in state must be reflected in the candidate list during a subsequent transaction.

In an embodiment, the application selection module 225 is operable to generate a candidate list for many kinds of transaction application, including a transaction application associated with a payment scheme (for example, a credit or debit account personality), a transaction application associated with a non-payment personality (for example, an identity document), a transaction application associated with a transport smart card personality, a transaction application for contact transactions, a transaction application for contactless transactions, and a transaction application with interfaces for both contact and contactless transactions. Such transaction applications include transaction applications with different primary PANs, transaction applications with the same primary PAN, transaction applications with different tokenised PANs, and transaction applications with different sequence numbers.

In an embodiment in which the DTC 12 hosts at least one transaction application for a payment scheme, the application selection module 225 includes the PSE selection application 222 and the PPSE selection application 224. In an embodiment in which each transaction application hosted by the DTC 12 is a contact transaction application (operable for contact transactions only), the application selection module 225 may not include the PPSE selection application 224. In an embodiment in which each transaction application hosted by the DTC 12 is a contactless transaction application (operable for contactless transactions only), the application selection module 225 may not include the PSE selection application 222. In all such embodiments, the application selection module 225 is operable to perform a process in which the PSE selection application (if included) is set with an AID of each unlocked contact transaction application, and the PPSE selection application 224 is set with an AID of each unlocked contactless transaction application. When there is a change in the status of any transaction application (changing from locked to unlocked or vice versa), the DTC 12 is operable to repeat the process of setting the PSE selection application 222 with an AID of each unlocked contact transaction application and setting the PPSE selection application 224 with an AID of each unlocked contact transaction application.

Although the presently described embodiment of the application selection module 225 includes the PSE selection application 222 and the PPSE selection application 224, the application selection module 225 is not limited to these selection applications. For example, the application selection module 225 can include a selection application for selecting a transaction application associated with a non-payment personality. Such a selection application can operate in a similar way to the PSE and PPSE selection applications.

In DTCs in the prior art, the PSE selection application and PPSE selection application are set in the factory and never changed once the DTC is in the field. There is no facility to re-set the PSE selection application and PPSE selection application once the DTC is in the field.

In an embodiment of the present invention, the DTC 12 is operable to set or re-set the PSE selection application 222 and the PPSE selection application 224 by sending at least one script 203 containing one more commands (script 203 is shown in FIG. 6) to the application selection module 225 in the DTPU 30. In an embodiment, the script 203 includes appropriately authenticated APDUs which include an encrypted payload in accordance with the SCP02 protocol. For security purposes, the script 203 must be authenticated as a prerequisite to being executed by the application selection module 225. The script 203 is authenticated against the SSD 96 (which, in the hierarchy in FIG. 6, is a parent to the application selection module 225) and executed by the PSE selection application 222 and/or PPSE selection application 224. The script 203, when executed, sets the PSE selection application with an AID of each unlocked contact transaction application, and sets the PPSE selection application 224 with an AID of each unlocked contactless transaction application.

In an embodiment, the script 203 is generated on the DTC 12 by the script applet 81 (in the OSE 80). Inputs used by the script applet 81 to generate the script include: a script template provided by the template store 82 (in the OSE 80), an AID of each unlocked transaction application (each AID is provided by the MCU 32, for example from metadata shown in FIG. 2), a key 104 (stored in the OSE 80), and a counter value associated with a targeted SCP02 keyset in the DTPU 30. The key 104 is a copy of a key held by SSD 96. As shown in FIG. 6, SSD 96 is a parent to the application selection module 225 in the security hierarchy. The script applet 81 uses the key 104 and counter value to generate a session key which is used to authenticate the script 203 against the SSD 96 so that the script can be executed by the application selection module 225. An example of a process for generating the script 203 is described below with reference to FIGS. 9 and 10, as part of a process for changing the active personality/personalities.

In an alternative embodiment, script 203 is provided by the provisioning infrastructure 10 (shown in FIG. 5) in a provisioning process. An embodiment of a provisioning infrastructure 10 operable suitable for provisioning the DTC 12 while the DTC 12 is in the field (remote from the provisioning infrastructure 10) is described below with reference to FIGS. 17-19. In an embodiment, script 203 is provided by the provisioning infrastructure 10 (specifically the DPD manager 36) and stored in the MCU 32 until required. In another embodiment, script 203 is stored in the OSE 80 and retrieved by the MCU 32 when required. In another embodiment, script 203 is stored in the secure memory 84 and retrieved by the MCU 32 when required. Multiple types of scripts 203 can be provisioned and stored to meet the future requirements of the DTC 12 until it is provisioned by the provisioning infrastructure 10.

In an alternative embodiment, script 203 is pre-provisioned (installed while the DTC 12 is in the factory) and stored until required. Again, such script 203 can be stored in the MCU 32, OSE 80 or secure memory 84 until required. In such an embodiment, multiple scripts 203 are stored to meet the future requirements of the DTC 12 or until it is provisioned by a provisioning infrastructure 10.

In an embodiment, script 203 includes each AID to be set. In an alternative embodiment, the PSE selection application 222 and/or the PPSE selection application 224 includes a register which is operable to store AIDs of respective transaction applications hosted by the DTPU 30. In such an embodiment, script 203 includes information to identify a transaction application (for example, "05" to indicate a specific transaction application), and the PSE selection application 222 and/or the PPSE selection application 224 refer to the register to look up the AID corresponding to transaction application "05". When a new personality is installed on the DTC, the register is updated with each AID associated with the new personality.

De-Activating PDTPs

In an embodiment, changing the active personality on the DTC involves locking all transaction applications hosted by the DTPU and then unlocking each transaction application associated with a selected PDTP, which leaves any other transaction application locked. Each locked transaction application is inoperable during a transaction and cannot be directly selected by a DTD.

Figure 7:
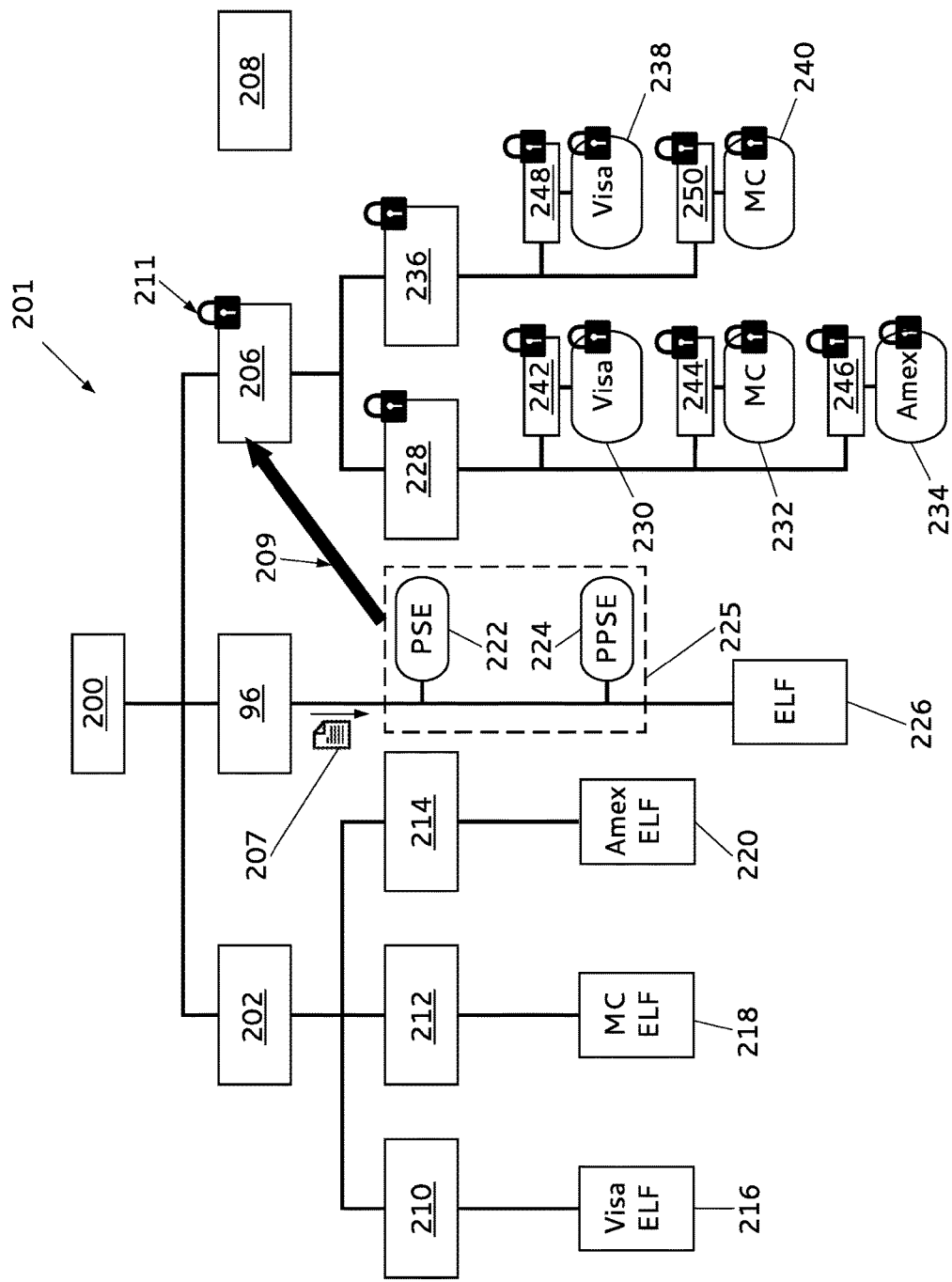
FIG. 7 is a tree diagram of an embodiment of a security hierarchy in a DTPU.

In an embodiment of a locking process illustrated in FIG. 7 (which shows the same hierarchy 201 depicted in FIG. 6), SSD 206 is targeted with an appropriately authenticated "Lock and Associated" command, which does the following:
 a) locks (makes inactive) SSD 206,
 b) locks all SSDs associated with (children of) the SSD 206 in the hierarchy, and c) locks all transaction applications associated with (children of) the locked SSDs.

Therefore, in this embodiment, the Lock and Associated command has the effect of a) locking SSD 206, b) locking SSDs 228, 236, 242, 244, 246, 248, 250, and c) de-activating PDTPs 230, 232, 234, 238, 240. Each padlock 211 indicates either a locked SSD or an inoperable PDTP.

The locking of all SSDs associated with SSD 206 (and the consequent de-activation of all PDTPs) is referred to here as a "cascade locking" process. In a cascade locking process the SSD 206 is referred to as a Lock SSD for PDTPs. Applying cascade locking to Lock SSD 206 makes all PDTPs inoperable. From the cardholder's point of view, cascade locking de-activates all personalities (makes them inoperable). In an embodiment, the DTC is operable to perform cascade locking when changing the active personality on the DTC.

The cascade locking process is triggered when the DTPU receives at least one authenticated script 207 in the form of APDUs. In an embodiment, the APDUs include an encrypted payload in accordance with the SCP02 protocol and are authenticated against SSD 96 (the parent SSD of application selection module 225).

In this example, script 207 commands the application selection module 225 to target the Lock SSD 206 (as indicated by arrow 209) with a cascade locking command. In an embodiment, the application selection module 225 is operable to use the Global Lock privilege to target the Lock SSD 206 with the cascade locking command.

In an embodiment, script 207 targets the PSE selection application 222 to perform the cascade locking process. In an alternative embodiment, the script 207 targets the PPSE selection application 224 to perform the cascade locking process. In an alternative embodiment, the script 207 targets a different unlocked application to either perform the cascade locking process or delegate the PSE or PPSE application to perform the cascade locking process.

In an alternative embodiment (not shown), a single cascade locking command is not used to de-activate PDTPs. Instead, multiple lower-level SSDs are each targeted with a separate lock command. For example, by locking SSD 228 and SSD 236, all lower level SSDs will be locked. In the example shown in FIG. 7, targeting SSD 228 with a lock command causes SSDs 242, 244, 246 to be locked and PDTPs 230, 232, 234 to be de-activated. Similarly, targeting SSD 236 with a lock command causes SSDs 248, 250 to be locked and PDTPs 238, 240 to be de-activated. Alternatively, a separate lock command can be targeted at each of SSDs 242, 244, 246, 248, 250 to de-activate all PDTPs. In one version, the application selection module 225 uses the Global Lock privilege to target each SSD to be locked. In another version, Global Lock privilege and the application selection module 225 are not used. Instead, each SSD to be locked (for example SSD 242) is targeted directly by a lock command included in a script provided to the DTPU 30. The script is in the form of APDUs and authenticated against the SSD to be targeted. In an embodiment, a registry in the MCU keeps a record of the locking status of each SSD and enables the DTC 12 to avoid generating scripts for SSDs that do not need to change locking status.

In an embodiment, each authenticated script to lock all PDTPs (such as script 207) is generated on the DTC 12. In an embodiment, the MCU 32 commands the script applet 81 (in the OSE 80) to generate each authenticated script. Inputs used by the script applet 81 to generate the script include: a script template (provided by the template store 82 in the OSE 80), identifiers such as AIDs to identify each PDTP to be de-activated (the identifiers are included in metadata provided by the MCU 32), a key 104 (stored in the OSE 80), and a counter value associated with a targeted SCP02 keyset in the DTPU 30. The key 104 is a copy of a key held by the SSD to be targeted. Where the script targets the application selection module 225, the key a copy of a key held by the parent SSD 96. An example of a process for generating script 207 is described below with reference to FIGS. 9 and 10. Where the script targets a parent SSD of a PDTP, the key 104 is a copy of a key held by the targeted SSD.

The script applet 81 uses the key 104 and counter value to generate a session key which is used to authenticate the script against the targeted SSD. Once an authenticated script has been generated by the script applet 81, the MCU 32 forwards the authenticated script to the DTPU 30 for execution.

Activating Targeted PDTPs

Figure 8:
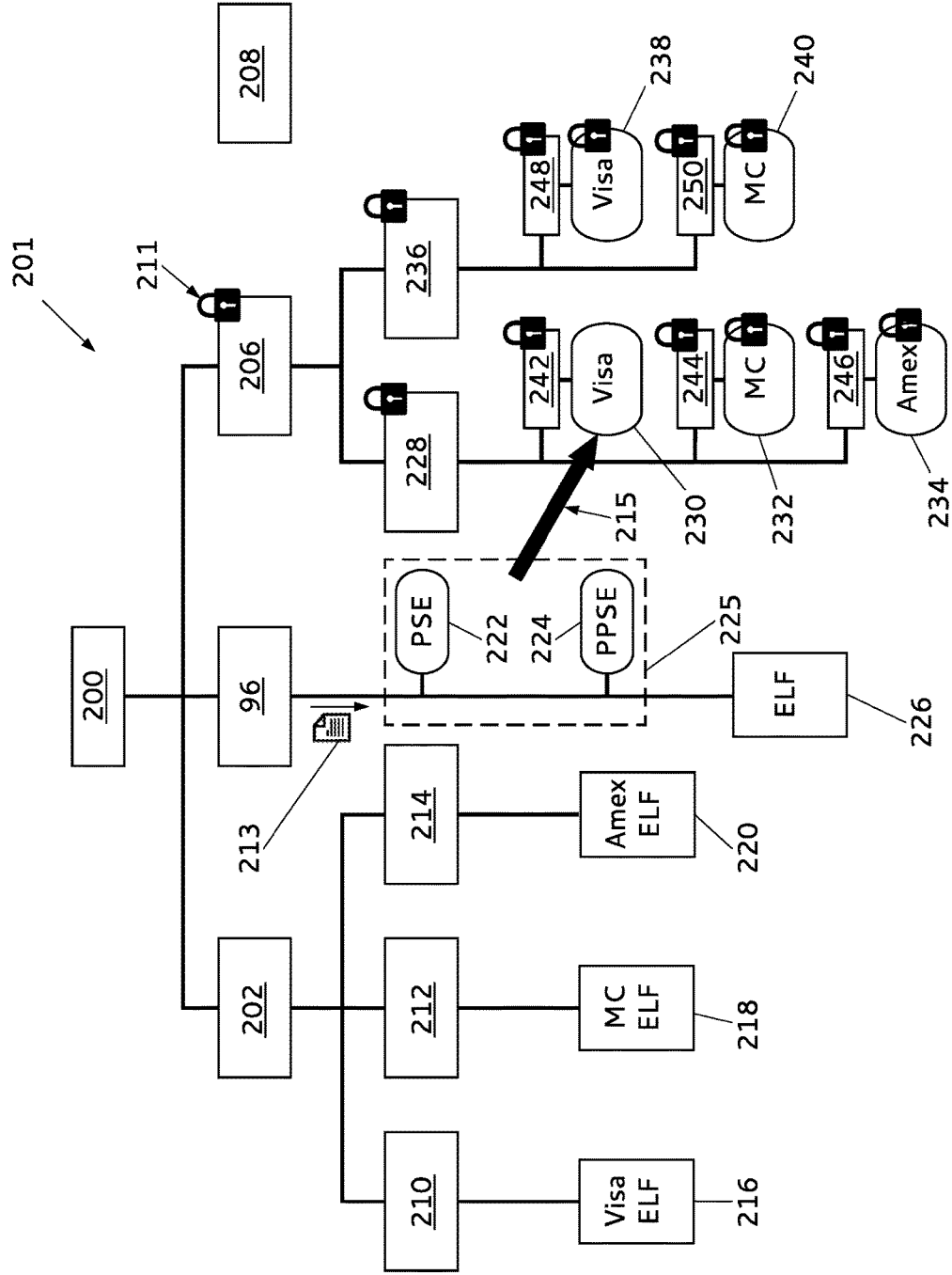
FIG. 8 is a tree diagram of an embodiment of a security hierarchy in a DTPU.

In an embodiment, changing the active personality on the DTC includes activating a targeted PDTP. Activating a targeted PDTP directly after a cascade locking process results in only the targeted PDTP being active. Therefore, only the personality associated with the targeted PDTP is activated. Referring to FIG. 8 (which shows the same hierarchy 201 depicted in FIGS. 6 and 7), an inoperable PDTP can be activated by unlocking at least one transaction application associated with the PDTP. For example, PDTP 230 can be activated by unlocking at least one transaction application associated with PDTP 230.

In this example, script 213 commands the application selection module 225 (which has the Global Lock privilege) to target at least one transaction application associated with the Visa PDTP 230 with an application unlock command (as indicated by arrow 215). In an embodiment, the application unlock command is a SET STATUS command which causes one or more transaction applications associated with the Visa PDTP 230 to revert to their previous state, which was an unlocked state. Once script 213 is executed, Visa PDTP 230 becomes active, which means transaction applications associated with PDTP 230 can be used in transactions and the personality associated with PDTP 230 is active (available to be used by the cardholder).

In an alternative embodiment, the script 213 targets a different unlocked application on the DTPU 30 (instead of application selection module 225) to either target each transaction application with an unlock command, or delegate the PSE or PPSE application to target each transaction application with an unlock command.

In a further alternative embodiment (not shown), Global Lock privilege and the application selection module 225 are not used. Instead, a script is provided to the DTPU 30 to command another application on the DTPU 30 to target each PDTP to be activated. Such an application could be an unlocked SSD. In an embodiment, an additional SSD referred to here as an Application Unlock SSD is provided which is a parent to SSD 206 for the purpose of activating PDTPs. The Application Unlock SSD does not get locked in a cascade locking process because it is a parent to Lock SSD 206 in the hierarchy. In the example shown in FIG. 8, a script would be provided to command the Application Unlock SSD to activate PDTP 230, without involving the application selection module 225 in the unlocking process.

In an embodiment, each authenticated script for activating a PDTP (such as script 213) is generated on the DTC 12. In an embodiment, the MCU 32 commands the script applet 81 (in the OSE 80) to generate each authenticated script. Inputs used by the script applet 81 to generate the script include: a script template (provided by the template store 82 in the OSE 80), identifiers such as AIDs to identify each PDTP to be activated (identifiers are included in metadata provided by the MCU 32), a key 104 (stored in the OSE 80), and a counter value associated with a targeted SCP02 keyset in the DTPU 30. The key 104 is a copy of a key held by the SSD to be targeted. Where the script targets the application selection module 225, the key 104 is a copy of a key held by the parent SSD 96. An example of such a process for generating script 213 is described below with reference to FIGS. 9 and 10. Where the script targets a parent SSD of PDTP, the key 104 is a copy of a key held by the parent SSD (for example, where the script targets PDTP 230, the key is a copy of the key held by SSD 242).

The script applet 81 uses the key 104 and counter value to generate a session key which is used to authenticate the script against the targeted SSD. Once an authenticated script has been generated by the script applet 81, the MCU 32 forwards the authenticated script to the DTPU 30 for execution.

Script 213 may be included as part of the cascade locking script 207 or it may be a separate script. In this embodiment, script 213 targets a PDTP 230 which may include both contact and/or contactless functionality. Script 213 is operable to target a single transaction application or multiple transaction applications within a PDTP, for example either a contact transaction application or contactless transaction application, or both contact and contactless transaction applications.

The PSE selection application 222 and PPSE selection application 224 are each operable to unlock any transaction application on the DTPU. In an embodiment, the PSE selection application 222 is used to unlock each contact transaction application within a targeted PDTP, and the PPSE selection application 224 is used to unlock each contactless transaction application within a targeted PDTP. In an embodiment, the PSE selection application 222 is operable to manage the PPSE selection application 224 (to reduce processing overheads). In such an embodiment, script 213 targets the PSE selection application 222, which delegates the PPSE selection application 224 to unlock any contactless applications to be targeted. In another embodiment, the PPSE selection application 224 is operable to manage the PSE selection application 222. In such an embodiment, script 213 targets the PPSE selection application 222 which delegates the PSE selection application 222 to unlock any contact applications to be targeted. In an alternative embodiment, there is an additional application (not shown, but which is part of the application selection module 225) which manages both the PSE and PPSE selection applications 222, 224. In such an embodiment, script 213 targets this additional application, which delegates the PSE and PPSE selection applications 222, 224 to unlock transaction applications to be targeted as appropriate.

Unlocking a Targeted Transaction Application

In an embodiment, the process for unlocking a targeted transaction application is the same as the process described above for activating a targeted PDTP, except an individual transaction application is targeted instead of a group of transaction applications associated with a PDTP. Unlocking a targeted transaction application directly after a cascade locking process results in only the targeted transaction application being selectable in a transaction.

Sequence Diagrams for Adopting a Personality While in the Field

Figure 9:
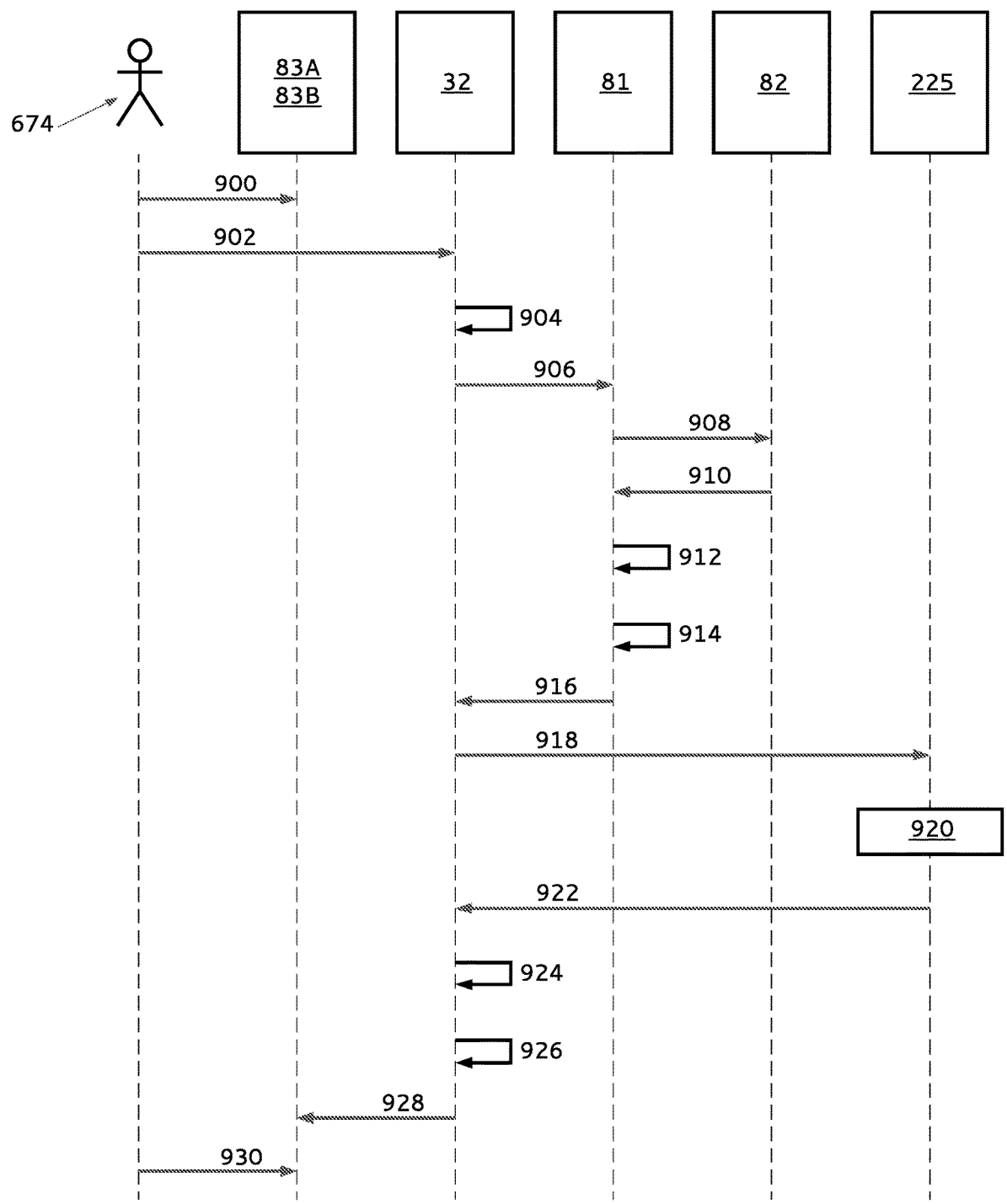
FIG. 9 is a sequence diagram showing part of an embodiment of a process for adopting a personality on a DTC.
Figure 10:
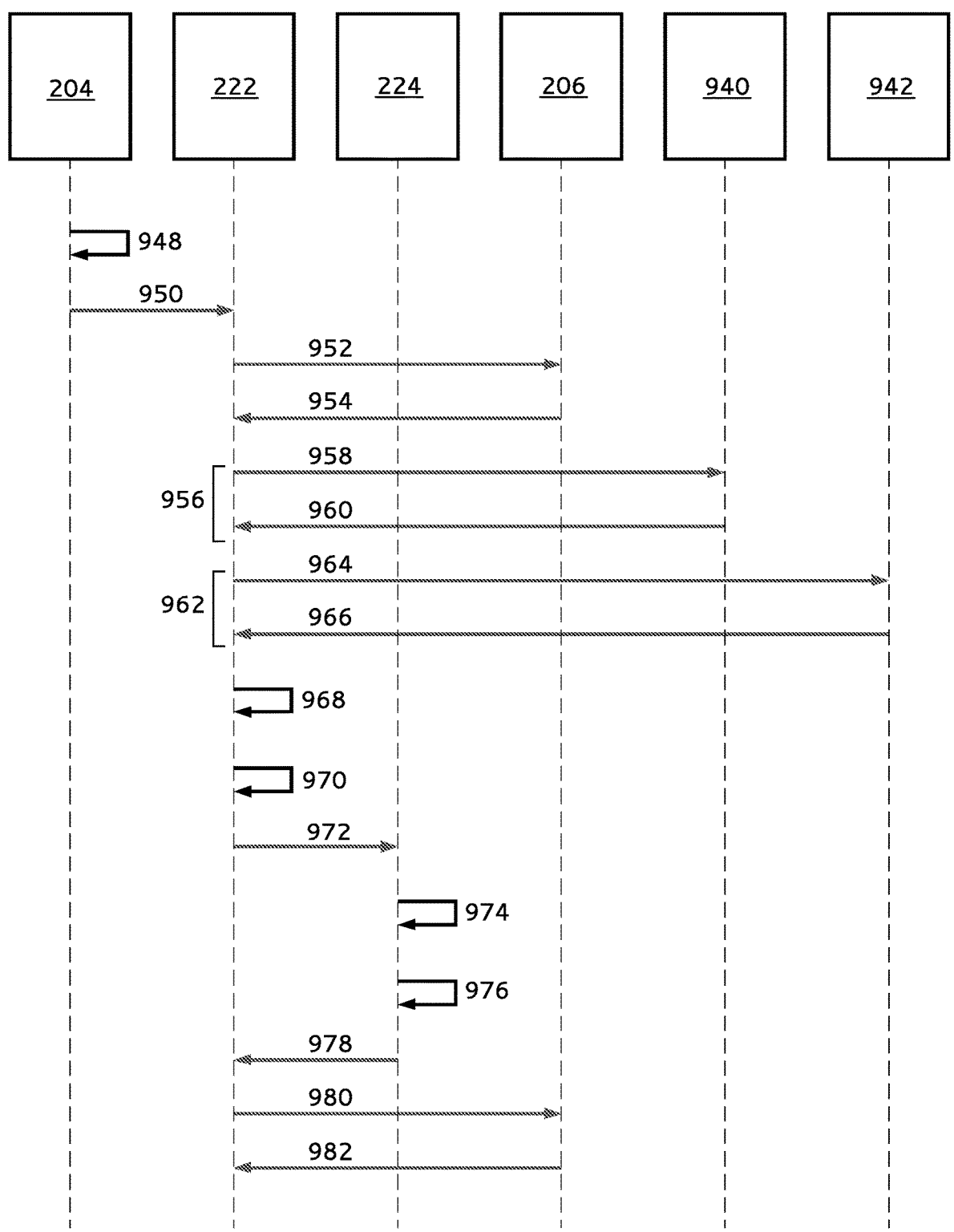
FIG. 10 is a sequence diagram showing part of an embodiment of a process for adopting a personality on a DTC.

FIGS. 9-10 illustrate an embodiment of a process which enables a cardholder of the DTC, while in the field, to select and activate one or more of a plurality of personalities installed on the DTC without the DTC communicating with a provisioning infrastructure 10 or provisioning network 16. The process in FIG. 9 contains sub-process 920 which is illustrated in FIG. 10.

Referring to FIG. 9, the process for selecting and activating a personality begins in step 900 when a cardholder 674 uses the display screen 83A (FIG. 1A) to browse the personalities currently installed on the DTC. The available personalities are represented on the display screen 83A by one or more items of metadata associated with each personality. An embodiment of metadata associated with a personality is shown in FIG. 2. In an embodiment, the metadata displayed on the display screen 83A is the payment scheme name, bank name and last four digits of the PAN, and logo for the payment scheme (the logo is not included in the embodiment of metadata shown in FIG. 2).

In step 902, the cardholder 674 selects one (or more) personality to be activated and the selection is recorded by the MCU 32. In this embodiment, the DTC 12 is operable to simultaneously have multiple active personalities. The MCU registry stores rules regarding which personalities are permitted to be simultaneously active, and the MCU refers to these rules before proceeding with a personality change. If the rules do not permit the requested personality change, the MCU 32 displays a message on the graphical display screen 83A to indicate that the personality change cannot proceed. In another embodiment, when a cardholder requests a new personality to be activated, the DTC 12 is operable to de-activate any other personality that the rules do not permit to be simultaneously active with the selected personality. In such an embodiment, the MCU 32 can be operable to request confirmation from the cardholder before proceeding to de-activate a personality. In another embodiment, the rules specify that only one personality can be active at any time.

In step 904, if the rules permit the requested personality change, the MCU 32 looks up the metadata stored in MCU registry 35 and identifies the metadata associated with each selected personality. The metadata for each personality contains AID information which specifies an AID for each transaction application of a PDTP associated with each selected personality. The MCU 32 uses the metadata to generate a list of AIDs associated with each selected personality.

In step 906, the MCU 32 sends a command (which contains the list of AIDs for the selected personality) to the script applet 81 to generate at least one script which, when executed by the application selection module 225 on the DTPU 30: de-activates all PDTPs on the DTPU, activates a PDTP associated with the selected personality, and sets the application selection module 225 with AIDs for the selected personality. The script generated in step 906 is equivalent to three scripts described earlier: script 207 shown in FIG. 7 (for cascade locking), script 213 shown in FIG. 8 for (targeted unlocking), and script 203 shown in FIG. 6 (for setting AIDs on the application selection module 225).

In step 908, the script applet 81 requests a script template from the template store 82 (which is stored on the OSE), and in step 910 the template store 82 returns the requested script template to the script applet 81. In step 912, the script applet 81 fills the script template with values to create a script. The created script is in the form of APDUs and derived from: AIDs for contact transaction applications associated with the selected PDTP(s), and AIDs for contactless transaction applications associated with the selected PDTP(s).

In step 914, the script applet 81 generates a session key using SSD key 104 (which is stored in the OSE 80), and a counter value associated with a targeted SCP02 keyset in the DTPU 30. The SSD key 104 stored in the OSE 80 is a copy of a key held by SSD 96 in the DTPU 30. As shown in FIGS. 7-8, the SSD 96 is a parent to the application selection module 225 in the security hierarchy. The purpose of the session key is to authenticate the script against the SSD 96 so that the script can be executed by the application selection module 225. The script applet 81 uses the session key to encrypt the payloads of the APDUs, for example in accordance with SCP02.

In step 916, the script applet 81 forwards the authenticated script to the MCU 32, which in step 918 forwards the authenticated script to the application selection module 225 in the DTPU. The next steps (sub-process 920) occur on the DTPU and are shown in FIG. 10.

Referring to FIG. 10, in step 948 the authenticated script is authenticated against SSD 96. In step 950, the script is passed to the PSE selection application 222 which is part of the application selection module 225. In step 952, the PSE selection application 222 uses GlobalPlatform Global lock privilege to execute a "Lock and Associated" command (as shown in FIG. 7) against the Lock SSD 206 which causes all PDTPs on the DTPU to be inoperable. In step 954, there is an acknowledgement that the Lock SSD 206 has been locked.

Steps 958 and 960 are a loop 956 in which the PSE selection application 222 processes the script (generated in steps 912, 914), reads the AIDs for contact transaction applications, and uses GlobalPlatform Global lock privilege to unlock (as shown in FIG. 8) each contact transaction application 940 associated with the AIDs. Step 960 is an acknowledgement of each transaction application 940 being unlocked. The loop 956 repeats until all contact transaction applications associated with AIDs in the script are unlocked.

Steps 964 and 966 are a loop 962 in which the PSE selection application 222 processes the script (generated in steps 912, 914), reads the AIDs for contactless transaction applications, and uses GlobalPlatform Global lock privilege to unlock (as shown in FIG. 8) each contactless transaction application 942 associated with the AIDs. Step 966 is an acknowledgement of each transaction application 940 being unlocked. The loop 962 repeats until all contactless transaction applications associated with AIDs in the script are unlocked.

In step 968, if the list of AIDs for contact transaction applications is empty, then the PSE selection application 222 is disabled. Otherwise, if the list of AIDs for contact transaction applications is not empty, then in step 770 the PSE selection application 222 is set with the AIDs of contact transaction applications that have been successfully unlocked (as shown in FIG. 6).

In step 972, the PSE selection application 222 initiates an update of the PPSE selection application 224. In step 974, if the list of AIDs for contactless transaction applications is empty, then the PPSE selection application 224 is disabled. Otherwise, if the list of AIDs for contact transaction applications is not empty, then in step 976 the PPSE selection application 224 is set with the AIDs of contactless transaction applications that have been successfully unlocked. In step 978, an acknowledgement is returned to the PSE selection application 222.

In step 980, the PSE selection application 222 uses GlobalPlatform Global lock privilege to unlock the Lock SSD 206, and in step 982 an acknowledgement is returned to the PSE selection application 222.

Referring to FIG. 9, the process continues with step 922 in which the application selection module 225 sends an acknowledgement (in the form of R-APDUs) to the MCU 32. In step 924, the MCU 32 checks the status words (also called status bytes) in the R-APDUs. If an error occurs that requires action by the cardholder, the MCU 32 displays an appropriate error message on the display screen 83A. In step 926, if the status words do not indicate an error, the MCU 32 updates the MCU registry 35 (not shown in FIG. 9) with the activation states of AIDs for contact and contactless transaction applications. In step 928, the MCU 32 updates the display screen 83A with information to indicate that the new personality has been activated. Finally, in step 930, the cardholder checks the display to confirm that the new personality has been activated as expected.

Sequence Diagrams for Adopting a Transaction Application while in the Field

Referring again to FIGS. 9-10, an embodiment of a process for selecting and adopting at least one transaction application from a plurality of transaction applications associated with a personality will now be described. The steps are the same as for adopting a personality described above, but apply to individual transaction applications instead of PDTPs.

Referring to FIG. 9, the process for selecting and activating a transaction application begins in step 900 when a cardholder 674 uses the graphical user interface 83A, 83B (FIG. 1A) to browse transaction applications currently installed on the DTC for a selected personality. The available transaction applications are represented on the display screen 83A by one or more items of metadata associated with each personality. In an embodiment, the metadata displayed on the display screen 83A is the transaction type, payment scheme name, bank name, last four digits of the PAN, and logo for the payment scheme. Examples of transaction types include currency, expense type, budget category, location, project, or person or organisation benefiting from the expense. The transaction type may have been defined by the cardholder.

In step 902, the cardholder 674 selects one or more transaction application to be unlocked and the selection is recorded by the MCU 32. In this embodiment, the DTC 12 is operable to simultaneously have multiple unlocked transaction applications. The MCU registry stores rules regarding which transaction applications are permitted to be simultaneously unlocked, and the MCU refers to these rules before proceeding to unlock transaction applications. If the rules do not permit the requested unlocking of transaction applications, the MCU displays a message on the display screen 83A to indicate that the request cannot proceed.

In step 904, if the rules permit the requested unlocking of one or more transaction applications, the MCU 32 looks up the metadata stored in MCU registry 35 and identifies the metadata associated with each selected transaction application. The metadata contains an AID for with each selected transaction application. The MCU 32 uses the metadata to generate a list of AIDs associated with the selected transaction application(s).

In step 906, the MCU 32 sends a command (which contains the AID for each selected transaction application) to the script applet 81 to generate a script (which includes at least one command) which, when executed on the DTPU, locks all transaction applications on the DTPU and then unlocks each selected transaction application as described above with reference to the security hierarchy in FIGS. 7-8. In step 908, the script applet 81 requests a script template from a template store 82 (which is stored on the OSE), and in step 910 the template store 82 returns the requested script template to the script applet 81. In step 912, the script applet 81 fills the script template with values to create a script. The created script is in the form of APDUs and derived from an AID for each selected contact transaction application, and an AID for each selected contactless transaction application.

In step 914, the script applet 81 generates a session key using SSD key 104 (stored in the OSE 80, as shown in FIG. 1B) and a counter value associated with a targeted SCP02 keyset in the DTPU 30, and uses the session key to encrypt the payloads of the APDUs, for example in accordance with SCP02. The purpose of the session key is to authenticate the script against the application selection module 225. The SSD key stored in the OSE 80 is a copy of a key held by the SSD 96 associated with the application selection module 225 in the DTPU 30. In step 916, the script applet 81 forwards the script to the MCU 32, which forwards the script (in step 918) to the application selection module 225 in the DTPU. The next steps (sub-process 920) occur on the DTPU and are shown in FIG. 10.

Referring to FIG. 10, in step 948 the script is authenticated against the SSD 96 of the application selection module 225. In step 950, the script is passed to the PSE selection application 222 which is part of the application selection module 225. In step 952, the PSE selection application 222 uses GlobalPlatform Global lock privilege to execute a "Lock and Associated" command against the Lock SSD 206 (an example of a Lock SSD 206 is shown in FIGS. 6-8) which causes all transaction applications on the DTPU to be locked. In step 954, there is an acknowledgement that the Lock SSD 206 has been locked.

Steps 958 and 960 are a loop 956 in which the PSE selection application 222 processes the script (generated in steps 912, 914), reads the AIDs for contact transaction applications, and uses GlobalPlatform Global lock privilege to unlock each contact transaction application 940 associated with the AIDs. Step 960 is an acknowledgement of each transaction application 940 being unlocked. The loop 956 repeats until all contact transaction applications associated with AIDs in the script are unlocked.

Steps 964 and 966 are a loop 962 in which the PSE selection application 222 processes the script (generated in steps 912, 914), reads the AIDs for contactless transaction applications, and uses GlobalPlatform Global lock privilege to unlock each contactless transaction application 942 associated with the AIDs. Step 966 is an acknowledgement of each transaction application 940 being unlocked. The loop 962 repeats until all contactless transaction applications associated with AIDs in the script are unlocked.

In step 968, if the list of AIDs for contact transaction applications is empty, then the PSE selection application 222 is disabled. Otherwise, if the list of AIDs for contact transaction applications is not empty, then in step 770 the PSE selection application 222 is set with the AIDs of contact transaction applications that have been successfully unlocked.

In step 972, the PSE selection application 222 initiates an update of the PPSE selection application 224. In step 974, if the list of AIDs for contactless transaction applications is empty, then the PPSE selection application 224 is disabled. Otherwise, if the list of AIDs for contact transaction applications is not empty, then in step 976 the PPSE selection application 224 is set with the AIDs of contactless transaction applications that have been successfully unlocked. In step 978, an acknowledgement is returned to the PSE selection application 222.

In step 980, the PSE selection application 222 uses GlobalPlatform Global lock privilege to unlock the Lock SSD 206, and in step 982 an acknowledgement is returned to the PSE selection application 222.

Referring to FIG. 9, the process continues with step 922 in which the application selection module 225 sends an acknowledgement (in the form of R-APDUs) to the MCU 32. In step 924, the MCU 32 checks the status words (also called status bytes) in the R-APDUs. If an error occurs that requires action by the cardholder, the MCU 32 displays an appropriate error message on the display screen 83A. In step 926, if the status words do not indicate an error, the MCU 32 updates the MCU registry 35 (not shown in FIG. 9) with the activation states of AIDs for contact and contactless transaction applications. In step 928, the MCU 32 updates the display screen 83A with information to indicate that each selected transaction application has been activated. Finally, in step 930, the cardholder checks the display to confirm the activation is as expected.

Further Embodiments of a Security Hierarchy on the DTPU

Figure 11:
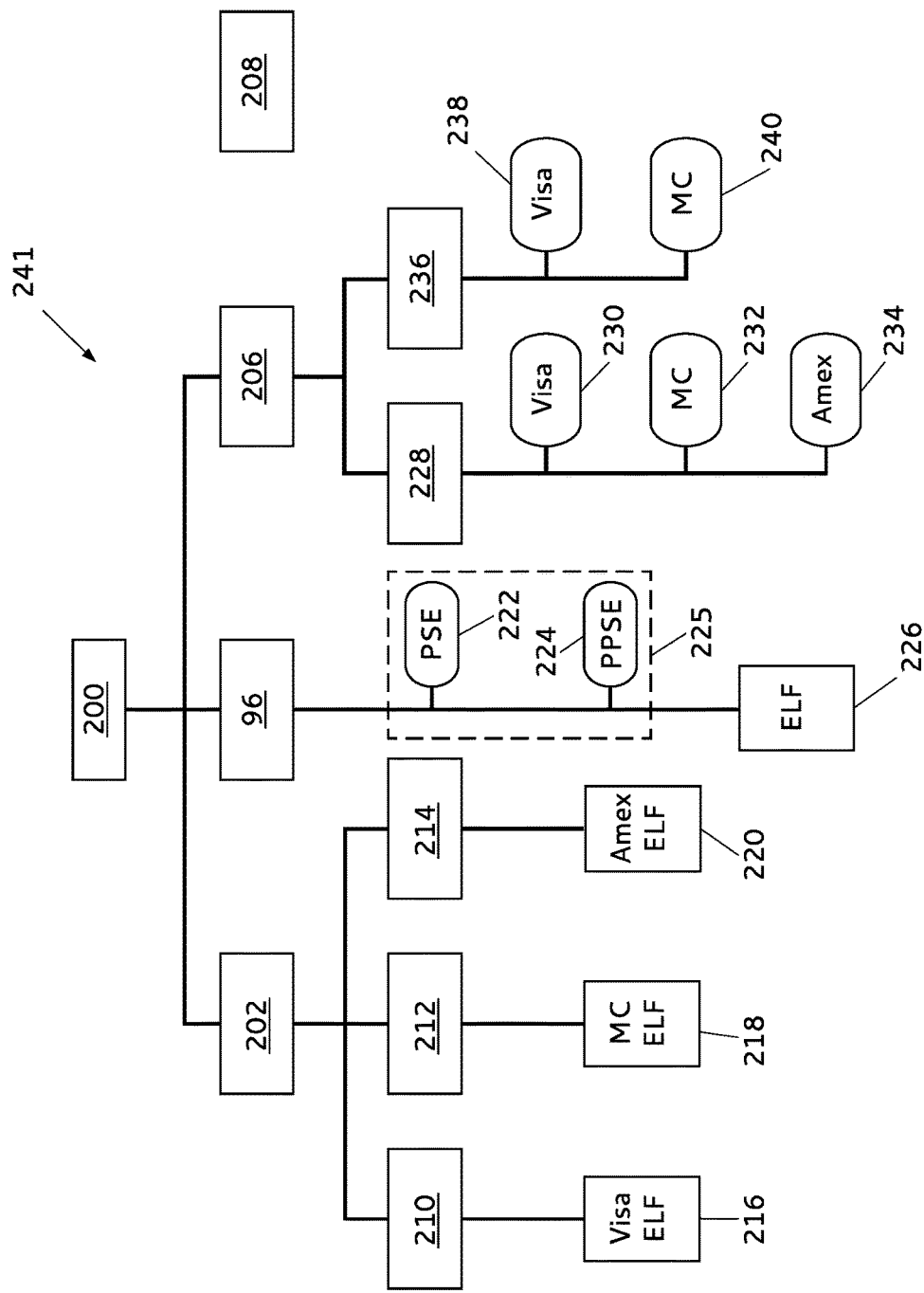
FIG. 11 is a tree diagram of a further embodiment of a security hierarchy in a DTPU.

FIG. 11 illustrates another embodiment of a security hierarchy 241 suitable for hosting a plurality of personalities and for adopting a personality from the plurality of personalities while the DTC is in the field. Where the features are the same as those in FIG. 6, the same reference numerals have been used. In the embodiment in FIG. 11, Bank 1 has only one SSD 228, and this SSD is a parent to three PDTPs (230, 232, 234). Bank 2 also has only one SSD 236 which is a parent to two PDTPs (238, 240). This embodiment has fewer SSDs than in FIG. 6 but the PDTPs can be locked and unlocked using the same process illustrated in FIGS. 7-8. Cascade locking of the Lock SSD 206 causes all associated SSDs (228, 236) to be locked, and all associated PDTPs (230, 232, 234, 238, 240) to be inoperable. The application selection module 225 is operable to activate a targeted PDTP as described above with reference to FIGS. 7-8.

Figure 12:
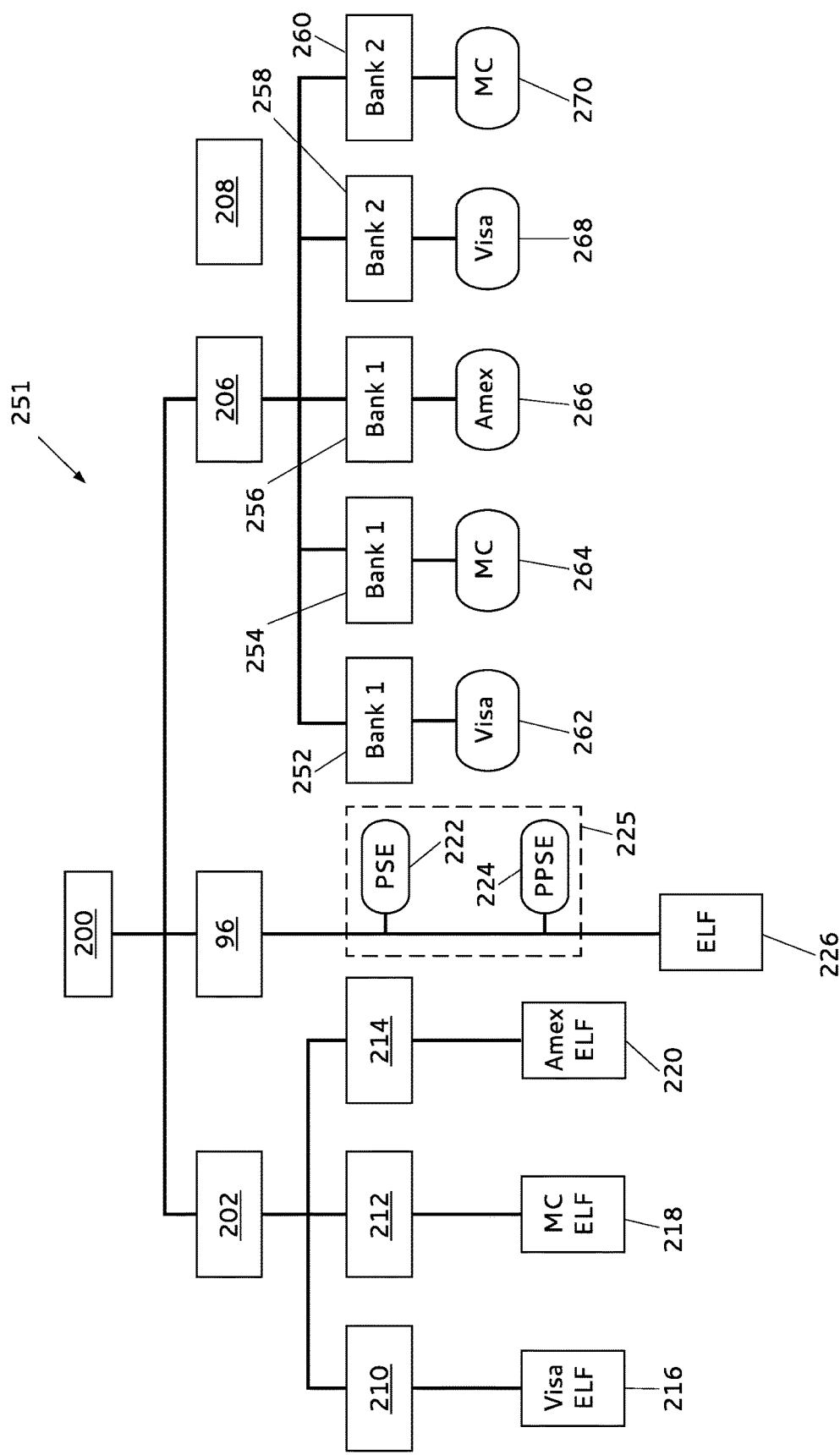
FIG. 12 is a tree diagram of a further embodiment of a security hierarchy in a DTPU.

FIG. 12 illustrates another embodiment of a security hierarchy 251 suitable for hosting a plurality of personalities and for adopting a personality from the plurality of personalities while the DTC is in the field. In this embodiment, the PDTPs and associated SSDs are arranged in a flatter hierarchy than in the embodiments in FIGS. 6-8 and 11. Each PDTP is a child of an SSD which is a child of the Lock SSD 206 in the security hierarchy. "Bank 1" has three SSDs 252, 254, 256 are associated with (or are "children" of) Lock SSD 206 and "Bank 2" has two SSDS 258, 260 which are associated with the Lock SSD 206. Bank 1 and Bank 2 would each use their own SP-TSM to perform operations on the DTPU.

Each SSD of Bank 1 is a parent to a single PDTP 262, 264, 266 and each SSD of Bank 2 is a parent to a single PDTP 268, 270. Cascade locking (of the Lock SSD 206) causes all child SSDs (252, 254, 256, 258, 260) to be locked, and all associated PDTPs (262, 264, 266, 268, 270) to be inoperable. The application selection module 225 is operable to activate a targeted PDTP as described above with reference to FIGS. 7-8.

Figure 13:
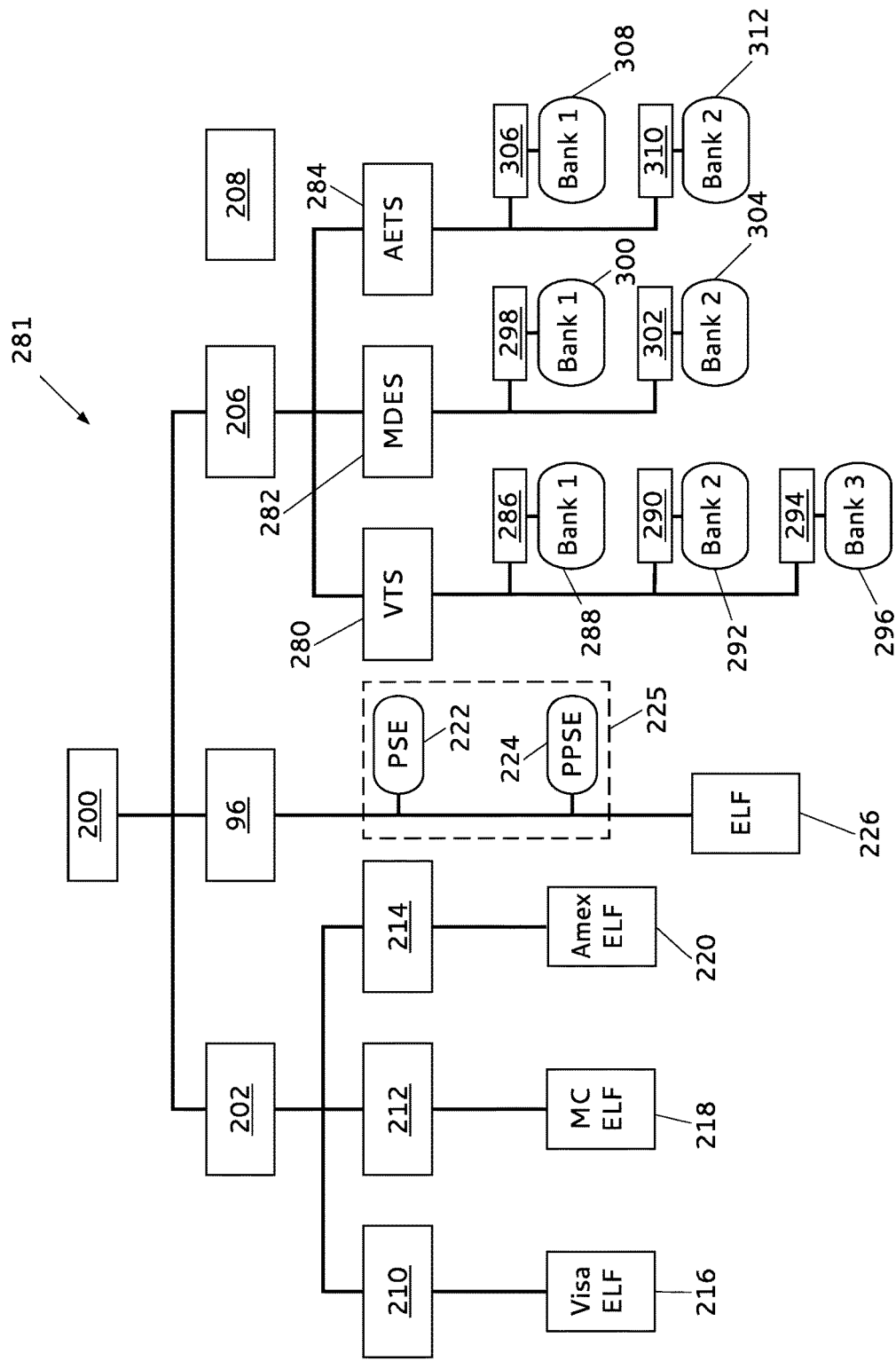
FIG. 13 is a tree diagram of a further embodiment of a security hierarchy in a DTPU.

FIG. 13 illustrates another embodiment of a security hierarchy 281 suitable for hosting a plurality of personalities and for adopting a personality from the plurality of personalities while the DTC is in the field. In this embodiment, the DTC hosts seven personalities associated with three banks (Bank 1, Bank 2, Bank 3) and three payment schemes (Visa, Mastercard, American Express) and each bank uses the services of a TSP to perform operations on the DTPU:

a TSP for Visa accounts has control of SSD 280 and associated SSDs (286, 290, 294) and associated PDTPs (288, 292, 296);

a TSP for Mastercard accounts has control of SSD 282 and associated SSDs (298, 302) and associated PDTPs (300, 304); and a TSP for American Express accounts has control of SSD 284 and associated SSDs (306, 310) and associated PDTPs (308, 312).

As in the embodiments shown in FIGS. 6-8 and 11-12, cascade locking of the Lock SSD 206 in FIG. 13 causes all associated SSDs (280, 286, 290, 294, 282, 298, 302, 284, 306, 310) to be locked, and all associated PDTPs (288, 292, 296, 300, 304, 308, 312) to be inoperable. The application selection module 225 in FIG. 13 is operable to activate a targeted PDTP as described above with reference to FIGS. 7-8.

Figure 14:
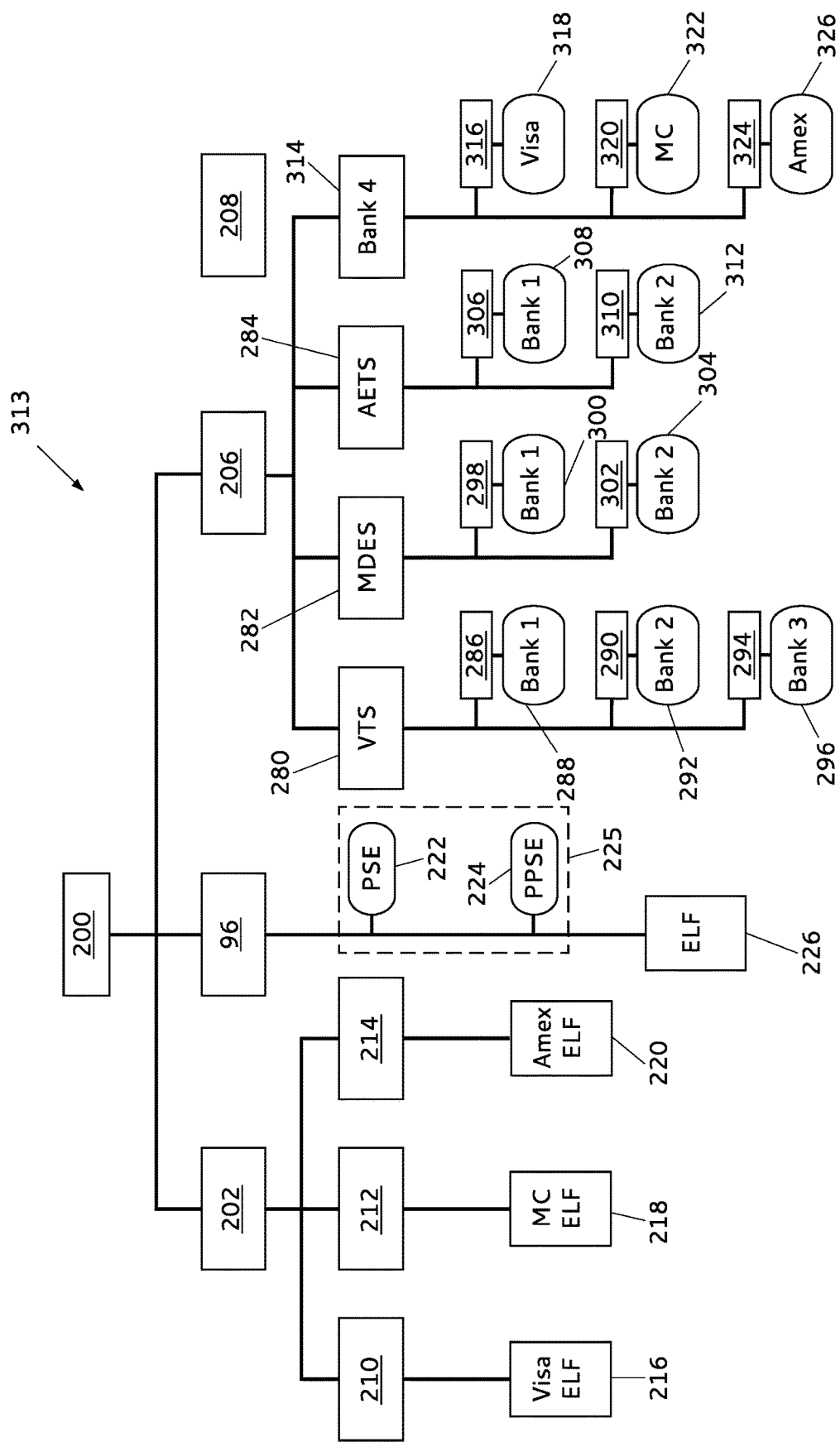
FIG. 14 is a tree diagram of a further embodiment of a security hierarchy in a DTPU.

FIG. 14 illustrates another embodiment of a security hierarchy 313 suitable for hosting a plurality of personalities and for adopting a personality from the plurality of personalities while the DTC is in the field. In this embodiment, the DTC hosts ten personalities associated with four banks (Bank 1, Bank 2, Bank 3, Bank 4) and three payment schemes (Visa, Mastercard, American Express). Bank 1, Bank 2 and Bank 3 use the services of a TSP to perform operations on the DTPU, while Bank 4 would use its own SP-TSM to perform operations on the DTPU:
- a TSP for Visa accounts has control of SSD 280 and associated SSDs (286, 290, 294) and associated PDTPs (288, 292, 296);
- a TSP for Mastercard accounts has control of SSD 282 and associated SSDs (298, 302) and associated PDTPs (300, 304);
- a TSP for American Express accounts has control of SSD 284 and associated SSDs (306, 310) and associated PDTPs (308, 312); and
- an SP-TSM for Bank 4 has control of SSD 314 and associated SSDs (316, 320, 324) and associated PDTPs (318, 322, 326).

Cascade locking of the Lock SSD 206 causes all associated SSDs (280, 286, 290, 294, 282, 298, 302, 284, 306, 310, 314, 316, 320, 324) to be locked, and all associated PDTPs (288, 292, 296, 300, 304, 308, 312, 318, 322, 326) to be inoperable. The application selection module 225 is again operable to activate a targeted PDTP as described above with reference to FIGS. 7-8.

FIG. 15 illustrates an embodiment of a branch 331 of a further security hierarchy suitable for hosting a plurality of personalities and for adopting a personality from the plurality of personalities while the DTC is in the field. This security hierarchy is also suitable to adopt one or more operating modes (contact or contactless).

The branch 331 is a child of the Lock SSD 206. The SSD 228 is controlled by Bank 1 and is a parent to SSD 330 (which is associated with a first personality) and SSD 334 (which is associated with a second personality).

The first personality (associated with SSD 330) is a Bank 1 Visa debit account personality associated with PDTP 332 which comprises contact and contactless transaction applications.

The second personality (associated with SSD 334) is a Bank 1 Mastercard credit account personality which has two modes of operation:
- contact mode, corresponding to a transaction application group 338 (a subset of the PDTP) which includes at least one contact transaction application; and
- contactless mode, corresponding to a transaction application group 342 (a subset of the PDTP) which includes at least one contactless transaction application.

The transaction application group 338 is only operable in contact mode, and the transaction application group 342 is only operable in contactless mode. In this embodiment, both transaction application groups 338, 342 are associated with the same Mastercard personality (same PAN, same expiry date, same account name etc.) and part of the same PDTP.

One of the two operating modes can be activated (leaving the other operating mode inoperable) by locking one of the two transaction application groups 338, 342 and unlocking the other group. Making only one of the operating modes active enables the cardholder to operate the Mastercard personality in either contact mode or contactless mode, but not both.

Alternatively, both operating modes can be made simultaneously active by unlocking both transaction application groups 338, 342. However, Bank 1 may choose not to allow both operating modes to be simultaneously active, which in an embodiment is implemented by including such information in the metadata associated with the personality.

In an embodiment, the DTC is operable to activate or de-activate an operating mode by receiving an operating mode selection from the cardholder (via the user interface 83A, 83B), and using the cardholder's selection to trigger the MCU 32 to generate a list of AIDs associated with the selected operating mode. The list of AIDs specifies each transaction application required for the selected operating mode. The MCU is operable to generate the list of AIDs by referring to metadata (stored in an MCU registry) and to forward the AIDs to the script applet 81 in the OSE 80. The script applet 81 uses the AIDs to generate scripts to be executed in the DTPU 30.

In one method, the scripts target the application selection module 225 in the DTPU which uses the Global Lock privilege to cascade lock all transaction applications and then unlock each transaction application associated with the selected operating mode (either group 338 or group 342). In another method, the scripts target SSD 336 and SSD 340 with either a lock command or an unlock command. For example, a script which locks SSD 336 and unlocks SSD 340 causes transaction application group 338 to be locked and transaction application group 342 to be unlocked, without using Global Lock privilege.

FIG. 16 illustrates a further embodiment of a branch 351 of a security hierarchy suitable for hosting a plurality of personalities and for adopting a personality from the plurality of personalities while the DTC is in the field. This security hierarchy is also suitable to adopt one or more accounts from a plurality of accounts associated with a personality. In this embodiment, each personality has accounts in different currencies.

The branch 351 is a child of the Lock SSD 206. The SSD 228 is controlled by Bank 1 and is a parent to SSD 330 (which is associated with a first personality) and SSD 334 (which is associated with a second personality).

The first personality (associated with SSD 330) is a Bank 1 Visa debit account personality which operates in two currencies:
- US dollar transactions in contact and contactless modes, corresponding to a transaction application group 348 (a subset of the PDTP) with contact and contactless interfaces; and
- Euro transactions in contact and contactless modes, corresponding to a transaction application group 352 (a subset of the PDTP) with contact and contactless interfaces.

In this embodiment, transaction application groups 348, 352 are associated with the same Visa personality (same PAN, same expiry date, same account name etc.) and part of the same PDTP. One of the two currencies can be activated (leaving the other currency inoperable) by locking one of the two transaction application groups 348, 352 and unlocking the other group. Making only one of the currencies active enables the cardholder to operate the Visa personality with only one of the two currencies.

Alternatively, both currencies can be activated. Bank 1 may choose not to allow both currencies to be active simultaneously, which in an embodiment is implemented by including such information in the metadata associated with the personality.

In an embodiment, the DTC is operable to operable to activate or de-activate a currency by receiving a currency selection from the cardholder (via the user interface 83A, 83B), and using the currency selection to trigger the MCU 32 to generate a list of AIDs associated with the selected currency. The list of AIDs specifies each transaction application required for the selected currency. The MCU is operable to generate the list of AIDs by referring to metadata (stored in an MCU registry) and to forward the AIDs to the script applet 81 in the OSE 80. The script applet 81 uses the AIDs to generate scripts to be executed in the DTPU 30.

In one method, the scripts target the application selection module 225 in the DTPU which uses the Global Lock privilege to cascade lock all transaction applications and then unlock each transaction application associated with the selected currency. In another method, the scripts target each of SSD 346 and SSD 350 with either a lock command or an unlock command, without using Global Lock privilege.

The second personality (associated with SSD 334) is a Bank 1 Mastercard credit account personality which operates in two currencies and has two separate modes of operation:

Australian dollar transactions in contact mode, corresponding to a transaction application group 356 (a subset of the PDTP) which includes at least one contact transaction application;

Australian dollar transactions in contactless mode, corresponding to a transaction application group 360 (a subset of the PDTP) which includes at least one contactless transaction application;

Yen transactions in contact mode, corresponding to a transaction application group 364 (a subset of the PDTP) with at least one contact transaction application; and Yen transactions in contactless mode, corresponding to a transaction application group 368 (a subset of the PDTP) with at least one contactless transaction application.

In this embodiment, transaction application groups 356, 360, 364, 368 are associated with the same Mastercard personality (same PAN, same expiry date, same account name etc.) and are part of the same PDTP. One or more of the two currencies and the two operating modes can be activated (leaving the other currencies and operating modes inoperable) by either locking or unlocking transaction application groups 356, 360, 364, 368, which enables the cardholder to operate the Mastercard personality with a selected currency and selected operating mode.

Bank 1 may choose not to allow some currencies and operating modes to be active simultaneously, which in an embodiment is implemented by including such information in the metadata associated with the personality.

In an embodiment, the DTC is operable to activate or de-activate a currency selection and an operating mode by receiving a selection from the cardholder, and using the selections to trigger the MCU 32 to command the script applet 81 to generate a script to be executed by the DTPU 30 (as described above).

In one method, the scripts target the application selection module 225 in the DTPU which uses the Global Lock privilege to cascade lock all transaction applications and then unlock each transaction application associated with the selected currency and operating mode, which in this embodiment is one or more of transaction application groups 356, 360, 364, 368. In another method, the scripts target each of SSDs 354, 358, 362, 366 with either a lock command or an unlock command, without using Global Lock privilege.

Provisioning Infrastructure

FIG. 17 shows an embodiment of a provisioning infrastructure 10 arranged to provision the DTC 12 via a Data Assistance Device (DAD) 14 (for example a smart phone) while the DTC and DAD are both physically remote from the provisioning infrastructure 10. The provisioning infrastructure 10 includes a provisioning network 16, at least one issuer 18 (sometimes referred to as an initial card issuer), a remote notification service 22, a wireless communication network 24, and a mobile application portal 62.

The issuer 18 in payment embodiments can be any party that authorises a payment service to be provided by the DTC 12 (in at least some non-payment embodiments, the issuer can be the party that issues a document such as a passport or drivers licence). For example, the issuer 18 may be a financial institution or a party with a banking licence. The issuer 18 also authorises the provisioning network 16 to provision the DTC 12 while the DTC is in the field. In various embodiments, the issuer 18 issues the DTC 12 to a cardholder. It is also contemplated in other embodiments that the DTC 12 can be issued by another authorized provider (sometimes referred to as an additional card issuer or distributor). However, in this specification the system will be exemplified with an initial card issuer 18. The provisioning infrastructure 10 is shown operating with only one issuer 18, however, in various embodiments, the provisioning infrastructure is operable with multiple issuers (for example, issuers for many different banks and/or financial institutions). In other embodiments, the provisioning network may be associated with a single issuer.

The provisioning network 16 is operable to communicate with the DAD 14 by means of the wireless communication service 24 (creating a communication link 20) and to communicate with the DTC 12 via the DAD 14 (using wireless communication link 26). The issuer 18 or its agent is operable to communicate with the DAD 14 via the provisioning network 16 and link 20. The wireless communication network 24 can be any wireless network capable of transmitting sufficient data to and from the DAD 14, and could include, for example, an internet service provider or a mobile network operator.

In the illustrated embodiments, the provisioning infrastructure 10 is operable to communicate with the DTC 12 via the DAD 14 and the wireless communication network 24. However, in other embodiments, communications with the DTC 12 may occur Over The Wire (OTW) through a DTD, such as a POS terminal, directly to the DTC via contact link (for example, by dipping the DTC in to the DTD) or by a contactless communication link between the DTD and the DTC, for example via NFC or Bluetooth between the DTD and DTC. In other embodiments, the OTW communication may be to the DAD 14 via a contactless communication link (for example, NFC or Bluetooth) and then from the DAD to the DTC 12 (for example, via Bluetooth).

In the embodiment shown in FIG. 17, the DAD 14 and the DTC 12 are linked via link 26 for intercommunication. In one example, the link 26 uses Bluetooth (including Bluetooth Low Energy BLE). In other examples, the link 26 uses Near Field Communication (NFC). In yet another example (described below with reference to FIG. 19), the DTC 12 includes WiFi capability which enables the DTC to connect directly to the wireless communication network 24 without requiring the DAD 14 for intercommunication therebetween. However, the DAD may be employed in initially setting up the WiFi communication between the DTC and the wireless communication network.

In alternative embodiments, the link 26 between the DAD 14 and DTC 12 is a non-wireless communication link. In one such embodiment, link 26 is a cable connection between the DTC 12 and DAD 14. In another such embodiment, the link 26 includes electrical contacts which are operable to be brought into data communication with electrical contacts on the DTC 12 (for example, contact plate 34 shown in FIG. 1B). In one version, the DAD 14 includes such electrical contacts. In another version, the DAD 14 is operable to connect via a cable to an apparatus which includes electrical contacts operable to be brought into data communication with electrical contacts on the DTC 12. In other alternative embodiments, the link 26 includes both wireless and non-wireless communication links. In one such embodiment, the DAD 14 is operable to connect wirelessly to an apparatus which includes electrical contacts and is operable to be brought into data communication with electrical contacts on the DTC 12.

FIG. 17 also illustrates a remote notification service 22 which is operable to provide push notifications to a mobile application 60 on the DAD 14 (for example a smart phone). For example, a push notification may request the cardholder to download provisioning data to the DTC or DAD, such as digital objects which install a new personality or a firmware update. Such a push notification could include a notification to the cardholder to check that the DTC is powered up and paired with the DAD before commencing a download of digital objects. Such provisioning would take place through the provisioning infrastructure 10 using the processes described below.

FIG. 17 also illustrates a mobile application portal 62. In one embodiment, the mobile application portal 62 is operable to download the mobile application 60 onto the DAD 14. In another embodiment, the mobile application portal 62 is operable to download a configuration file onto the DAD 14. Such a configuration file may include Bluetooth keys for a specific DTC to enable the DAD 14 to pair with the DTC 12. In an embodiment, such a configuration file is only be provided after the specific DTC has been confirmed to be eligible to receive the download, for example by registering the DTC through the mobile application portal 62.

FIG. 18 shows the same embodiment shown in FIG. 17 but illustrates further details of the provisioning network 16 and DAD 14. For simplicity, only the MCU 32 is shown within the DTC 12 and other components of the DTC are omitted. The provisioning network 16 includes a first provisioning agent 36 and at least one second provisioning agent 38. The provisioning agent 36 includes functions of a TSM, but provides functions not provided by known TSMs, including management functions which support the operation of the DTC 12. In the following embodiments, the provisioning agent 36 will be referred to as a DPD manager 36.

In embodiments, each provisioning agent 38 is a Trusted Service Manager (TSM) or a Tokenised Service Provider (TSP), both of which are known in the prior art. In the following embodiments, the at least one second provisioning agent 38 will be referred to as a TSM/TSP 38.

The TSM/TSP 38 is trusted or managed by the issuer 18. The DPD manager 36 is in data communication with the DAD 14 and the TSM/TSP 38, and the TSM/TSP is in data communication with the issuer 18. In some embodiments, the components and functions of the provisioning network 16 can be provided by a single agent (provisioning agent), a single server and/or a single site, however, it is envisaged that in most embodiments the various components and functions are to be provided by different agents, albeit with some components and functions combined in a single agent or single server. It is also possible that the issuer 18 and the provisioning network 16 is a combined agent (combined provisioning agent), or that parts of the provisioning network are combined with the issuer.

The DPD manager 36 provides a number of important functions related to the provisioning and operation of the DTC 12. The DPD manager 36 is operable to generate digital objects additional to those provided by a traditional TSM/TSP 38, and to transmit such digital objects to the DTC 12.

The DPD manager 36 is also operable to transmit digital objects to the DTC 12 on behalf of the TSM/TSP 38. In particular, the DPD manager 36 is operable to receive digital objects provided by the TSM/TSP 38 and to transmit such digital objects to the DTC 12. The DPD manager 36 provides this function (the transmission of digital objects on behalf of the TSM/TSP 38) because provisioning agents of the prior art, such as TSM/TSP 38, are not suitable for provisioning a digital payment device such as a DTC 12. One of the reasons is that a prior art TSM/TSP 38 is arranged to communicate directly with a digital wallet on a mobile device, without communicating through an intermediary device such as the DAD 14. Also, a prior art TSM/TSP 38 does not provide routing information to instruct the MCU 32 to provide the digital objects to a suitable component on the DTC. Also, a prior art TSM/TSP 38 is only known to provision contactless payment instances. Further, a prior art TSM/TSP 38 is only known to provide metadata (such as the payment scheme name, branding, account name, last four digits of the PAN) to a single device (a wallet on mobile device), whereas embodiments of the present information provision two devices with metadata, namely the DTC 12 and DAD 14.

In the embodiment in FIGS. 17-18, the DPD manager 36 is operable to transmit digital objects to the DTC 12 via the DAD 14 via link 26 (for example using Bluetooth for communications between the DTC 12 and the DAD 14), and in the embodiment shown in FIG. 19 the DPD manager 36 is operable to transmit digital objects directly to the DTC 12 via a WiFi communication link 64. Such digital objects are provided to at least one of the MCU 32 and DTPU 30 of the DTC 12. In the embodiment in FIGS. 17-18, providing the digital objects to the MCU and/or DTPU involves establishing the communications links 20, 26 with the DTC 12 via the DAD 14. In the embodiment in FIG. 19, providing the digital objects to the MCU and/or DTPU involves establishing the communication link 64 with the DTC 12.

In an embodiment, the DPD manager 36 includes routing information (for example, a header) with each digital object transmitted to the DTC via link 20, link 26 or link 64. In an embodiment, the routing information includes information indicative of an intended destination of the digital object. In an embodiment, the information indicative of an intended destination of the digital object specifies a component of the DTC, for example the DTPU. The MCU is operable to read the routing information and provide the digital object to the specified component of the DTC (as specified in the routing information). For example, the routing information can be operable to instruct the MCU to forward a digital object to the DTPU, or in another example, store the digital object in the MCU. The DPD manager 36 also includes routing information with any digital object provided by the TSM/TSP 38, and transmits such digital object(s) together with the routing information to the DTC 12.

In an embodiment, the DPD manager 36 is also operable to maintain a record of the state of the DTC 12, including a record of each personality installed on (hosted by) the DTC 12, and characteristics of the DTC 12, for example the device model. In an embodiment, the DPD manager 36 is operable to request the DTC 12 to provide information indicative of the state of the DTC. The DPD manager 36 is also operable to receive requests from the cardholder for a new personality to be installed on the DTC 12 while the DTC 12 is in the field. The DAD 14 is operable to transmit each such cardholder request to the DPD manager 36, and the DPD manager 36 is operable to forward each such cardholder request to the TSM/TSP 38, which in turn is operable to forward each such cardholder request to the issuer 18. In an embodiment, the DPD manager 36 is operable to include additional information in the request to the issuer 18, for example information which specifies aspects of the personality to be installed, including information regarding the required operation mode of the personality (contact, contactless, or both). In another embodiment, the issuer 18 provides an online facility for the cardholder to submit the request directly without using the DAD 14. If the issuer 18 approves the cardholder's request for a new personality to be installed, the issuer 18 initiates a process in which the DPD manager 36 and the TSM/TSP 38 both provide digital objects for installation on the DTC 12.

In the embodiments shown in FIGS. 17-19, only one issuer 18 and one TSM/TSP 38 are depicted in the provisioning infrastructure 10, but it should be understood that the provisioning infrastructure 10 can include a plurality of issuers and the provisioning network 16 can include a plurality of provisioning agents. In one embodiment, the provisioning network 16 includes a plurality of TSMs. In another embodiment, the provisioning network 16 includes a plurality of TSPs. In another embodiment, the provisioning network 16 includes at least one TSM and at least one TSP. Each TSM (which may also be referred to as a Service Provider TSM or SP-TSM) is usually managed directly by a separate issuer 18. A TSP is generally a service provided by another party such as a payment scheme (for example Visa or Mastercard) a on behalf of the issuer 18. In an embodiment, the provisioning infrastructure 10 includes at least one issuer for each TSP, and includes a separate TSP for each payment scheme supported by the provisioning infrastructure.

The TSM/TSP 38 includes a key manager 42 and is operable (amongst other functions) to negotiate SSD cryptographic key management on the DTC 12 on behalf of the issuer 18. Each key manager 42 is operable to issue SSD keys 44 to the DTC 12. The key manager 42 may sometimes be referred to as, or the functions of a key manager may be incorporated into, a security domain manager.

Some DAD Component Details and Mobile Application Setup

In the embodiment shown in FIGS. 17-19, the DAD 14 is a smartphone, however, in other embodiments, the DAD can be any suitable device, such as a PC, a tablet PC, or other types of mobile computing devices. In yet other embodiments, the DAD may be a Digital Transaction Device (DTD), such as an Automatic Teller Machine (ATM), which has been suitably adapted to provide the functionality required of the DAD in embodiments of this invention.

In other embodiments, it is contemplated that the functions required of the DAD 14 in the present invention could be performed on a DTC if configured with functionality to communicate with the provisioning network 16 (likely using WiFi or similar technology). Such a DTC would also need to be equipped with suitable processing, memory and a power source to perform the required functions as performed by the DAD in embodiments of the present invention. Thus, the DAD 14 is an optional component for implementing embodiments of the present invention.

The DAD has software installed, referred to as a DAD gateway 48, which enables the DAD 14 to act as a bridge between the provisioning infrastructure 10 and the DTC 12. The DAD gateway 48 is operable to communicate with the provisioning infrastructure 10 via link 20, and with the DTC 12 via link 26. The DAD gateway 48 provides functionality which may not be visible to the cardholder of the DAD 14, unlike the mobile application 60 which is visible to cardholders. The DAD gateway 48 and mobile application 60 can be part of the same software installation, but as they provide different types of functionality they will be described here as though they are separate software items.

The DAD gateway 48 and mobile application 60 may be requested and distributed by another authorized party. In some embodiments, the DAD gateway 48 and mobile application 60 are provided to the DAD 14 only upon confirmation that the user of the DAD (or the DAD itself) is authorized to receive the mobile application, wherein the DAD provides confirmation of the DAD identity (for example, the International Mobile Equipment Identity (IMEI) of the DAD if a smartphone). Typically the DAD user will be the same person as the DTC cardholder. In other embodiments, the confirmation of authorization includes confirming the DTC 12 identity, which may include one or more of a unique serial number for the DTC, a Bluetooth ID, a unique identifier for a DTPU on the DTC and other unique identifiers which either singly or in combination uniquely identify the DTC or components thereon. In some embodiments, the confirmation of authorization includes a combination of a DAD identifier and one or more DTC identifier(s).

In at least some embodiments, the DTC 12 is operable to take part in a personality installation process which is operable to install a new personality on the DTC while the DTC is in the field. In such a process, the DPD manager 36 transmits digital objects to the DAD 14 and DTC 12, the digital objects including scripts and metadata associated with the personality. Examples of metadata associated with a personality include the scheme name, the issuer name, the cardholder's name, the full PAN, the last four digits of the PAN, the expiry date, and the CVV. In embodiments, at least some of the metadata is stored on both the DAD 14 and the DTC 12.

In the embodiment shown in FIGS. 17-18, the DPD manager 36 is operable to forward digital objects for the installation of a new personality to the DAD 14, and the DAD 14 is operable to forward the digital objects to the DTC 12. The DTC 12, after processing the digital objects, is operable to forward at least some of the metadata (contained within the received digital objects) back to the DAD 14 for installation thereon.

In the embodiment shown in FIG. 19, the DTC 12 includes a WiFi communication module 88 (shown in FIG. 1B) and the DTC is operable to communicate with the DPD manager 36 via link 64 which uses wireless communication network 24. The DPD manager 36 is operable to forward digital objects to install a new personality directly to the DTC 12 via link 64, bypassing the DAD 14. In an embodiment, the cardholder triggers the download such digital objects to the DTC, for example by pressing a button on the DTC. The DTC 12 and DAD 14 in FIG. 19 are also operable to communicate via link 26 (as in FIGS. 17-18), for example via Bluetooth or NFC. The DTC 12, after processing the received digital objects, is operable to forward at least some of the metadata (contained within the received digital objects) back to the DAD 14 for installation thereon.

The process of installing a new personality on the DTC 12 can be triggered in different ways. In an embodiment of a personality installation process, the process is triggered when a cardholder uses the mobile application 60 on the DAD 14 to select a new personality and request installation of the personality on the DTC. In an embodiment, the personality is selected from a list of personalities available for download to the cardholder. This list of personalities may be determined by the issuer 18, based on accounts held by the cardholder.

The DAD gateway 48 on the DAD 14 is operable to transmit the personality installation request to the issuer 18 and/or the DPD manager 36. In an alternative embodiment of a personality installation process, the process of installing a new personality on the DTC 12 begins when a cardholder engages a user interface on the DTC 12 (not shown) to select a new personality and requests installation of the personality on the DTC. The DTC 12 is operable to transmit the personality installation request to the DAD gateway 48 on the DAD 14, and the DAD gateway 48 is operable to transmit the installation request to the issuer 18 and/or the DPD manager 36. If a cardholder's personality installation request is approved by the provisioning infrastructure 10 (typically by the issuer 18 and/or the DPD manager 36), the DPD manager 36 is operable to begin the installation process.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference to any prior art in this specification is not and should not be taken as an acknowledgement or any form of suggestion that the prior art forms part of the common general knowledge.

What is claimed is:

1. A Digital Transaction Processing Unit (DTPU) hosting one or more transaction applications for digitally transacting with a Digital Transaction Device (DTD), the DTPU comprising a security hierarchy having one or more security domains, each security domain hosting at least one of the one or more transaction applications, the one or more transaction applications comprising at least one of:
   a transaction application for transacting in contact digital transactions,
   a transaction application for transacting in contactless digital transactions, or
   a transaction application for transacting in both contactless and contact digital transactions
wherein each security domain comprises a reversable locking process by which, when the security domain is reversibly locked, the one or more transaction applications hosted by the security domain are reversibly locked so as to be inoperable during a digital transaction and cannot be directly selected by a DTD,
wherein the security hierarchy further comprises lock Supplementary Security Domain (lock SSD) to provide a cascade locking process by which one or more of the security domains in the security hierarchy are reversibly locked when the lock SSD is reversibly locked.

2. The DTPU in accordance with claim 1, wherein the at least one transaction application security domain is provisioned by at least one of a digital payment device manager, a Trusted Service Manager (TSM), a Token Service Provider (TSP), and a Secure Element Manager Service (SEMS).

3. The DTPU in accordance with claim 1, wherein the DTPU is further hosts one or more containers, each transaction application being derived from one of the one or more containers, the security hierarchy operable to host the one or more containers.

4. The DTPU in accordance with claim 3, wherein the security hierarchy has a tree structure which comprises a first branch hosting the one or more containers, the tree structure further comprising a second branch hosting the one or more transaction applications.

5. The DTPU in accordance with claim 4, wherein the first branch is a sibling to the second branch in the tree structure.

6. The DTPU in accordance with claim 1, wherein the DTPU further hosts an application selection module operable to provide transaction application identifier information for communication to a DTD in a digital transaction, the transaction application identifier information being indicative of a transaction application operable for a digital transaction with the DTD.

7. The DTPU in accordance with claim 6, wherein each transaction application identifier is an Application Identifier (AID) of the associated transaction application.

8. The DTPU in accordance with claim 1, wherein the DTPU is configured to reversibly unlock at least one of the one or more transaction applications while the DTPU is in the field remote from a provisioning agent.

9. The DTPU in accordance with claim 1, wherein the one or more transaction applications comprise at least one first transaction application and at least one second transaction application, the at least one first transaction application being hosted by a first security domain, the at least one second transaction application being hosted by a second security domain.

10. The DTPU in accordance with claim 1, wherein the security hierarchy has a tree structure and the one or more transaction applications comprise a plurality of transaction applications which are each associated with a primary identifier, wherein transaction applications associated with the same primary identifier are children of the same security domain, and transaction applications associated with a different primary identifier are children of different security domains.

11. The DTPU in accordance with claim 1, wherein the one or more security domains in the security hierarchy that are reversibly locked when the lock SSD is reversibly locked are security domains under the lock SSD in the security hierarchy.

12. In a Digital Transaction Processing Unit (DTPU) hosting one or more transaction applications for digitally transacting with a Digital Transaction Device (DTD), the DTPU including comprising a security hierarchy for having one or more security domains, each security domain hosting at least one of the one or more transaction applications, wherein the security hierarchy is configured to host at least one the one or more transaction applications comprising at least one of:
- a transaction application for transacting in contact digital transactions,
- a transaction application for transacting in contactless digital transactions, or
- a transaction application for transacting in both contactless and contact digital transactions wherein each security domain comprises a reversable locking process by which, when the security domain is reversibly locked, the one or more transaction applications hosted by the security domain are reversibly locked so as to be inoperable during a digital transaction and cannot be directly selected by a DTD, wherein the security hierarchy further comprises lock Supplementary Security Domain (lock SSD) to provide a cascade locking process by which one or more of the security domains in the security hierarchy are reversibly locked when the lock SSD is reversibly locked, a method comprising reversibly locking the lock SSD causing one or more of the security domains in the security hierarchy to be reversibly locked.

13. A Digital Payment Device (DPD) comprising a Digital Transaction Processing Unit (DTPU), the DTPU hosting one or more transaction applications for digitally transacting with a Digital Transaction Device (DTD), the DTPU comprising a security hierarchy having one or more security domains, each security domain hosting at least one of the one or more transaction applications, the one or more transaction applications comprising at least one of:
- a transaction application for transacting in contact digital transactions,
- a transaction application for transacting in contactless digital transactions, or
- a transaction application for transacting in both contactless and contact digital transactions wherein each security domain comprises a reversable locking process by which, when the security domain is reversibly locked, the one or more transaction applications hosted by the security domain are reversibly locked so as to be inoperable during a digital transaction and cannot be directly selected by a DTD, wherein the security hierarchy further comprises lock Supplementary Security Domain (lock SSD) to provide a cascade locking process by which one or more of the security domains in the security hierarchy are reversibly locked when the lock SSD is reversibly locked.

* * * * *